(12) United States Patent
Sinchok

(10) Patent No.: US 12,208,666 B2
(45) Date of Patent: Jan. 28, 2025

(54) ARTICLE AND METHOD OF MANUFACTURE OF TRUCK CAP

(71) Applicant: John Sinchok, Hudson, OH (US)

(72) Inventor: John Sinchok, Hudson, OH (US)

(*) Notice: Subject to any disclaimer, the term of this patent is extended or adjusted under 35 U.S.C. 154(b) by 303 days.

(21) Appl. No.: 17/742,576

(22) Filed: May 12, 2022

(65) Prior Publication Data
US 2022/0266666 A1    Aug. 25, 2022

Related U.S. Application Data

(63) Continuation-in-part of application No. 16/712,381, filed on Dec. 12, 2019, now Pat. No. 11,142,053.

(51) Int. Cl.
*B60J 7/14* (2006.01)
*B60J 7/16* (2006.01)

(52) U.S. Cl.
CPC ..................... *B60J 7/141* (2013.01)

(58) Field of Classification Search
CPC ....... B60J 7/12; B60J 7/14; B60J 7/141; B60J 7/16; B60J 7/1607; B60J 7/1621; B60J 7/198
USPC .......................... 296/100.02, 100.06, 100.07
See application file for complete search history.

(56) References Cited

U.S. PATENT DOCUMENTS

| | | | | |
|---|---|---|---|---|
| 3,069,199 A * | 12/1962 | Reardon | ................ | B62D 33/08 296/100.07 |
| 4,126,349 A * | 11/1978 | Nelson | .................. | B62D 33/02 224/404 |
| 6,254,169 B1 * | 7/2001 | Arthur | ................... | B60J 7/1621 296/100.06 |
| 6,598,930 B1 * | 7/2003 | Tilton | ...................... | B60J 7/141 296/100.06 |
| 8,764,094 B1 * | 7/2014 | Castillo | ..................... | B60P 7/02 296/100.09 |
| 11,345,225 B2 * | 5/2022 | Fisher | .................... | B60J 7/1204 |
| 2007/0210608 A1 * | 9/2007 | Klein | ..................... | B60J 7/1621 296/100.02 |
| 2008/0129067 A1 * | 6/2008 | Rios | ....................... | B60J 7/1621 296/3 |
| 2014/0191531 A1 * | 7/2014 | Castillo | ..................... | B60P 7/02 296/100.02 |
| 2019/0283811 A1 * | 9/2019 | Fisher | ....................... | B60J 7/12 |

* cited by examiner

*Primary Examiner* — Jason S Daniels
(74) *Attorney, Agent, or Firm* — Emerson, Thomson & Bennett, LLC; Roger D. Emerson

(57) ABSTRACT

A truck cap for removably covering a vehicle bed. The truck cap includes a first and second cover member extending between a cab and a tailgate of the vehicle. The cover members are pivotably connected to driver and passenger side panels which adjoin the vehicle bed. The cover members pivot between an open position and a closed position. Raised portions are formed along the top surfaces and extend over abutting edges of the cover members opposite the pivot edges. The abutting edges are in abutment when the cover members are in the closed position, such that the raised portions interlock to cover the abutting edges. The cover members are preferably formed of a plastic material by a rotational molding process.

17 Claims, 51 Drawing Sheets

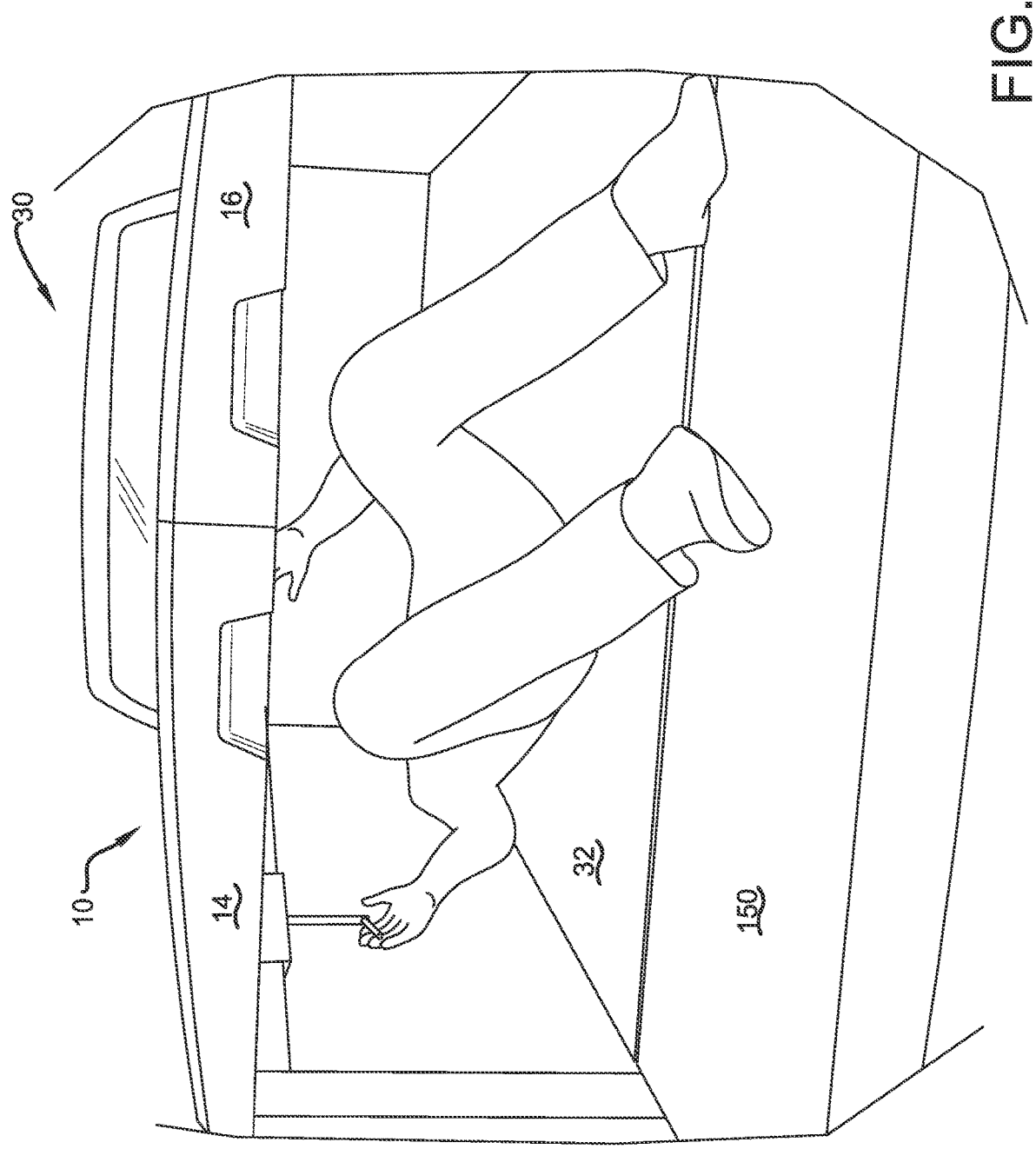

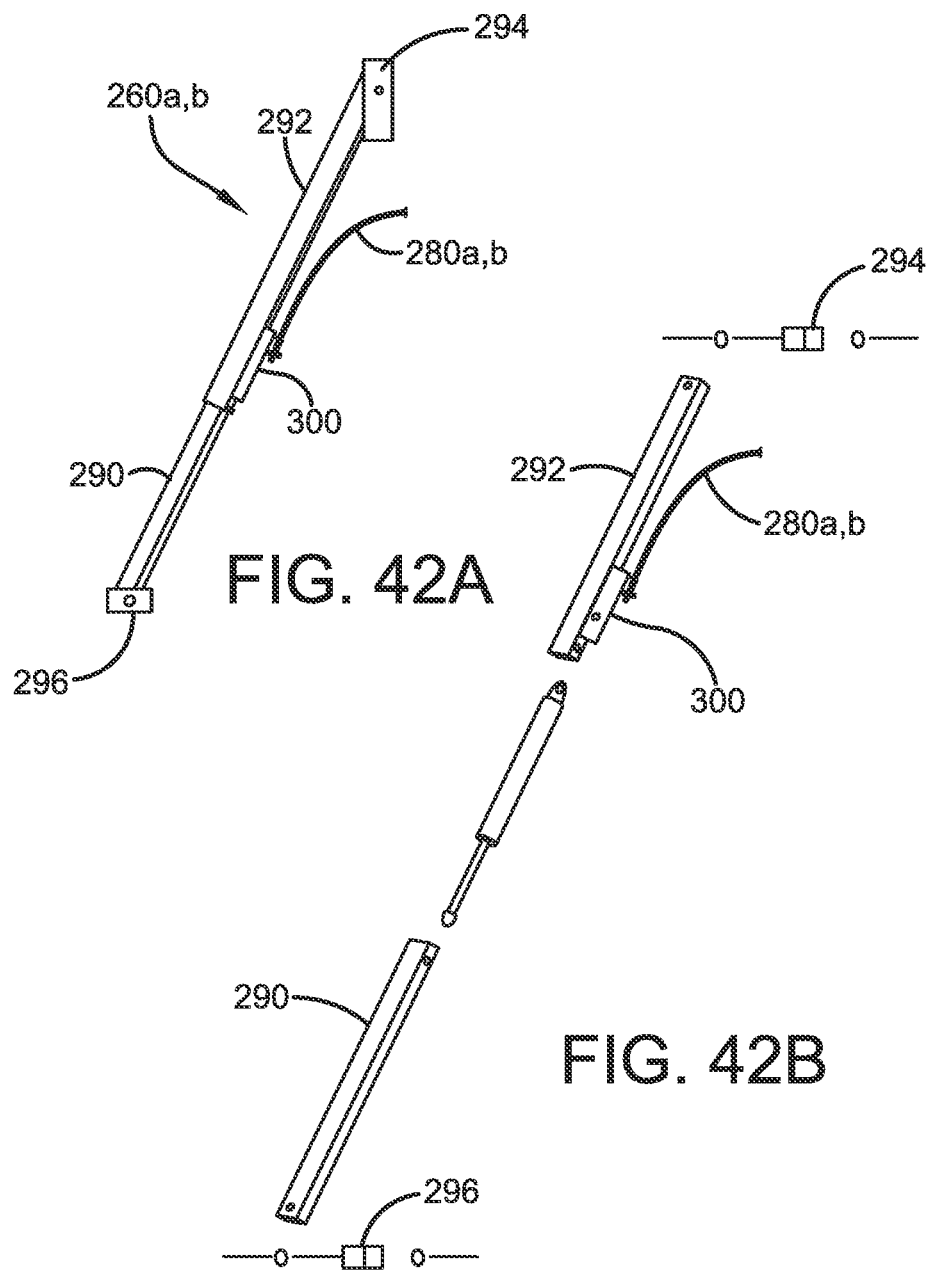

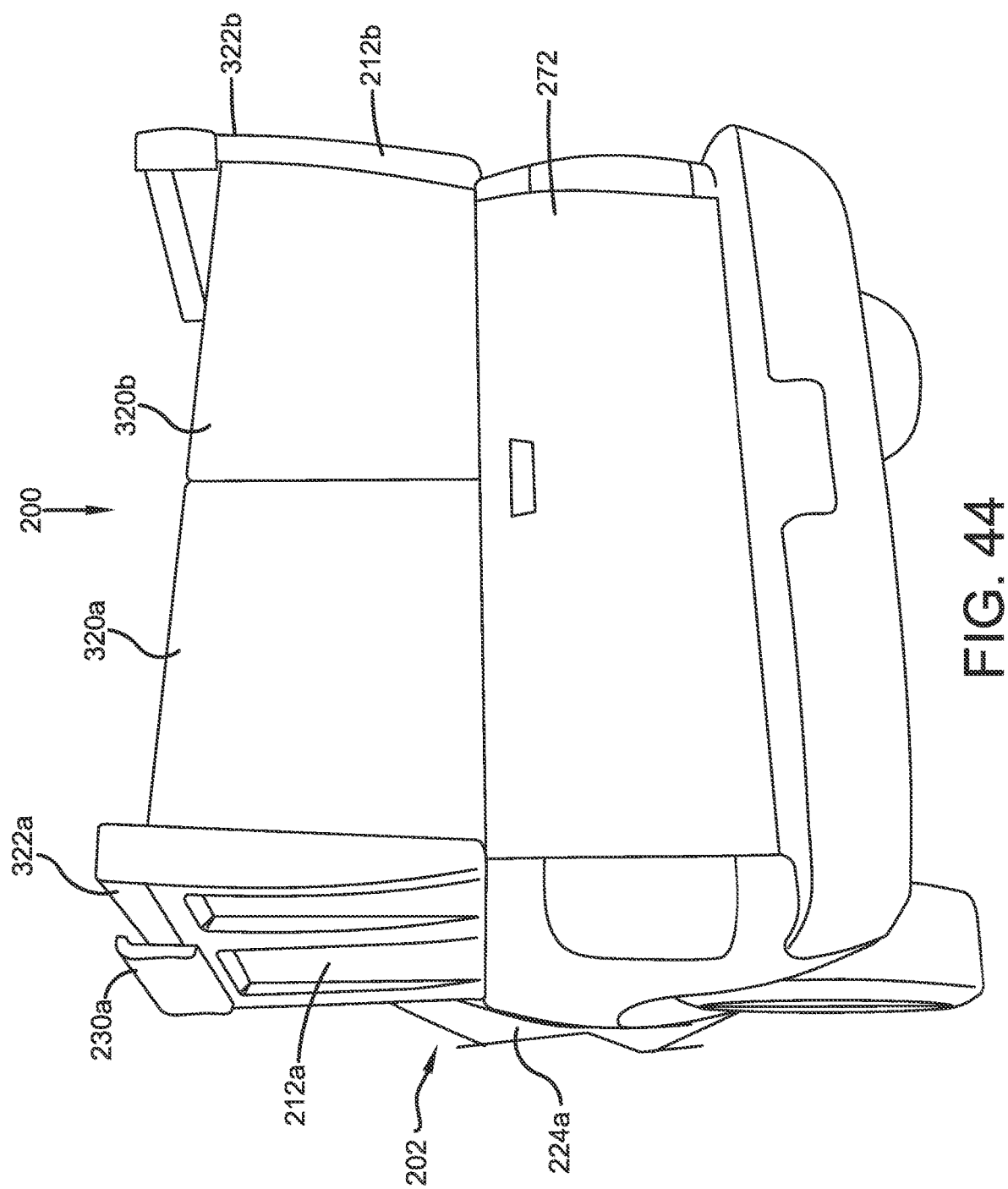

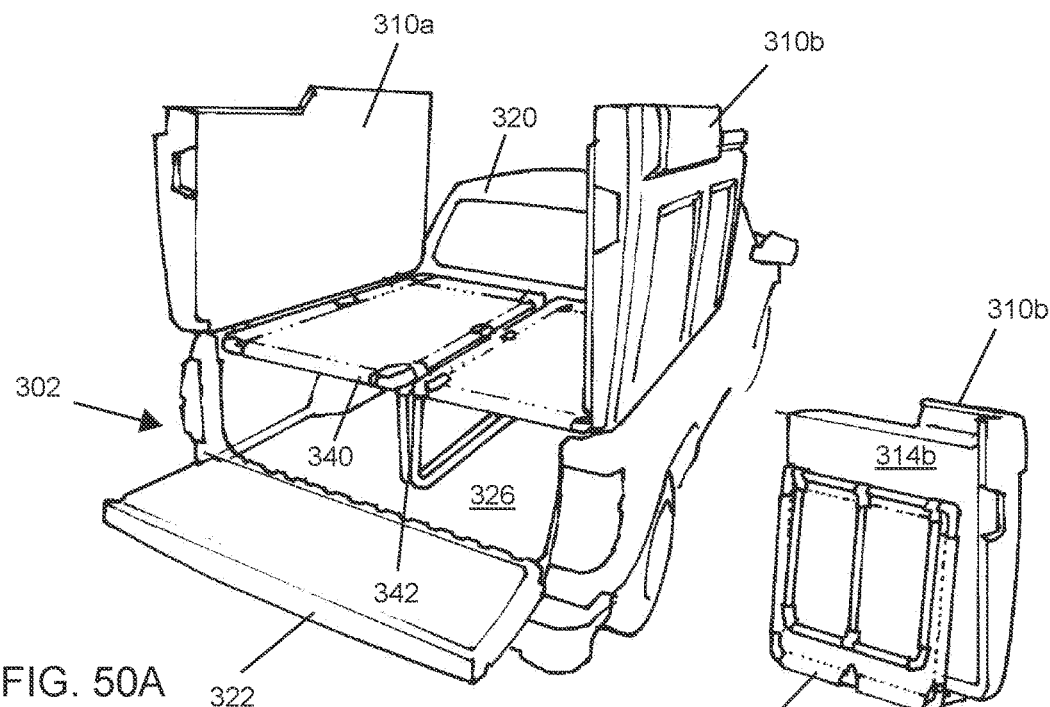
FIG. 50A
FIG. 50B
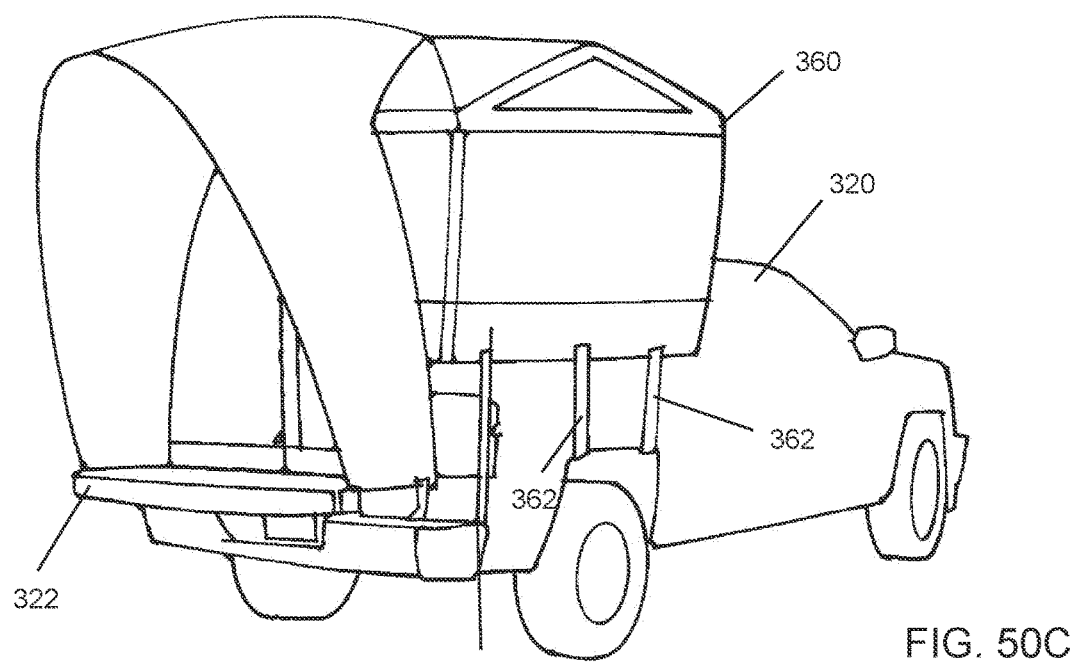
FIG. 50C

ARTICLE AND METHOD OF MANUFACTURE OF TRUCK CAP

CROSS-REFERENCE TO RELATED APPLICATIONS

The present application claims priority to, and is a continuation-in-part of, application Ser. No. 17/117,700 entitled ARTICLE AND METHOD OF MANUFACTURE OF TRUCK CAP, filed on Dec. 10, 2020, which is itself a continuation-in-part of U.S. Pat. No. 11,142,053 entitled ARTICLE AND METHOD OF MANUFACTURE OF TRUCK CAP.

I. BACKGROUND

This invention pertains to articles and methods of manufacture for those articles whereby the article covers the bed portion of a pickup truck or like vehicle. Specifically, the disclosed method of manufacturing article is a rotationally-molded article where essentially two halves fit together to cover the bed of an associated vehicle, such as a pickup truck.

II. SUMMARY

The present invention includes a truck cap for removably covering a vehicle bed of a vehicle. The truck cap includes a first cover member extending between a cab and a tailgate of the vehicle. The first cover member has a first top surface, a first bottom surface, and a first pivot edge along which the first cover member is pivotably connected to a driver side panel which adjoins the vehicle bed. The first cover member is configured for pivoting between an open position and a closed position. A second cover member extends between the cab and the tailgate of the vehicle. The second cover member has a second top surface, a second bottom surface, and a second pivot edge along which the second cover member is pivotably connected to a passenger side panel adjoining the vehicle bed. The second cover member is configured for pivoting between an open position and a closed position.

A first raised portion is formed along the first top surface and extends over a first abutting edge of the first cover member opposite the first pivot edge. A second raised portion is formed along the second top surface and extends over a second abutting edge of the second cover member opposite the second pivot edge. The first and second abutting edges are in abutment when the first and second cover members are in the closed position, such that the first and second raised portions interlock to cover the first and second abutting edges. The first and second cover members are preferably formed of a plastic material by a rotational molding process.

The truck cap also includes a pair of first hinge members for pivotably connecting the first pivot edge to the first side panel. A pair of second hinge members is included for pivotably connecting the second pivot to the second side panel. Each of the first and second hinge members includes a C-clamp for engaging a top rim along the respective first and second side panels.

A first strut is provided having a first distal end pivotably connected to the first cover member and a first proximal end pivotably connected to the vehicle bed. A second strut has a second distal end pivotably connected to the second cover member and a second proximal end pivotably connected to the vehicle bed. The first and second struts are selectively locked to maintain the respective first and second cover members in the open position In accordance with one aspect of the present invention, an article is disclosed which essentially comprises two planar members which nest together to selectively cover the bed of an associated pickup truck.

In accordance with yet another aspect of the present invention, support struts assist in the opening of the first and second members.

In accordance with yet another aspect of the present invention, a locking mechanism and method using same can be used to lock the first and second members, and thereby generally secure the contents of the associated truck bed.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

Figure 6:
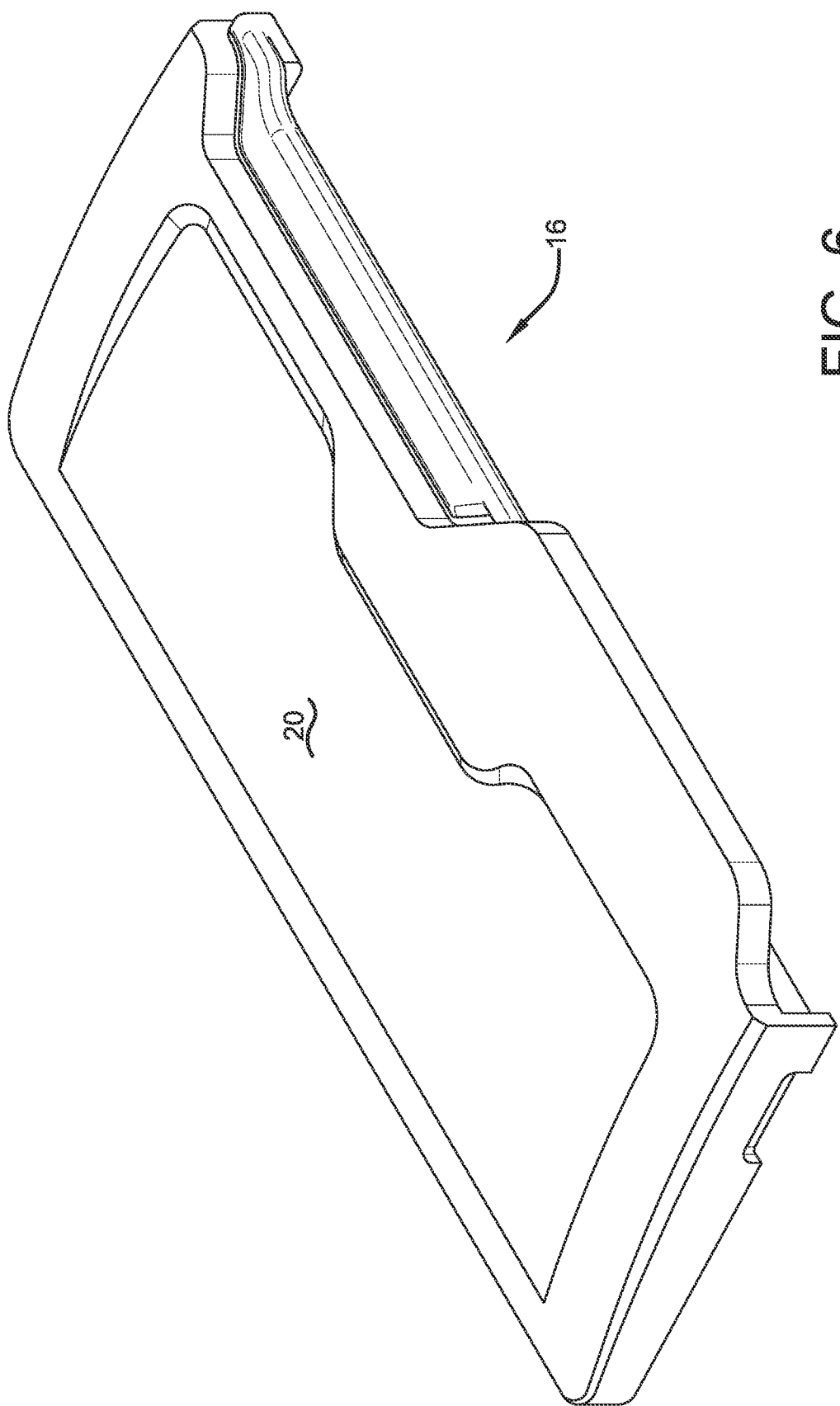
Figure 7:
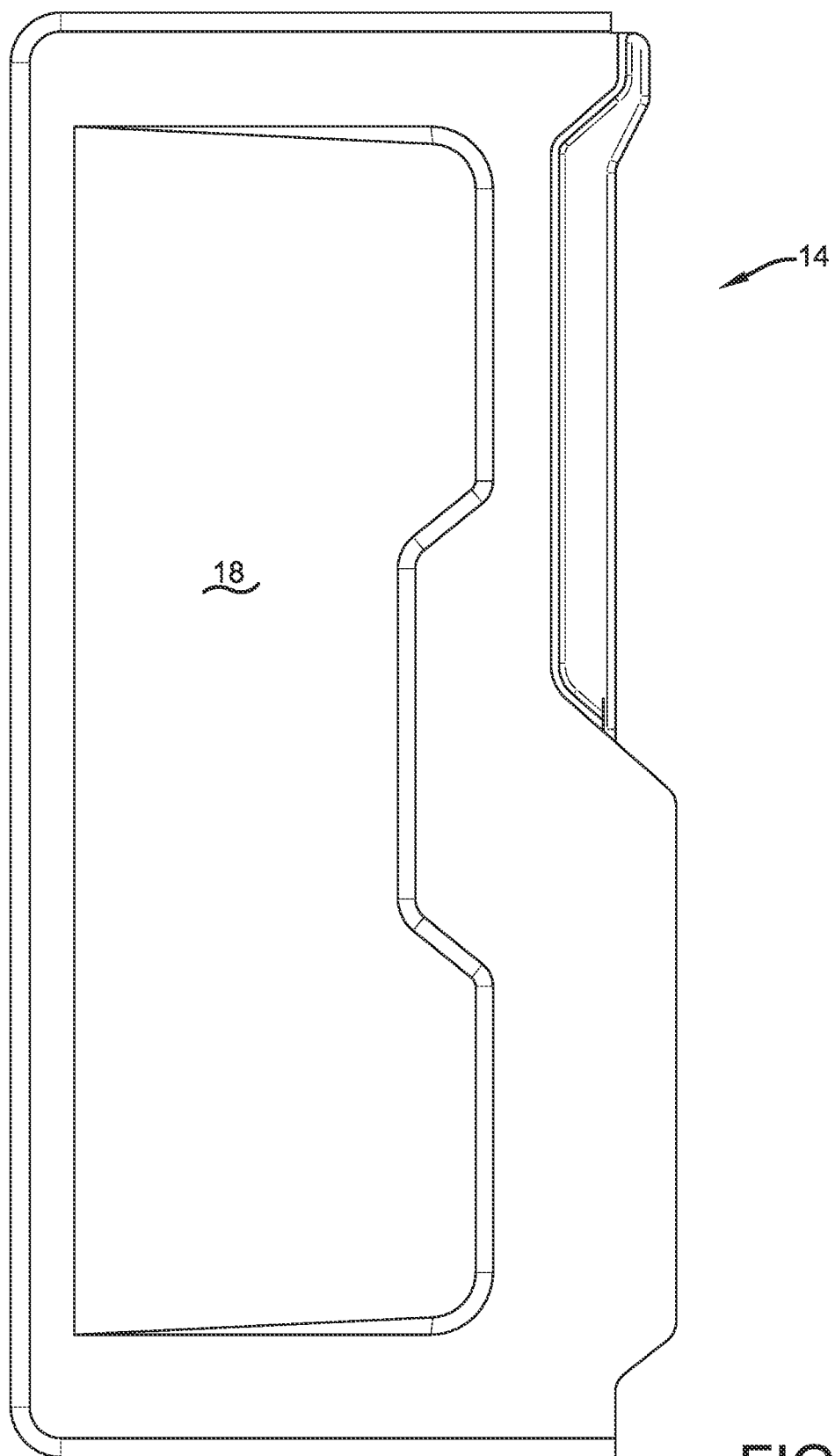
Figure 8:
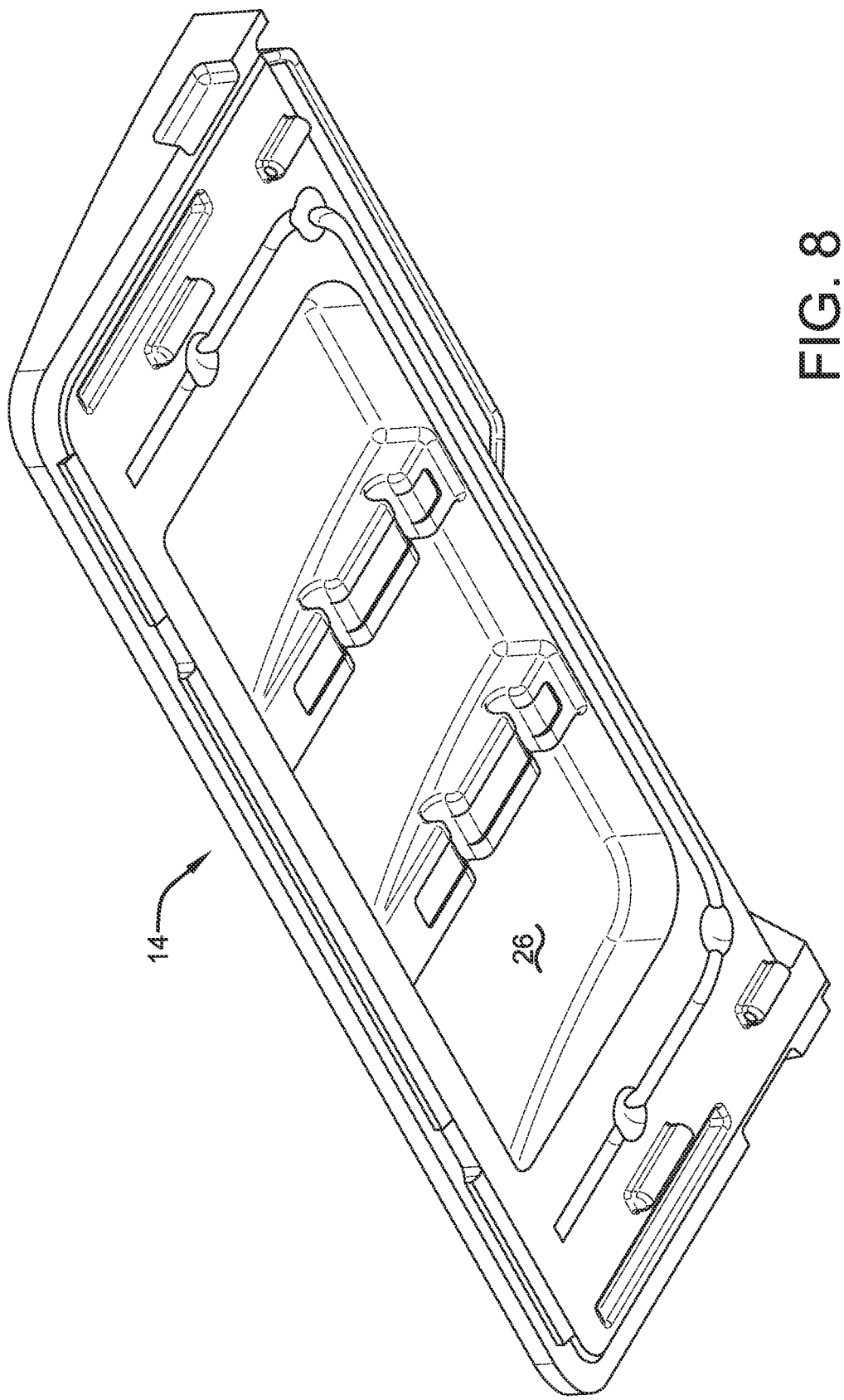
Figure 9:
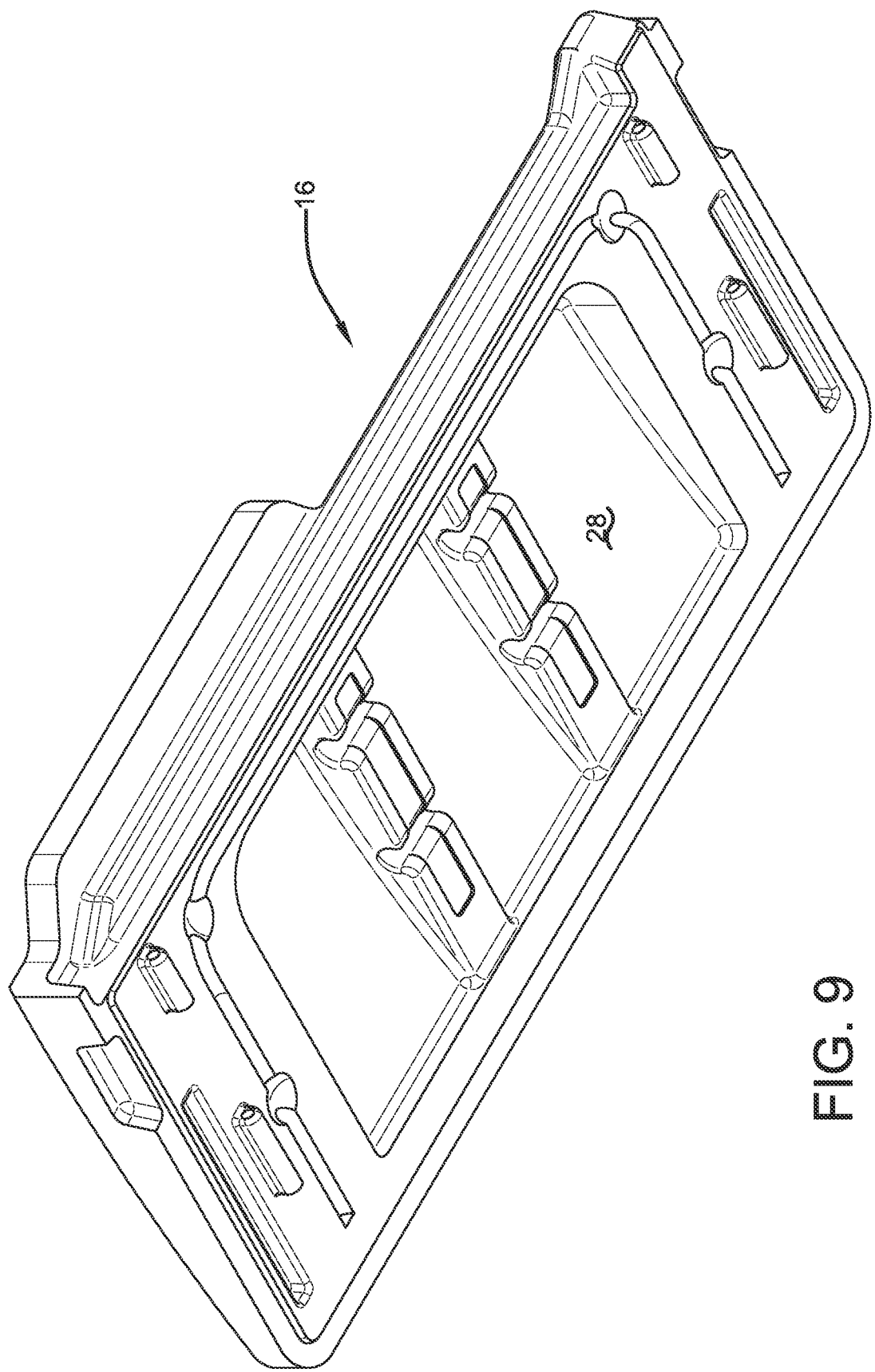
Figure 10:
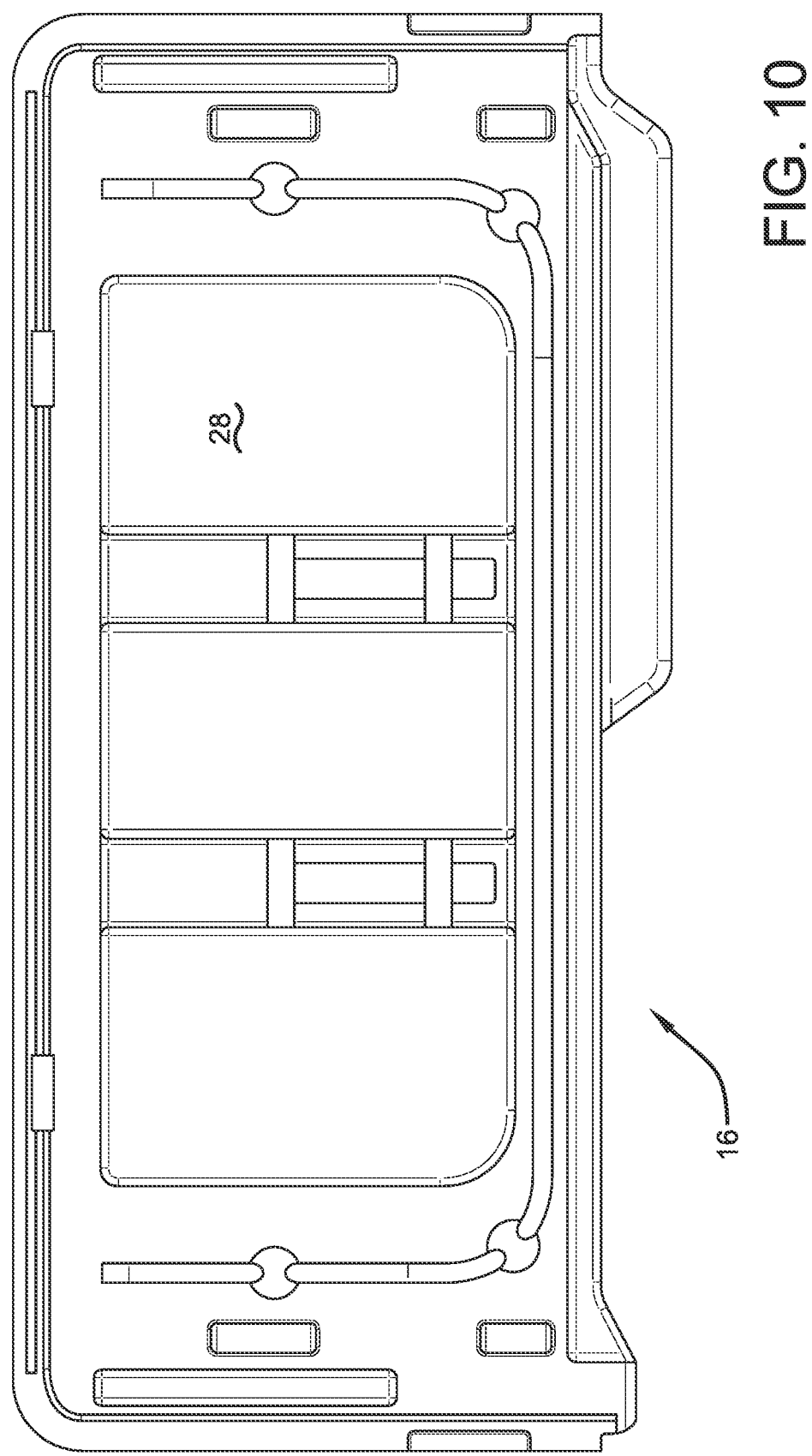
Figure 11:
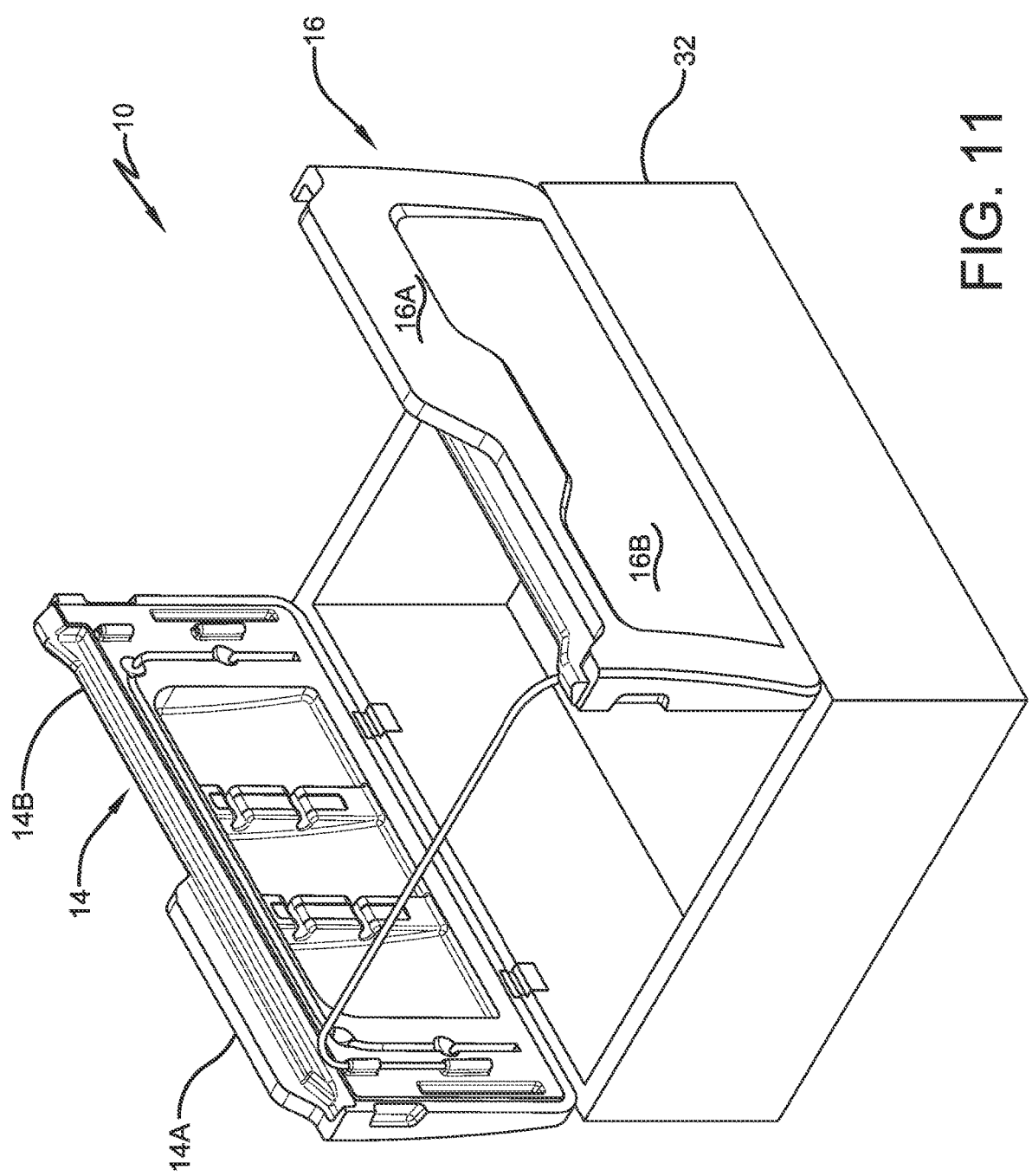
Figure 12:
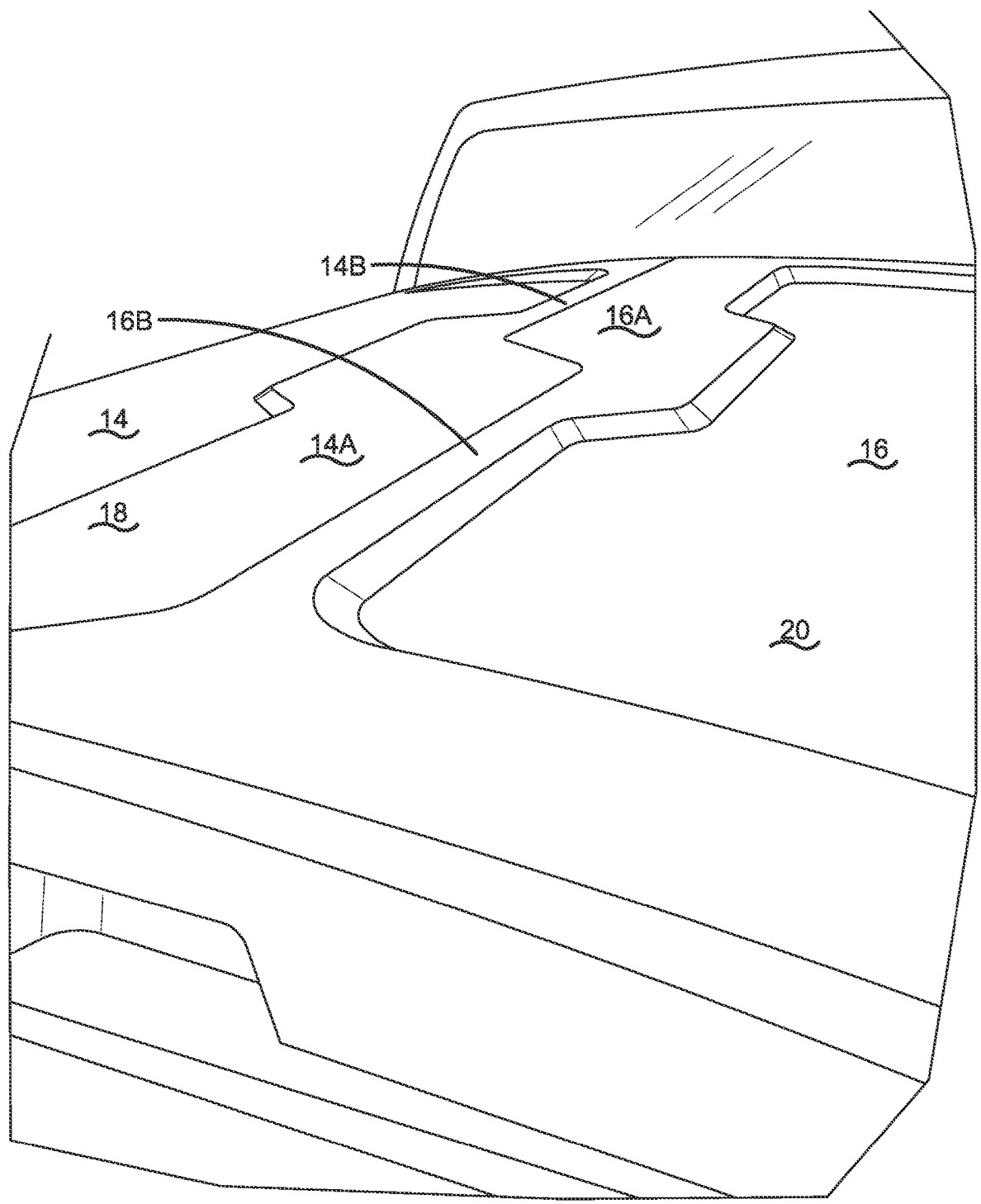
Figure 13:
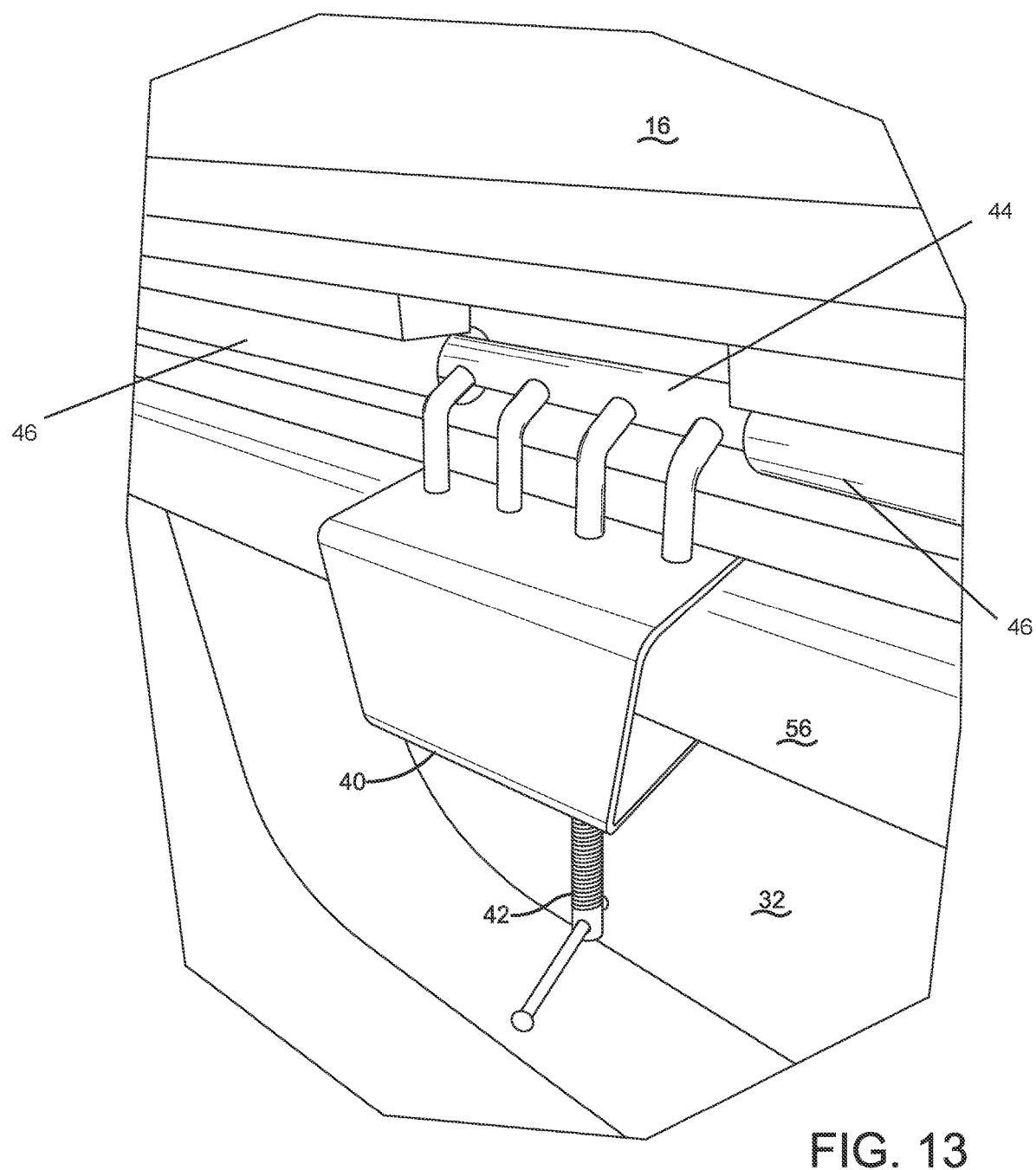
Figure 14:
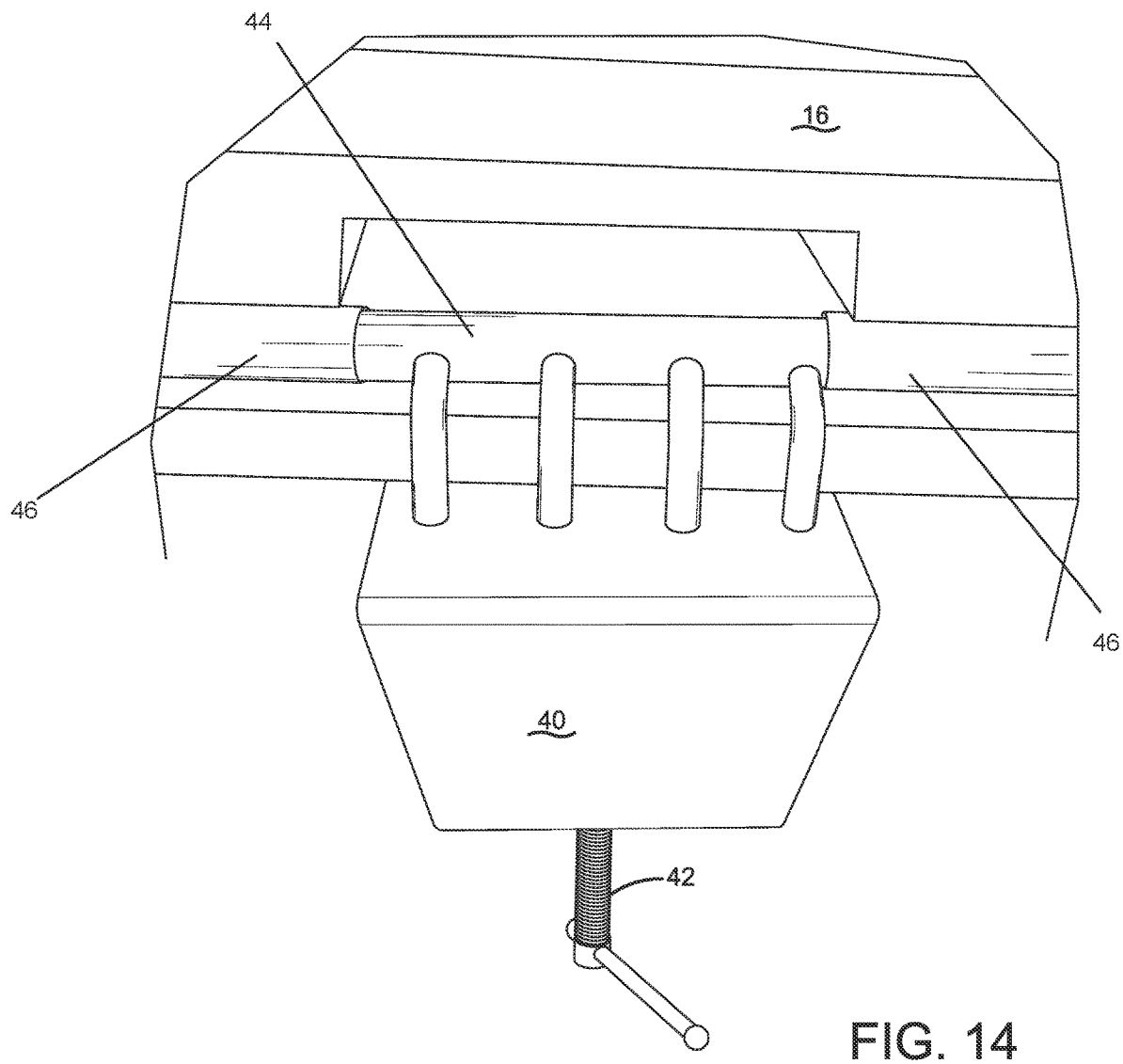
Figure 15:
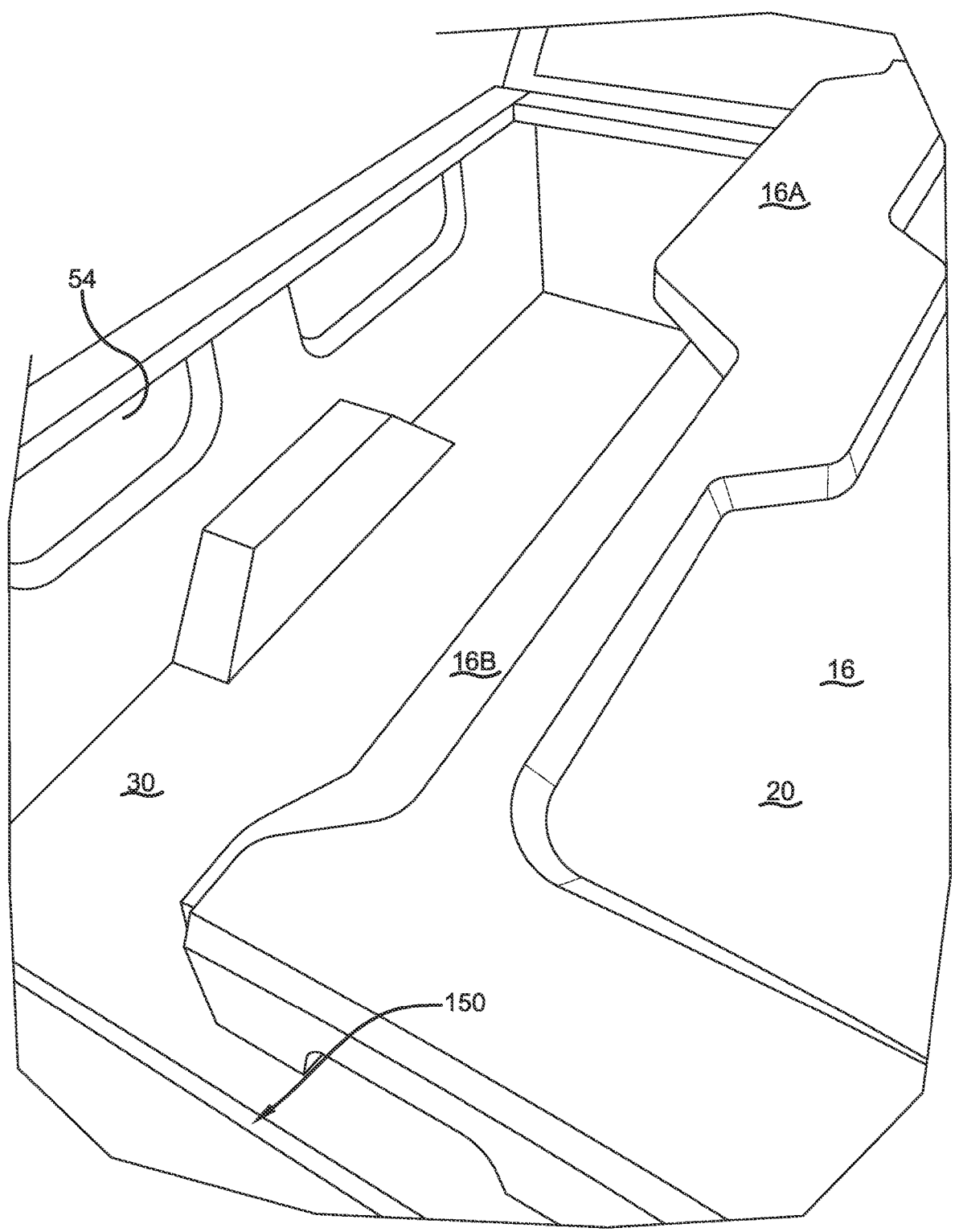
Figure 16:
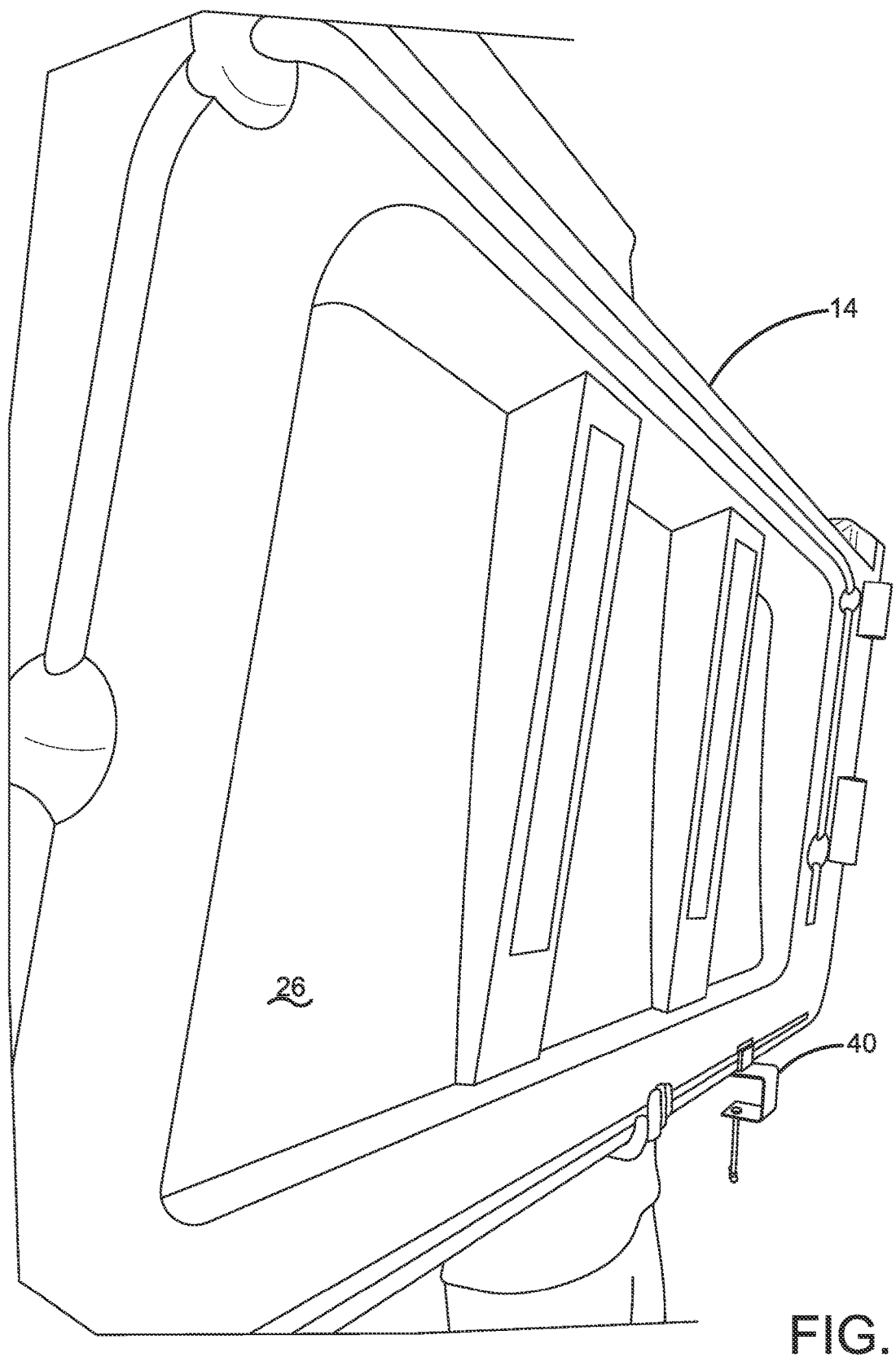
Figure 17:
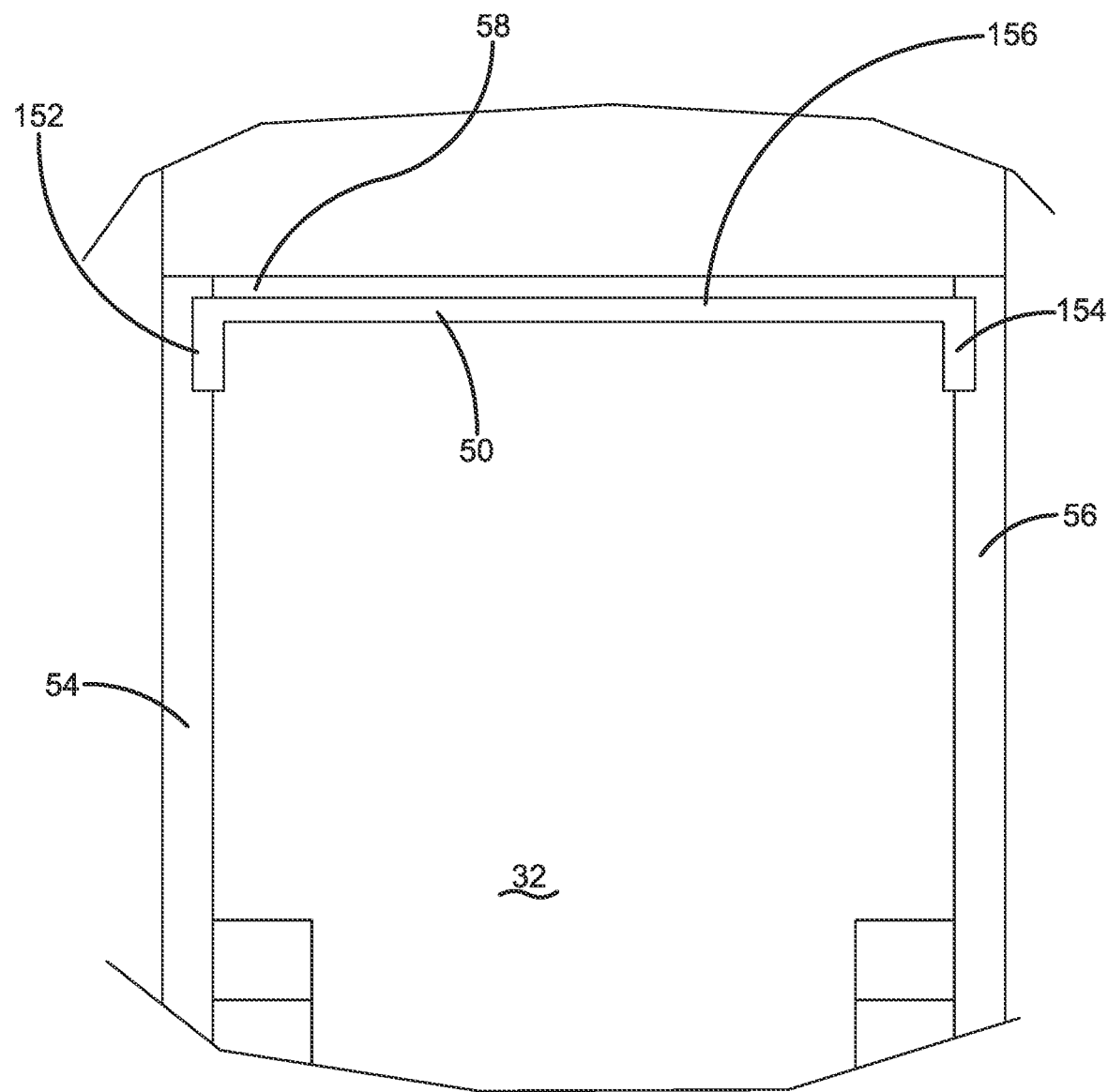
Figure 18:
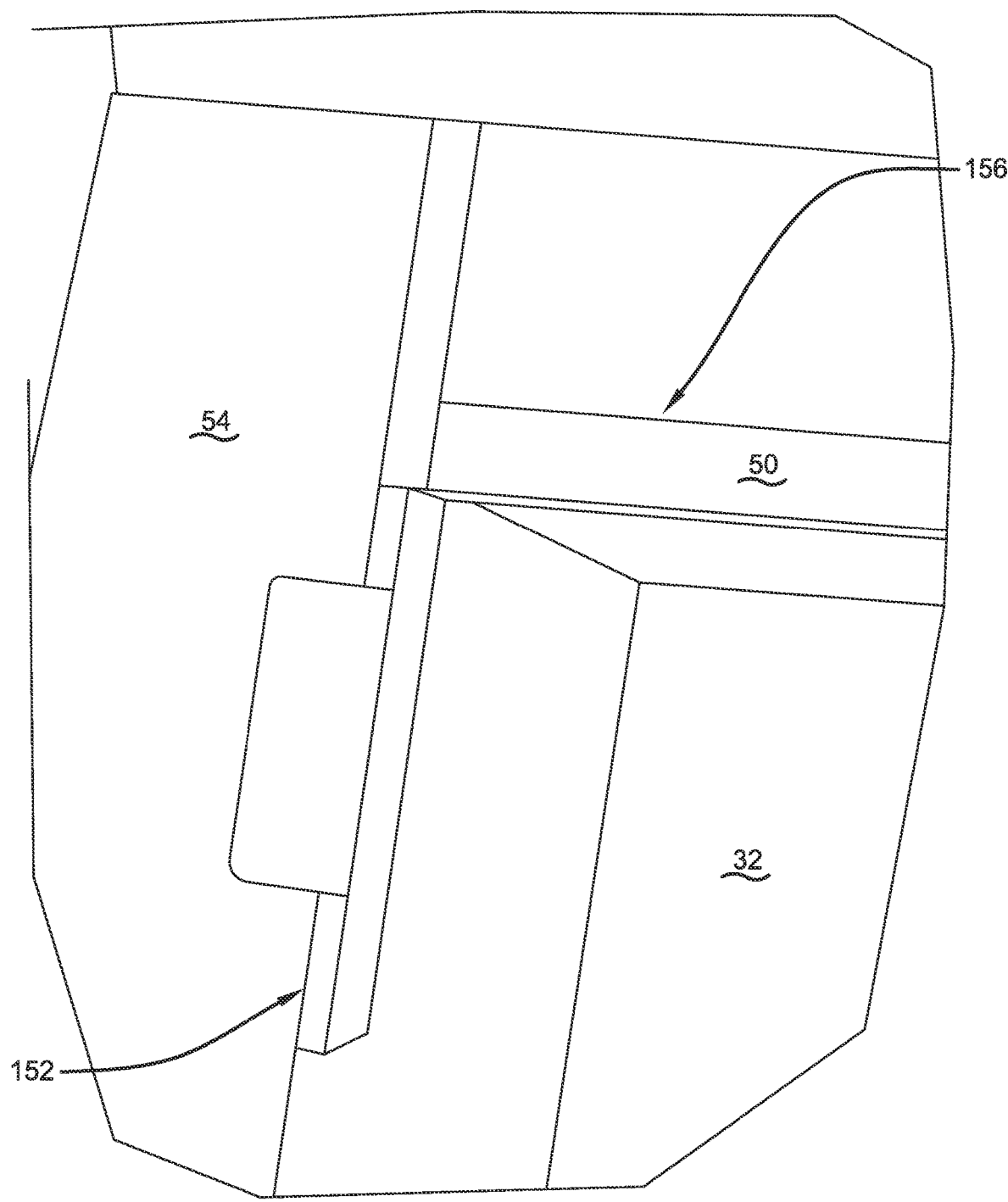
Figure 19:
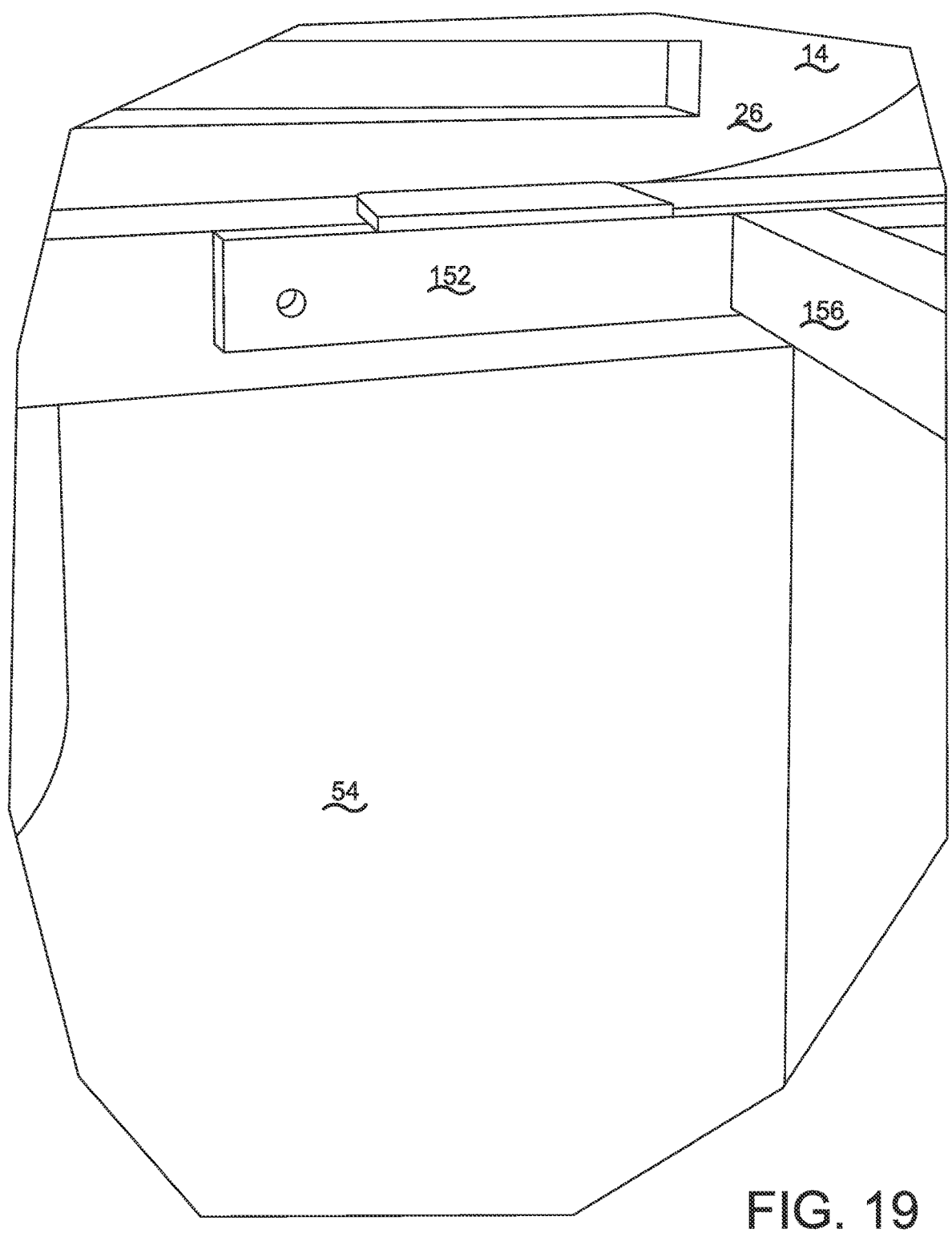
Figure 20:
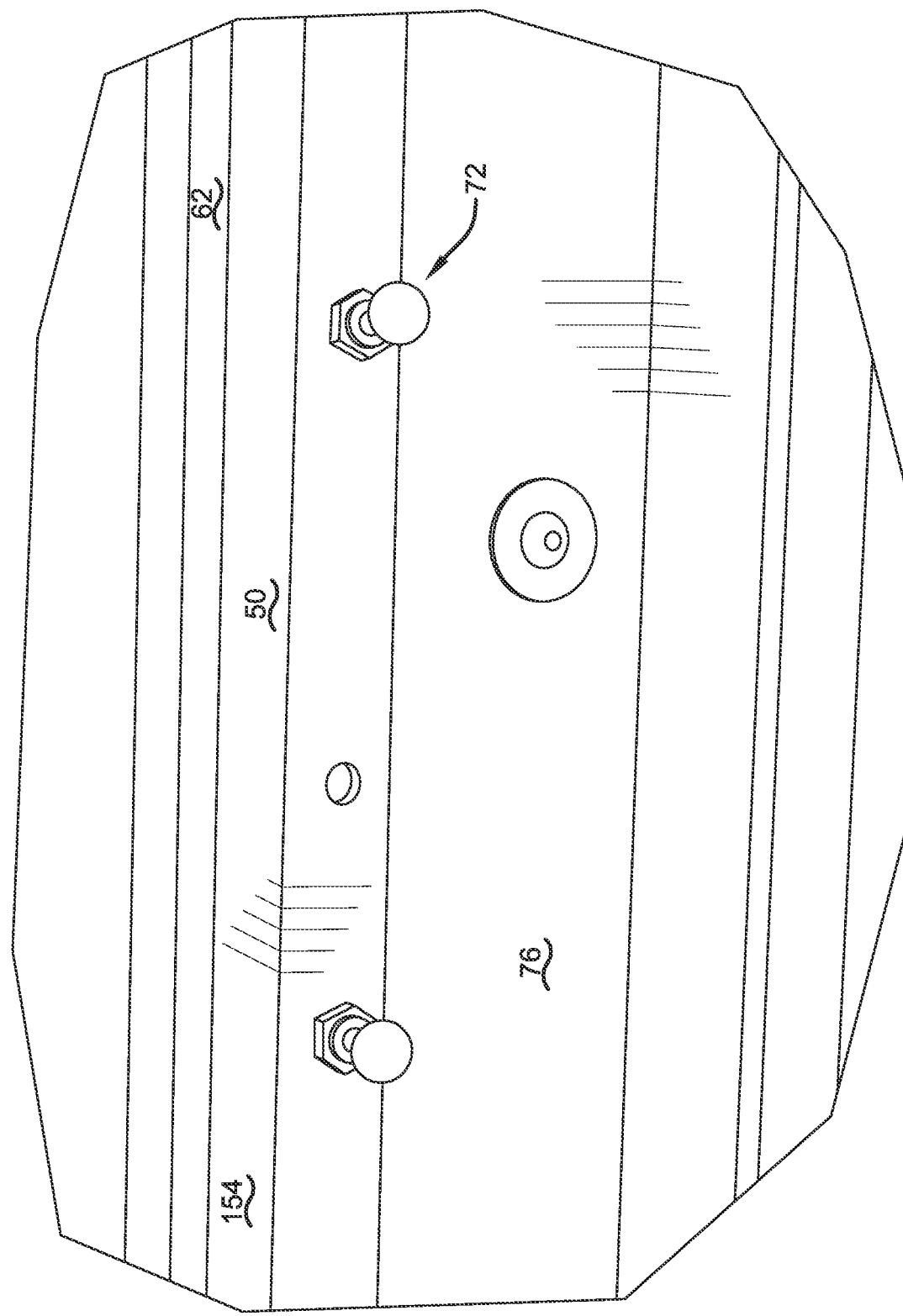
Figure 21:
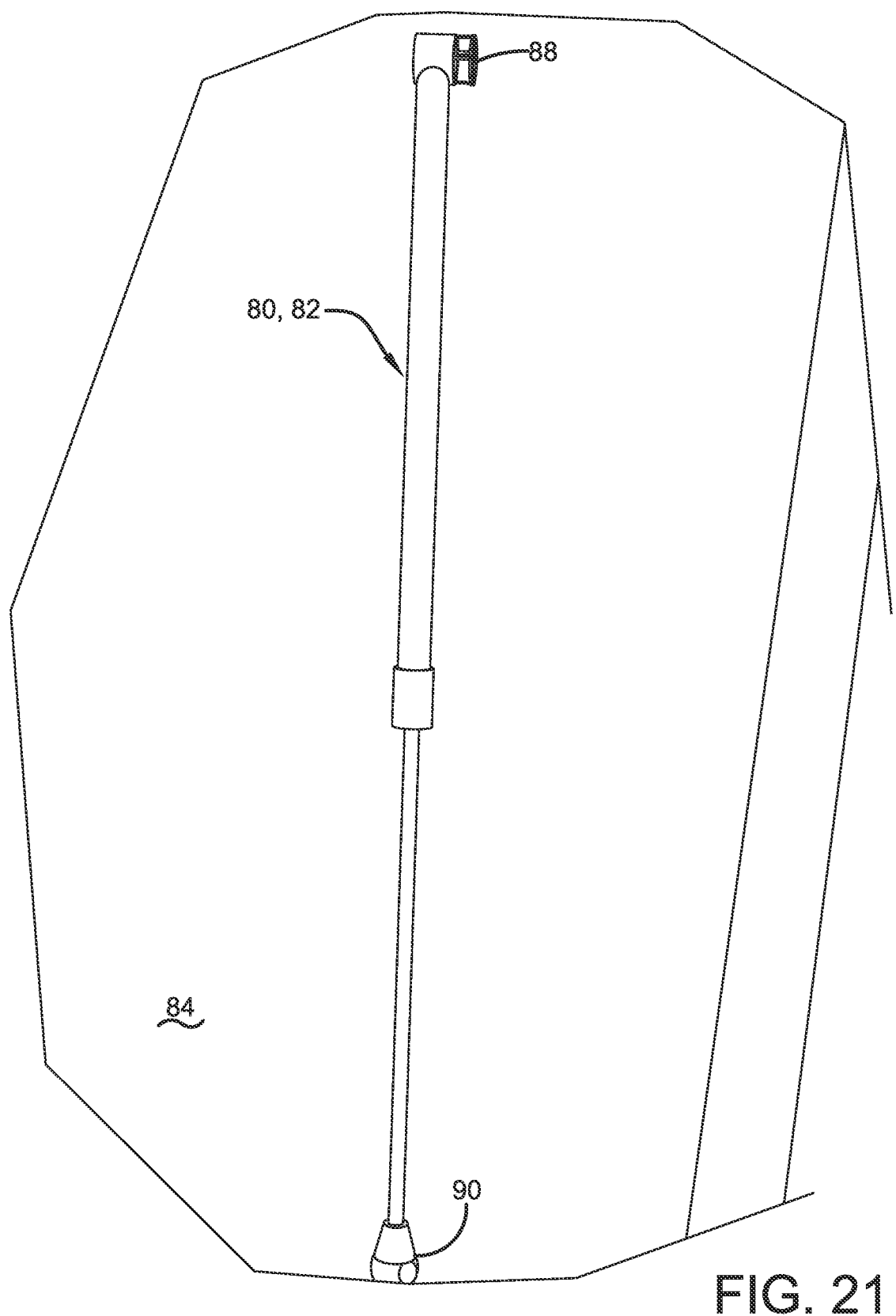
Figure 22:
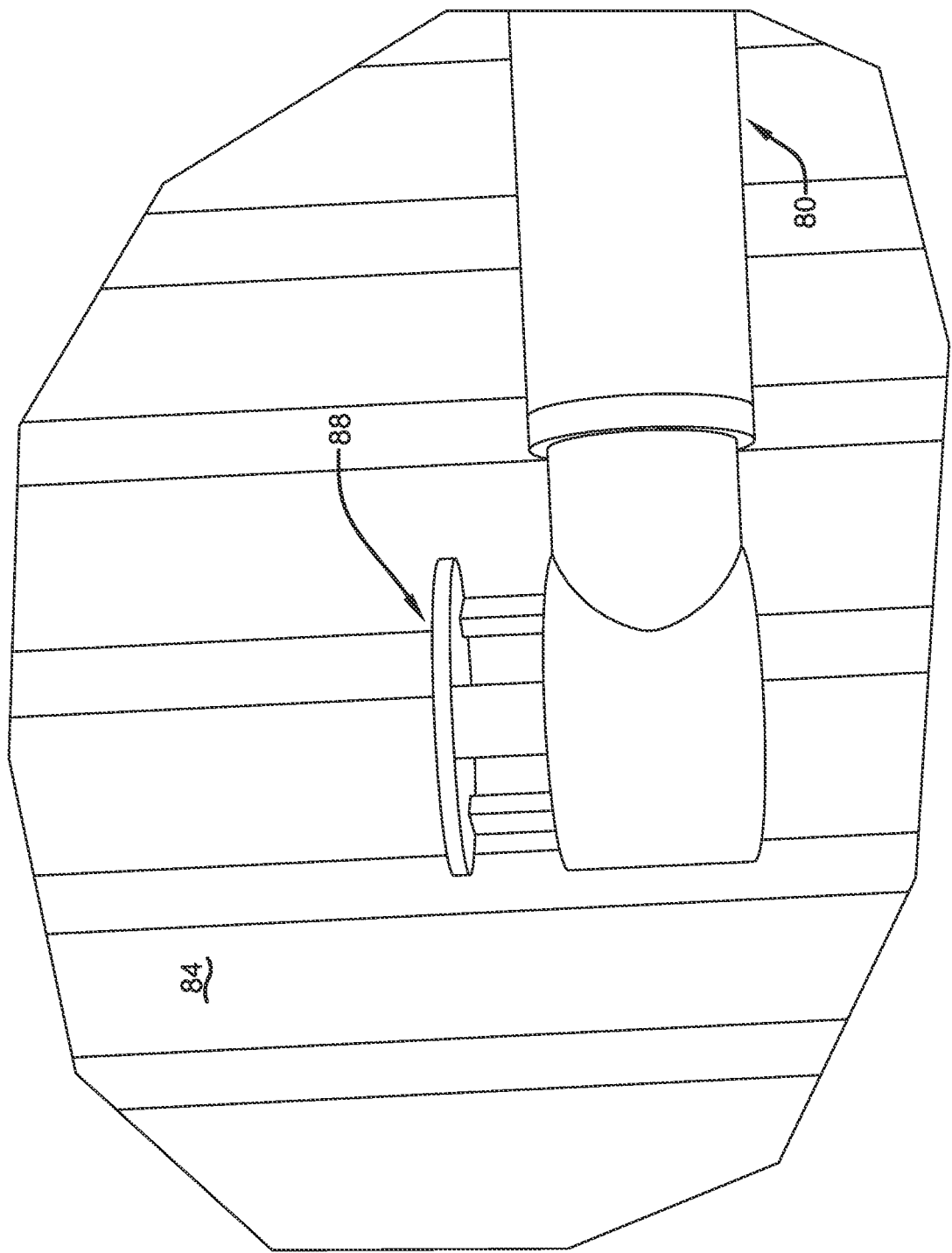
Figure 23:
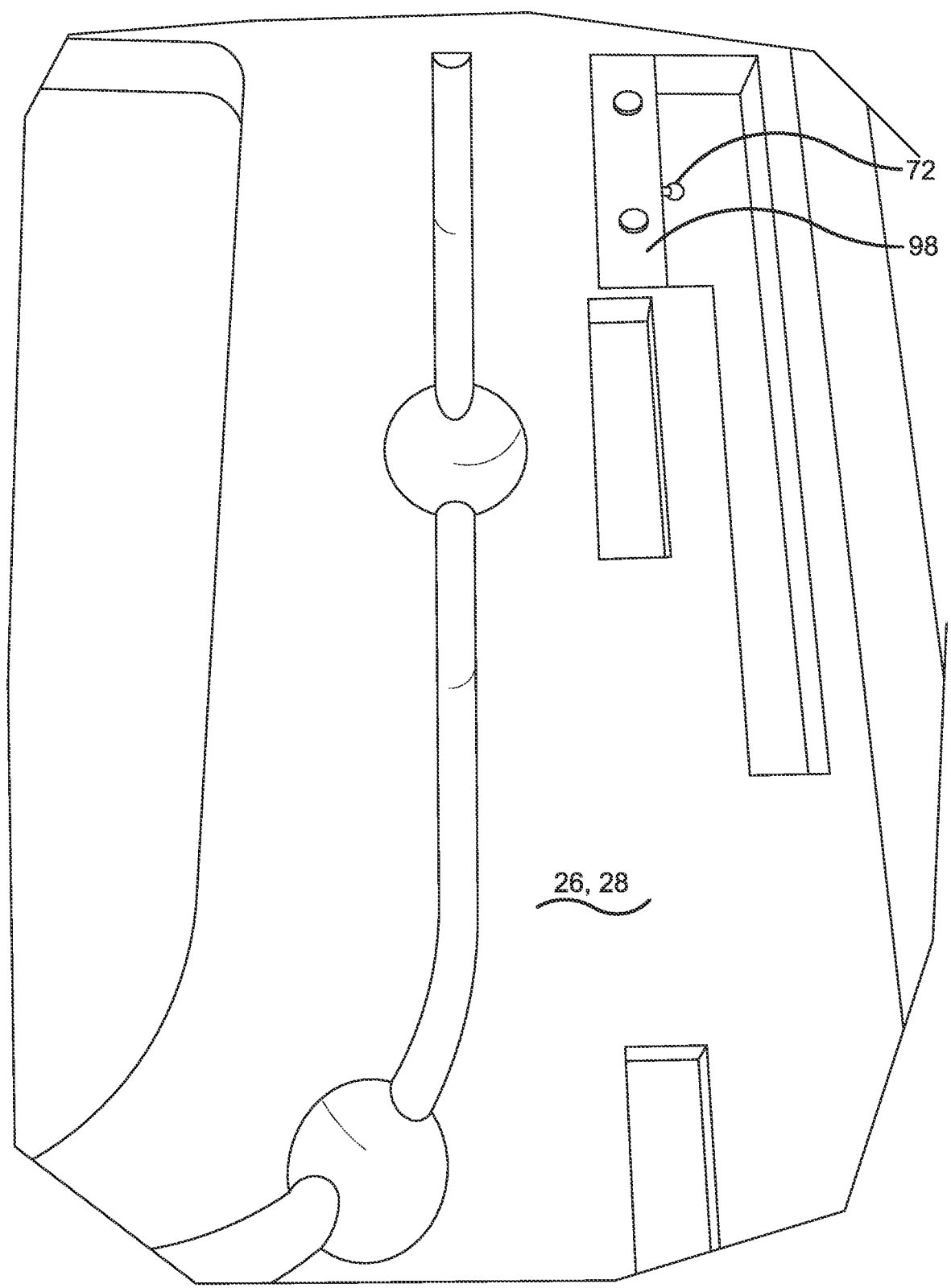
Figure 24:
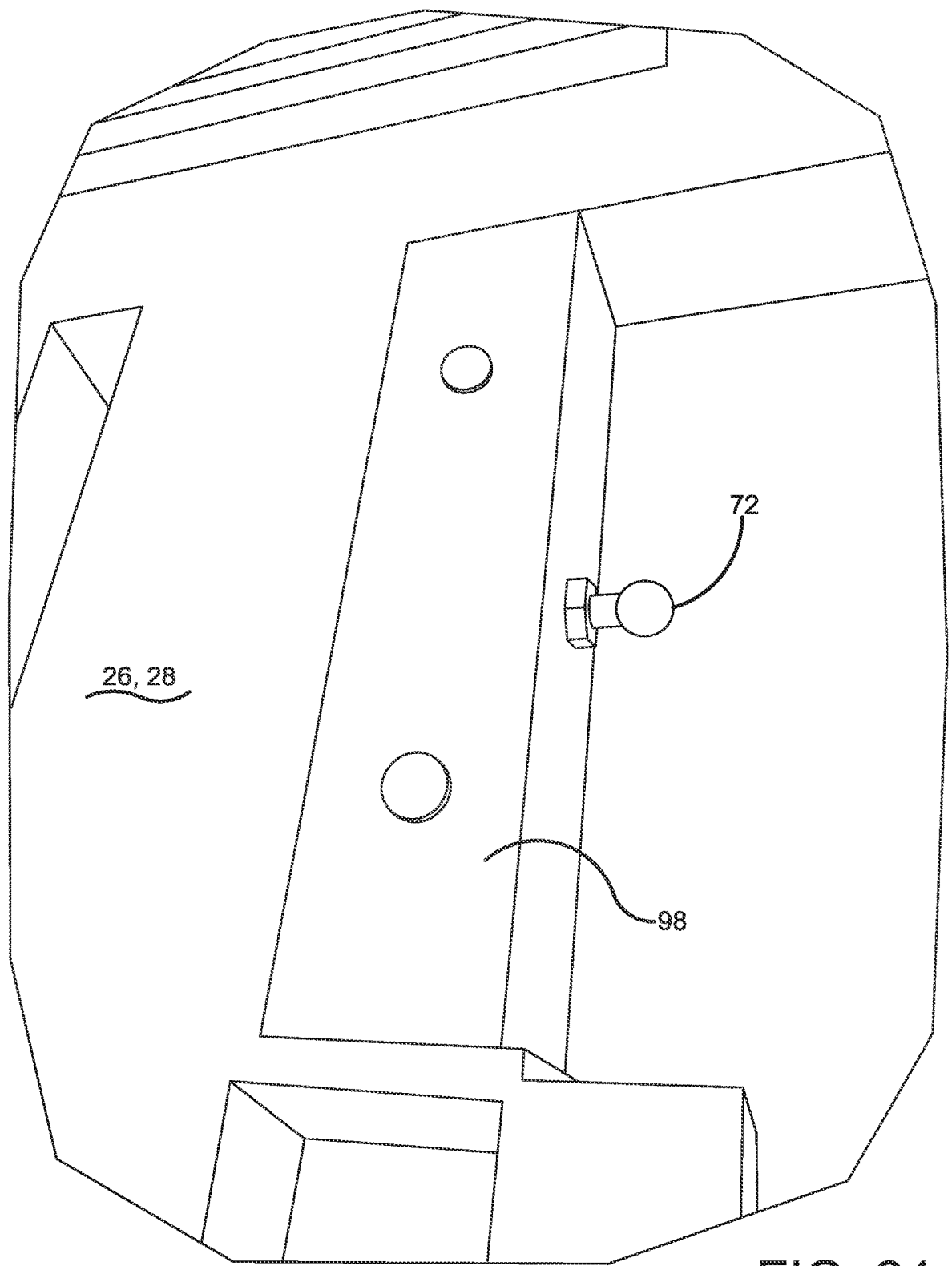
Figure 25:
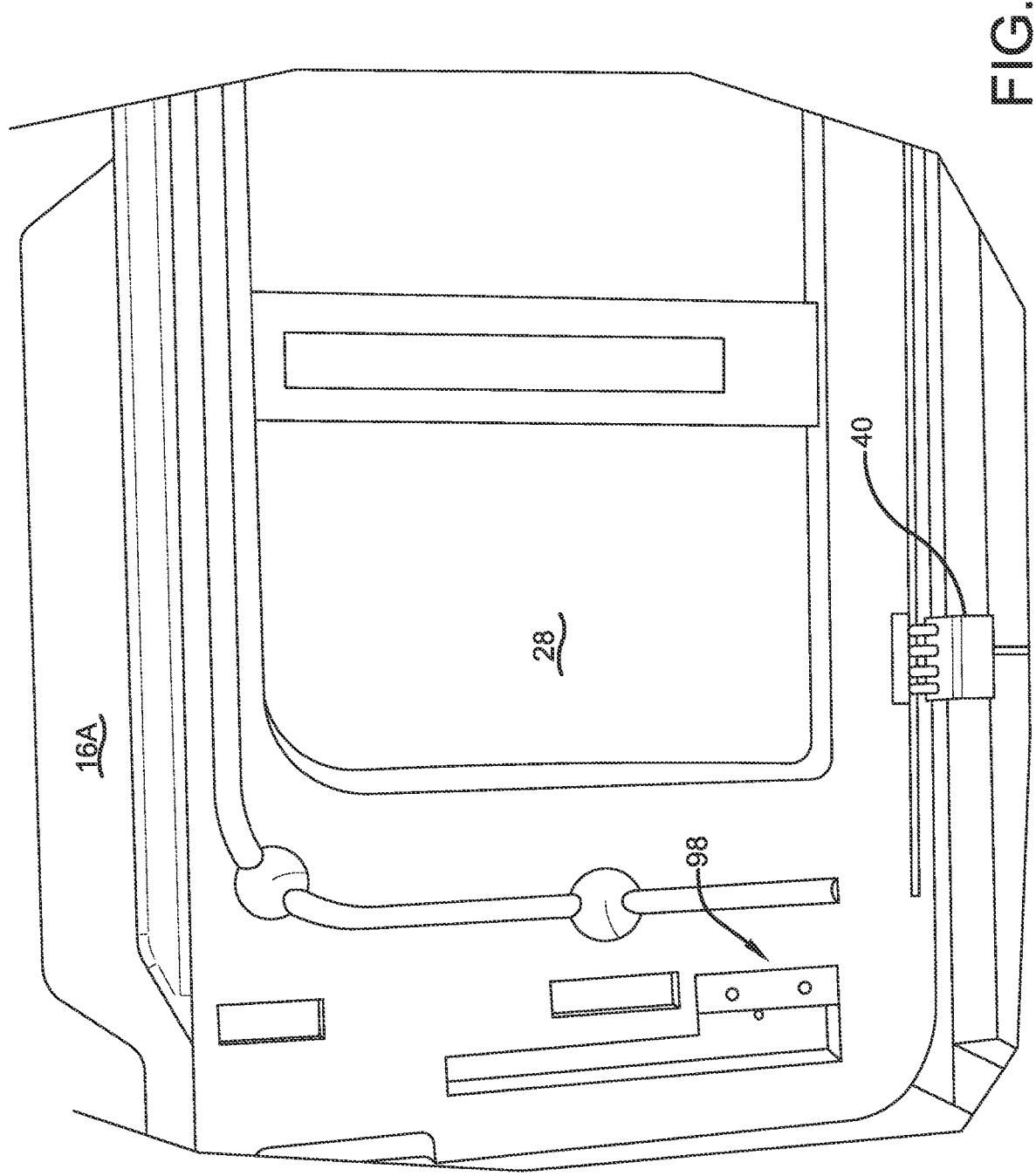
Figure 26:
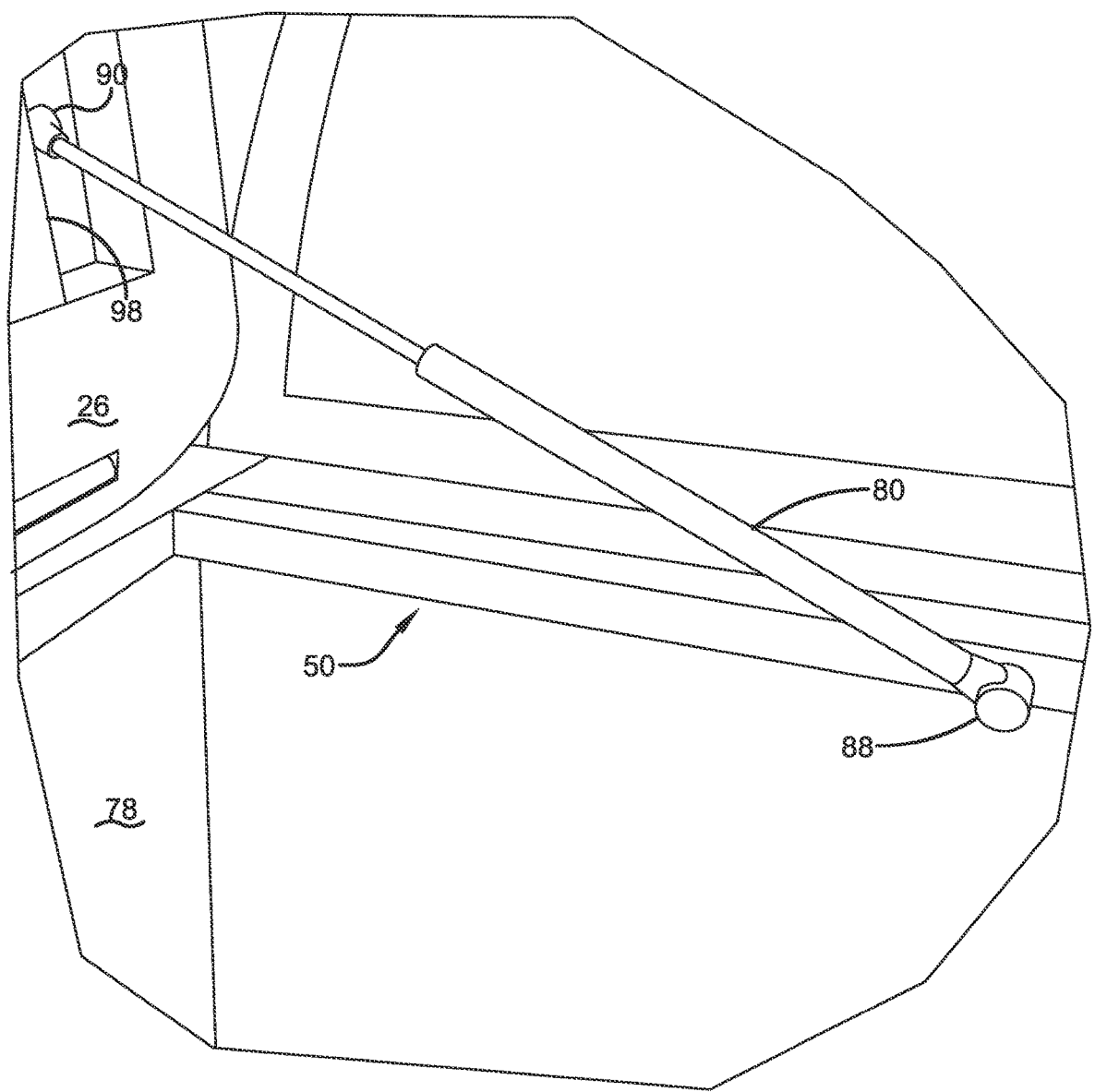
Figure 27:
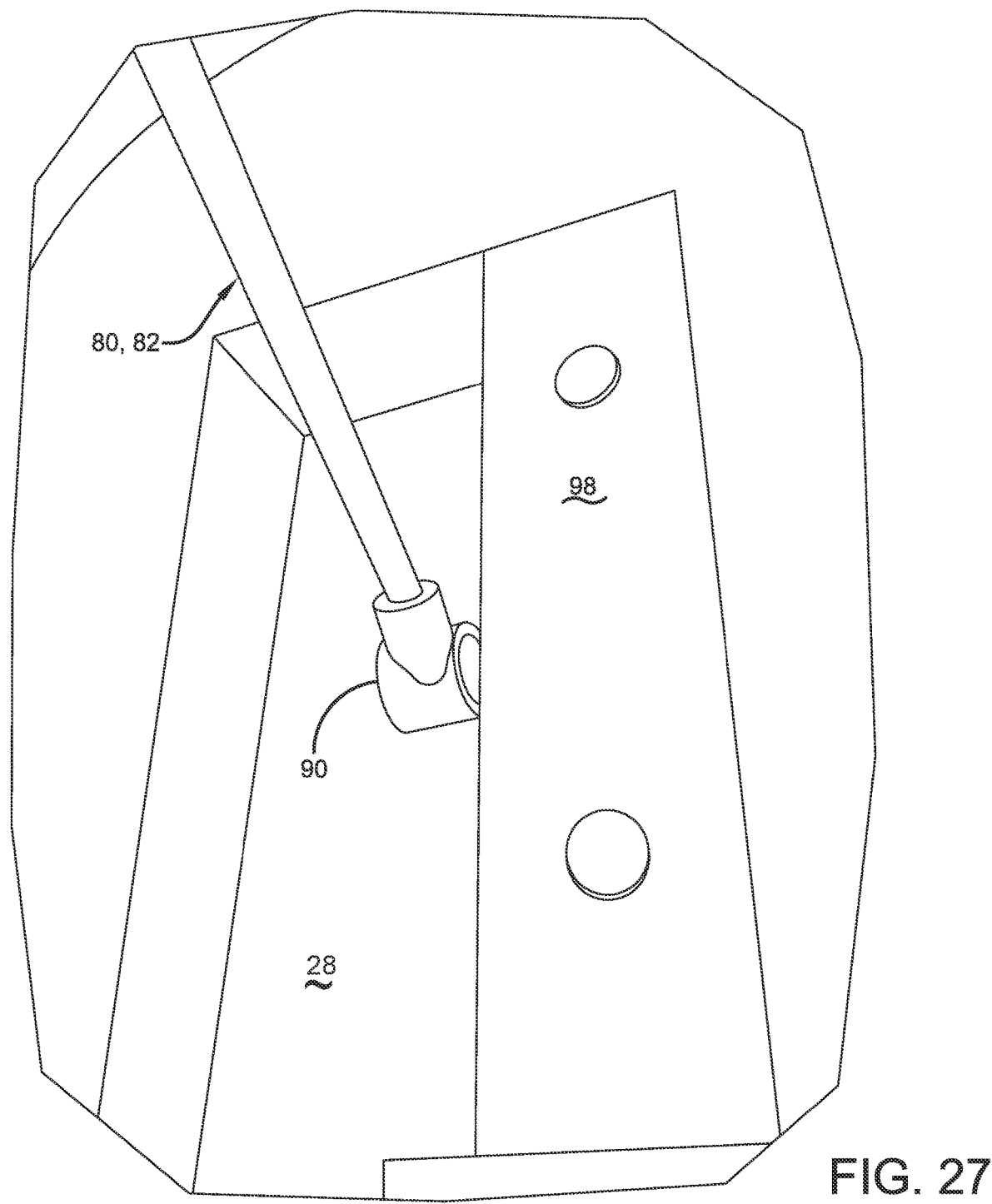
Figure 28:
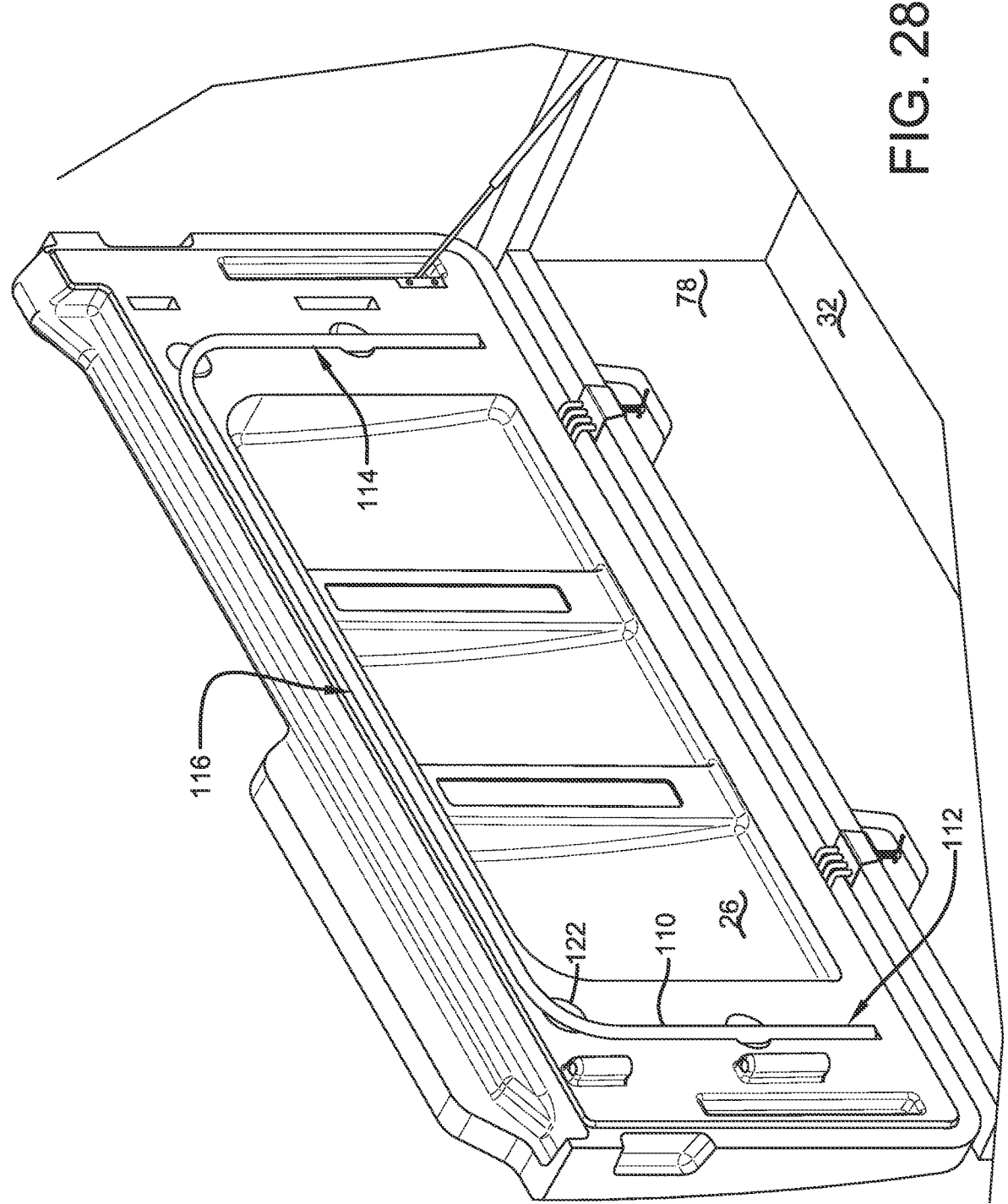
Figure 29:
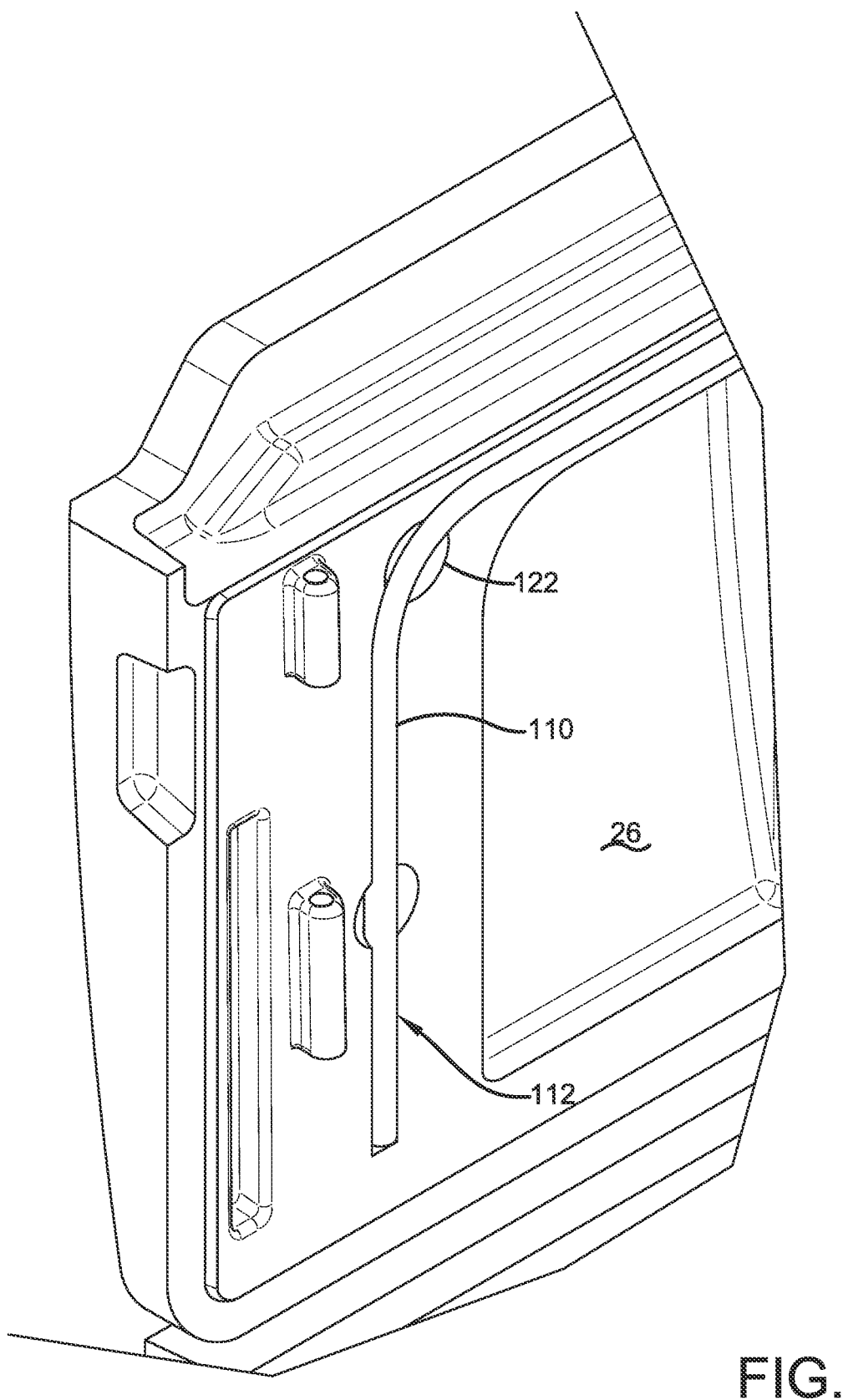
Figure 30:
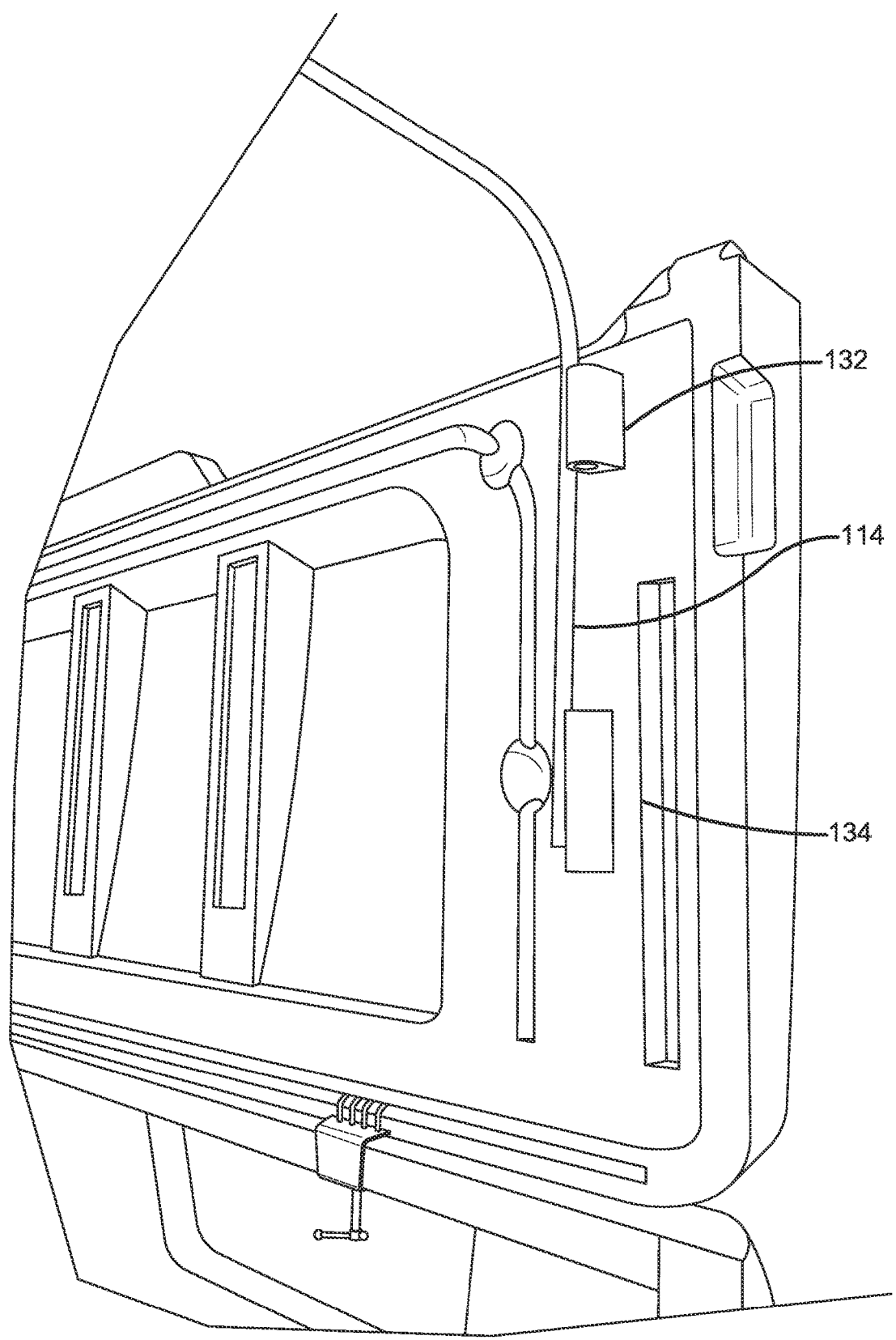
Figure 31:
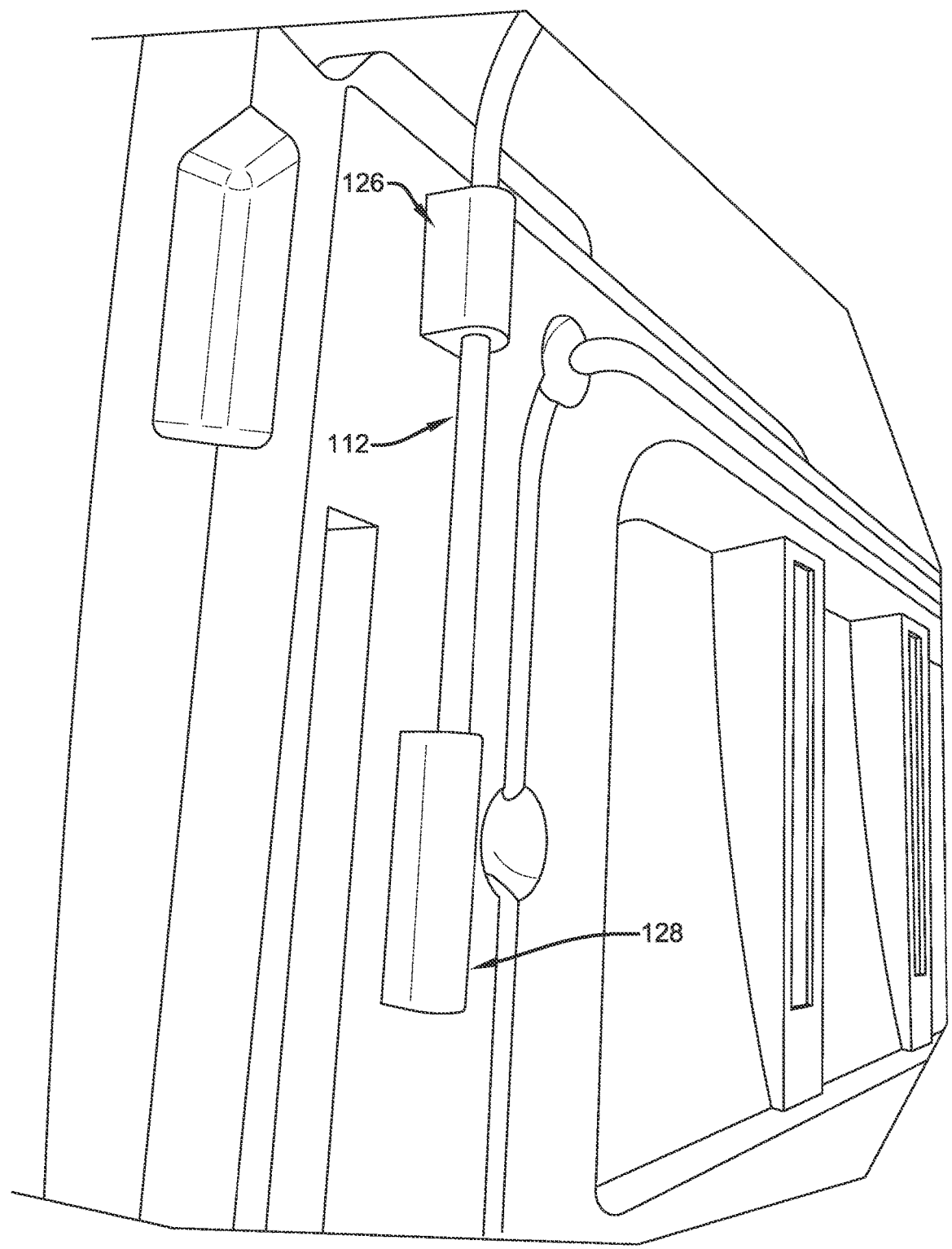
Figure 32:
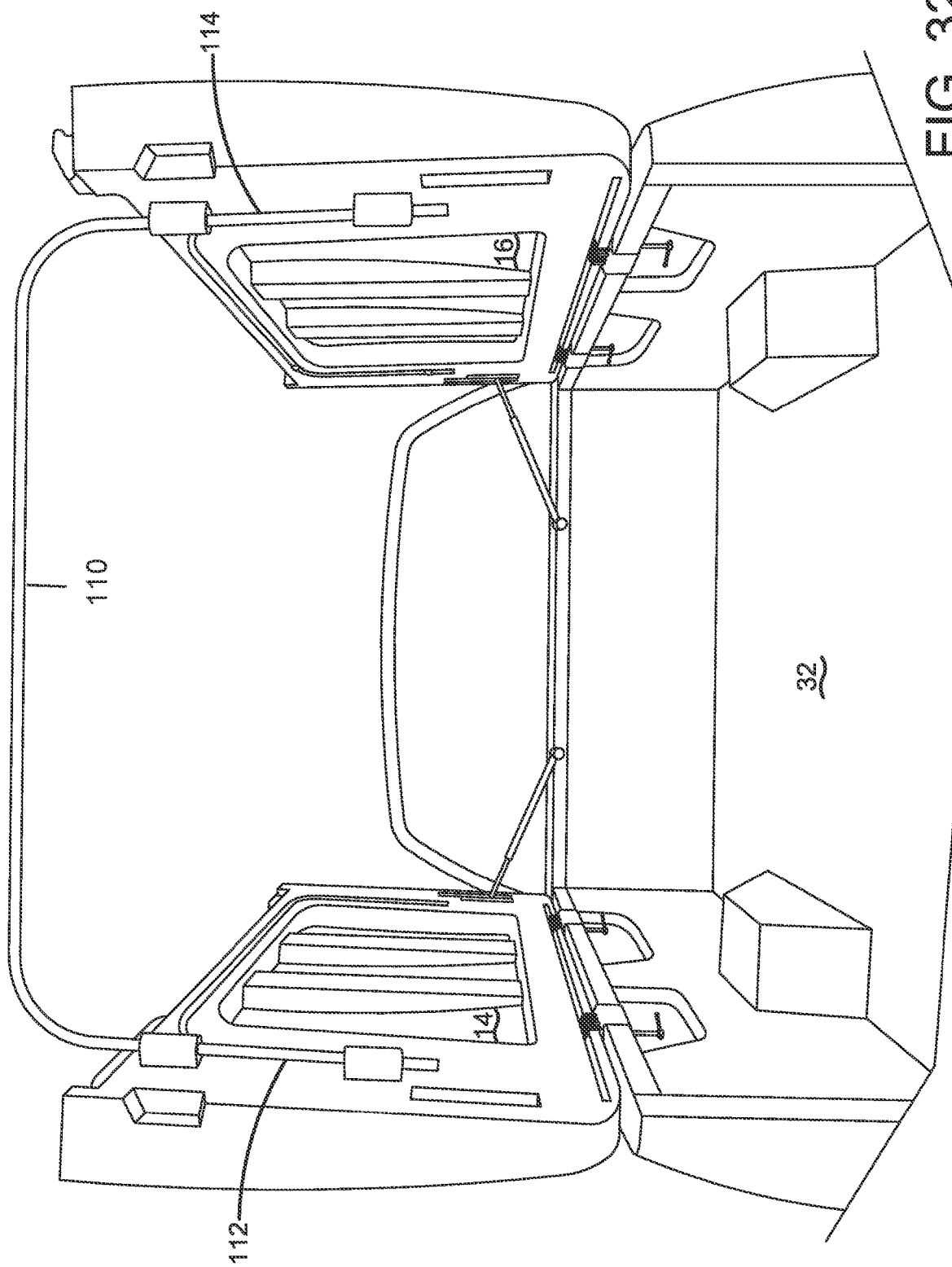
Figure 33:
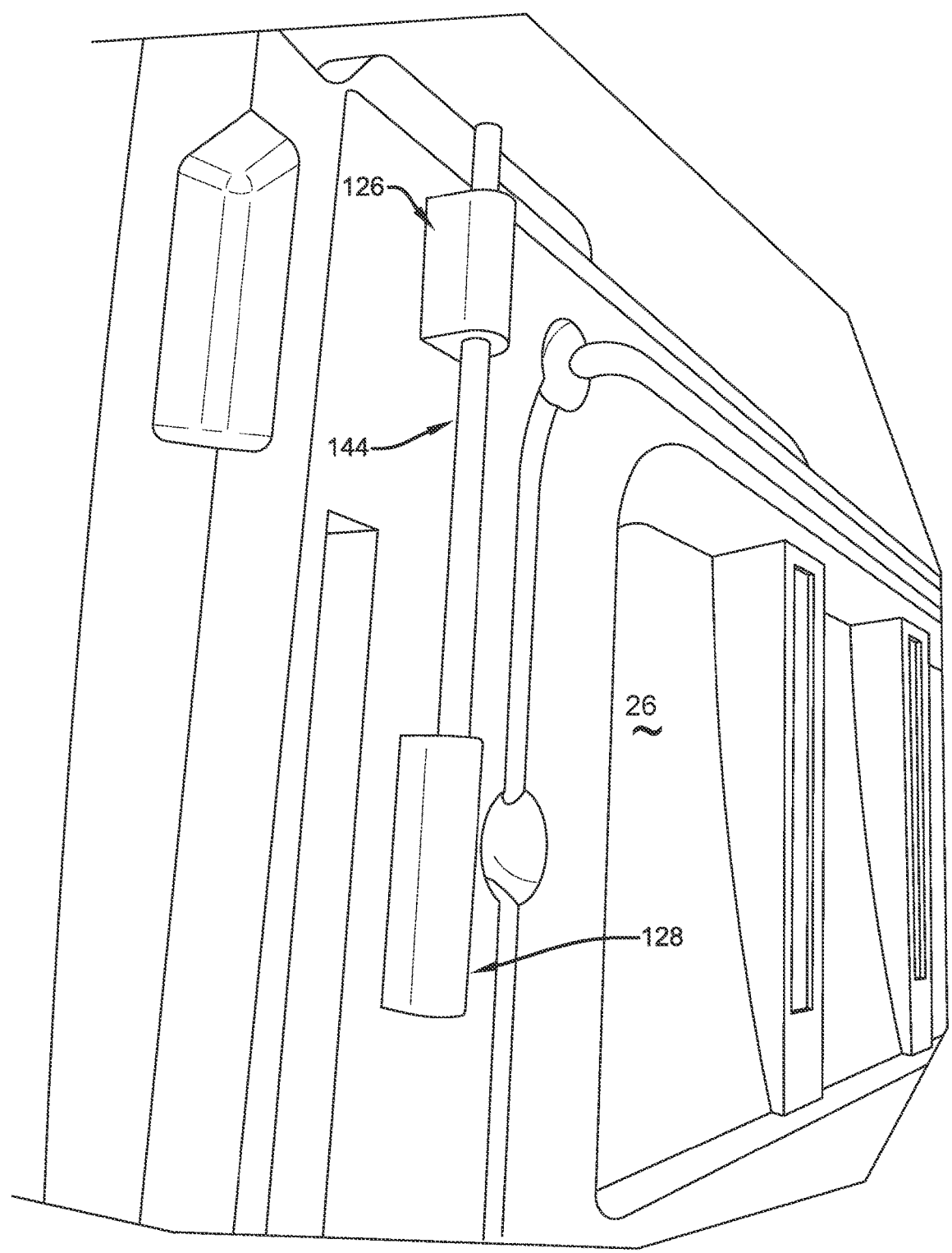
Figure 34:
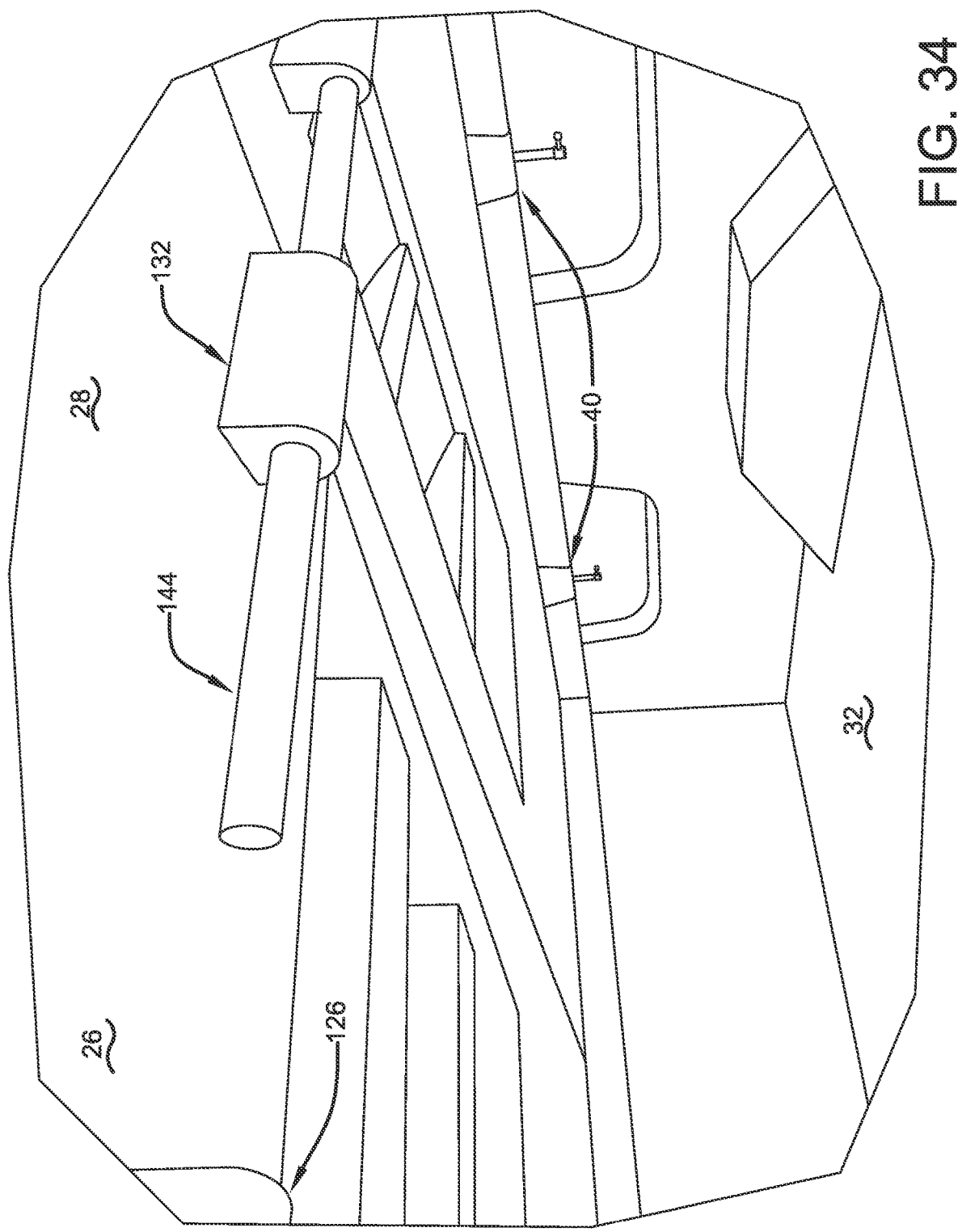
Figure 35:
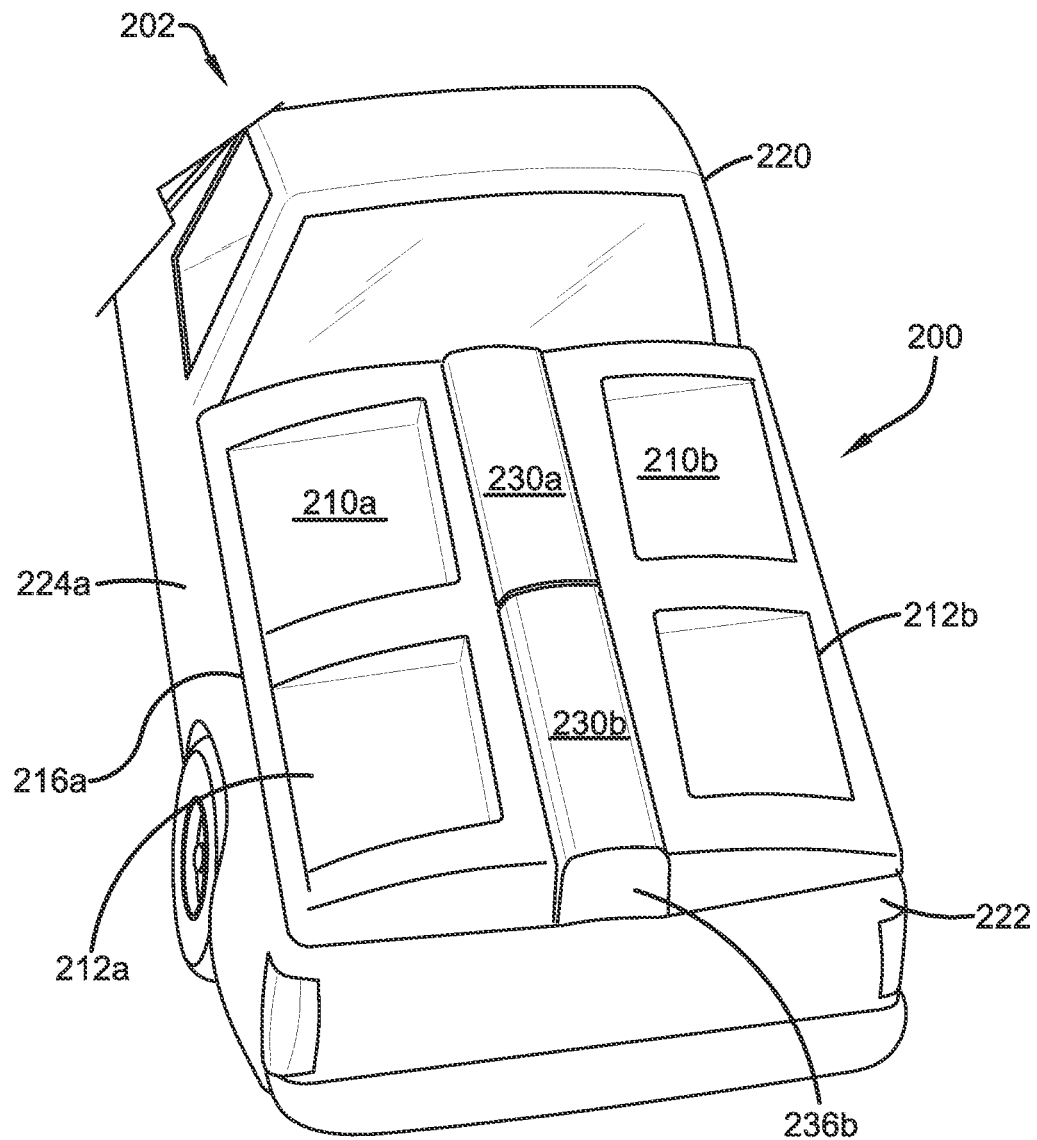
Figure 36:
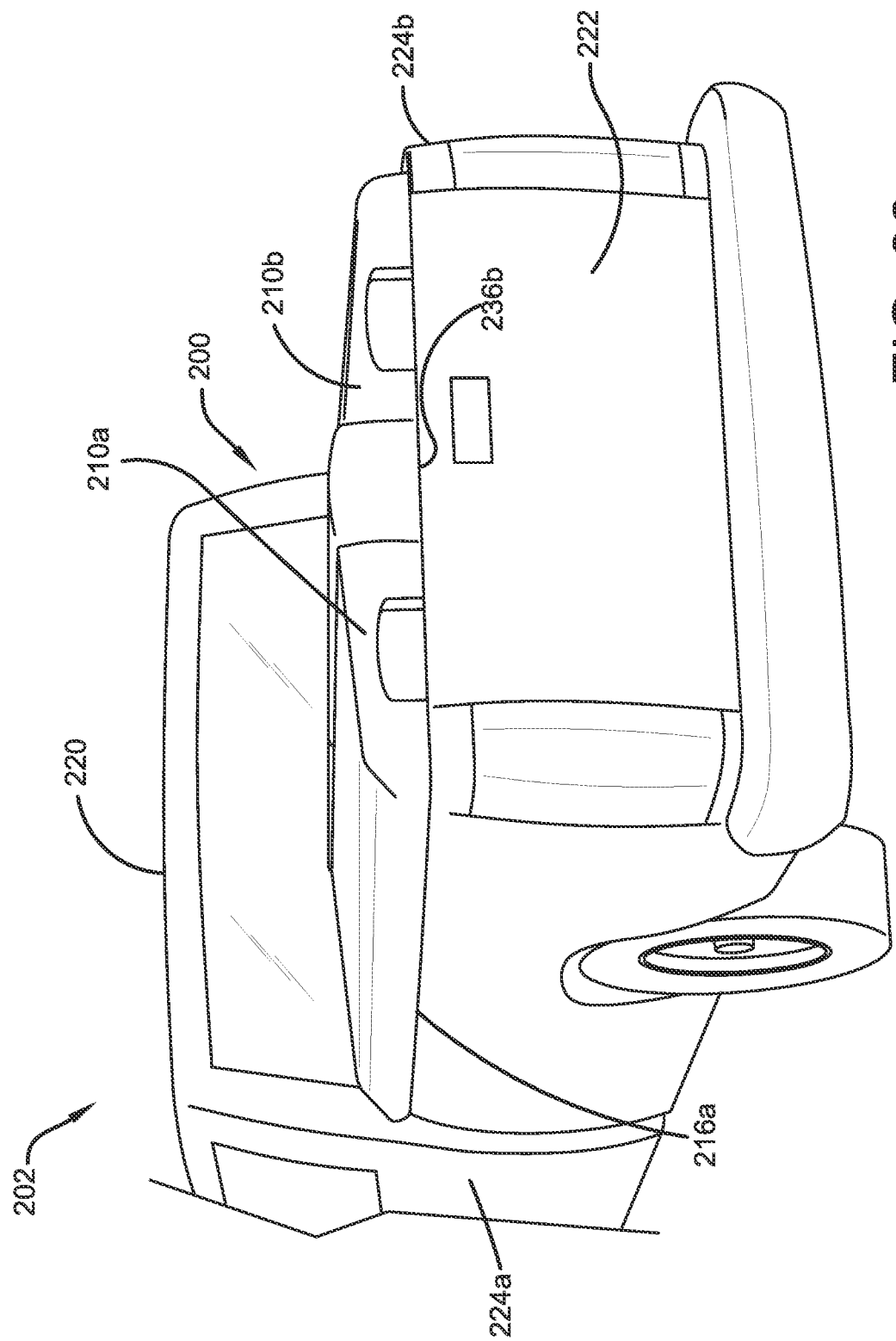
Figure 37:
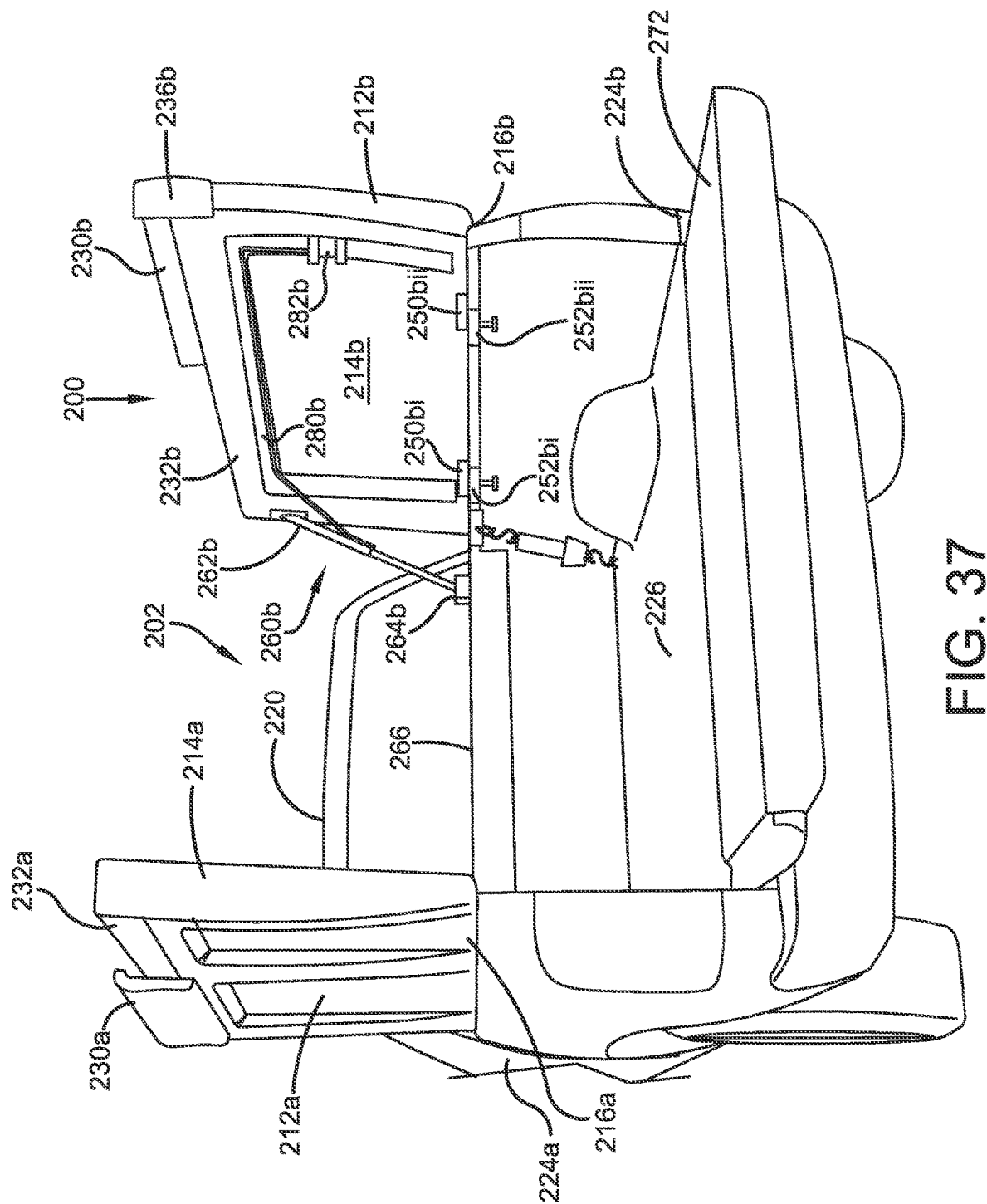
Figure 38:
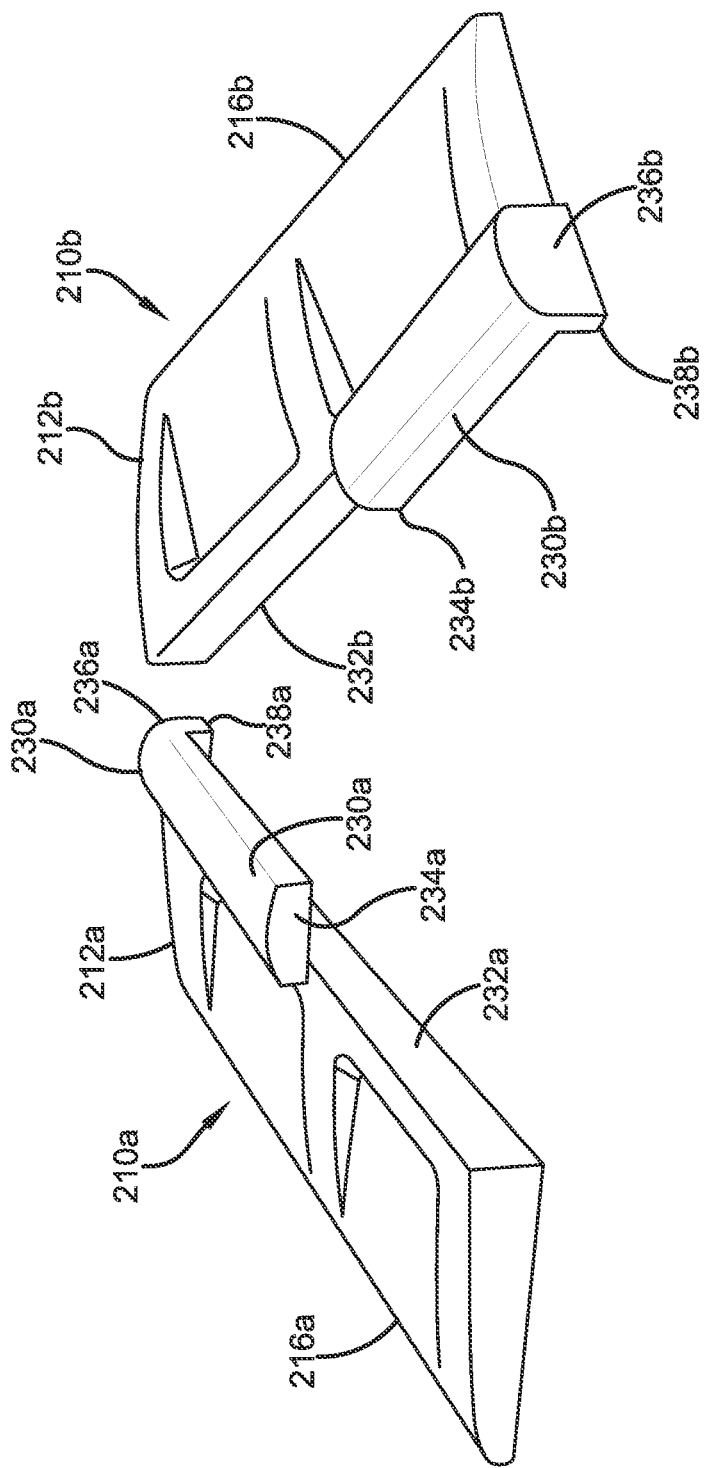
Figure 39:
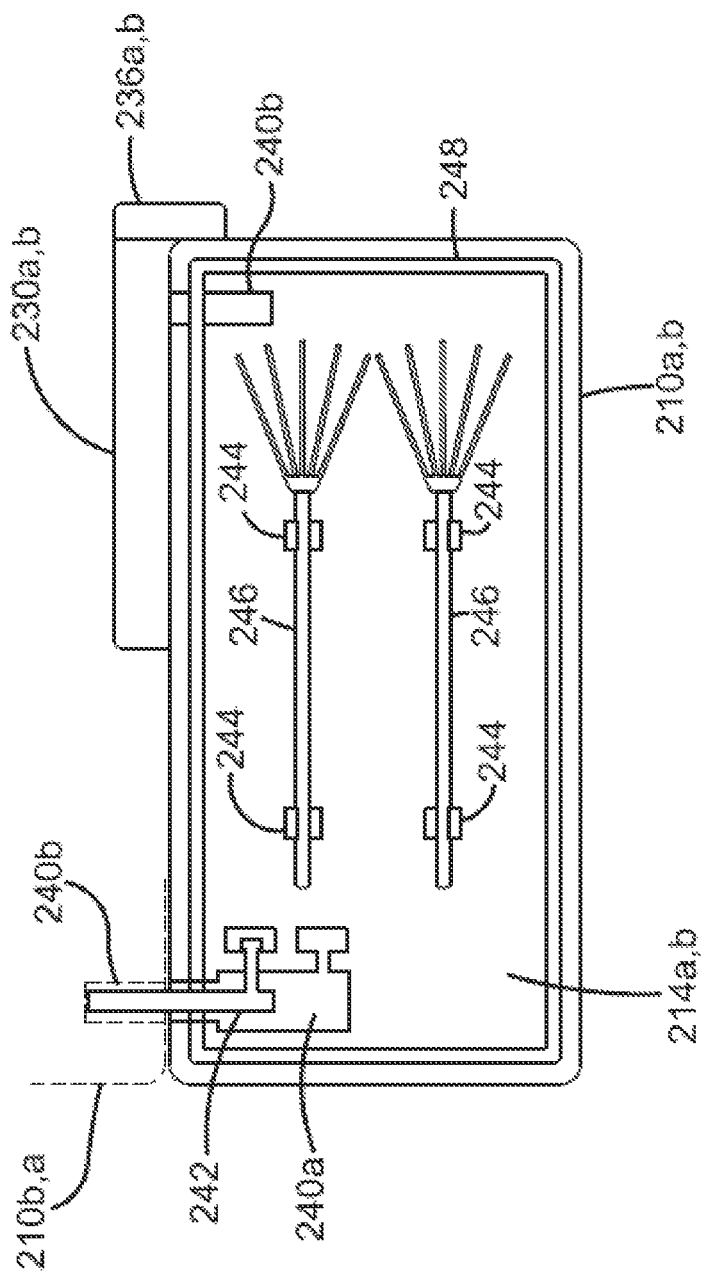
Figure 40:
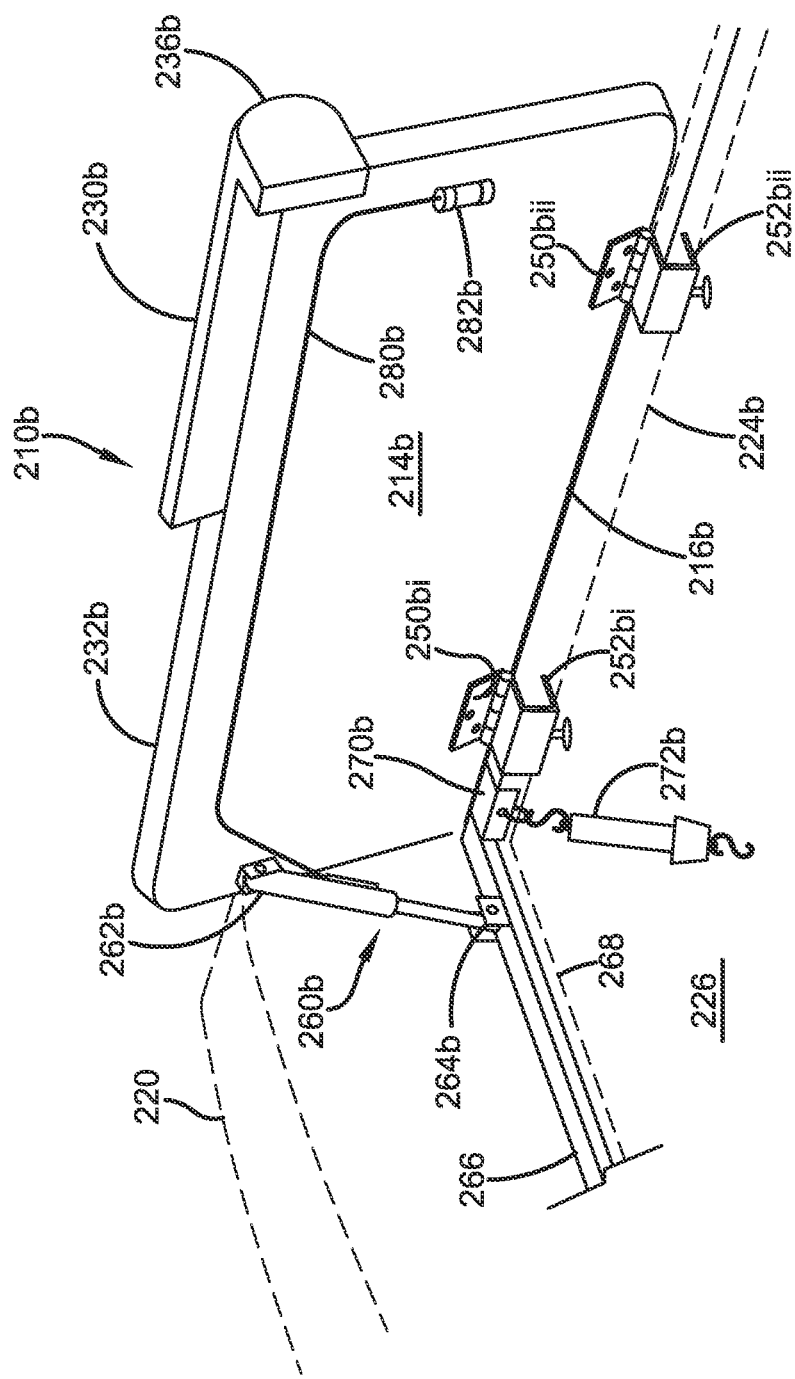
Figure 41:
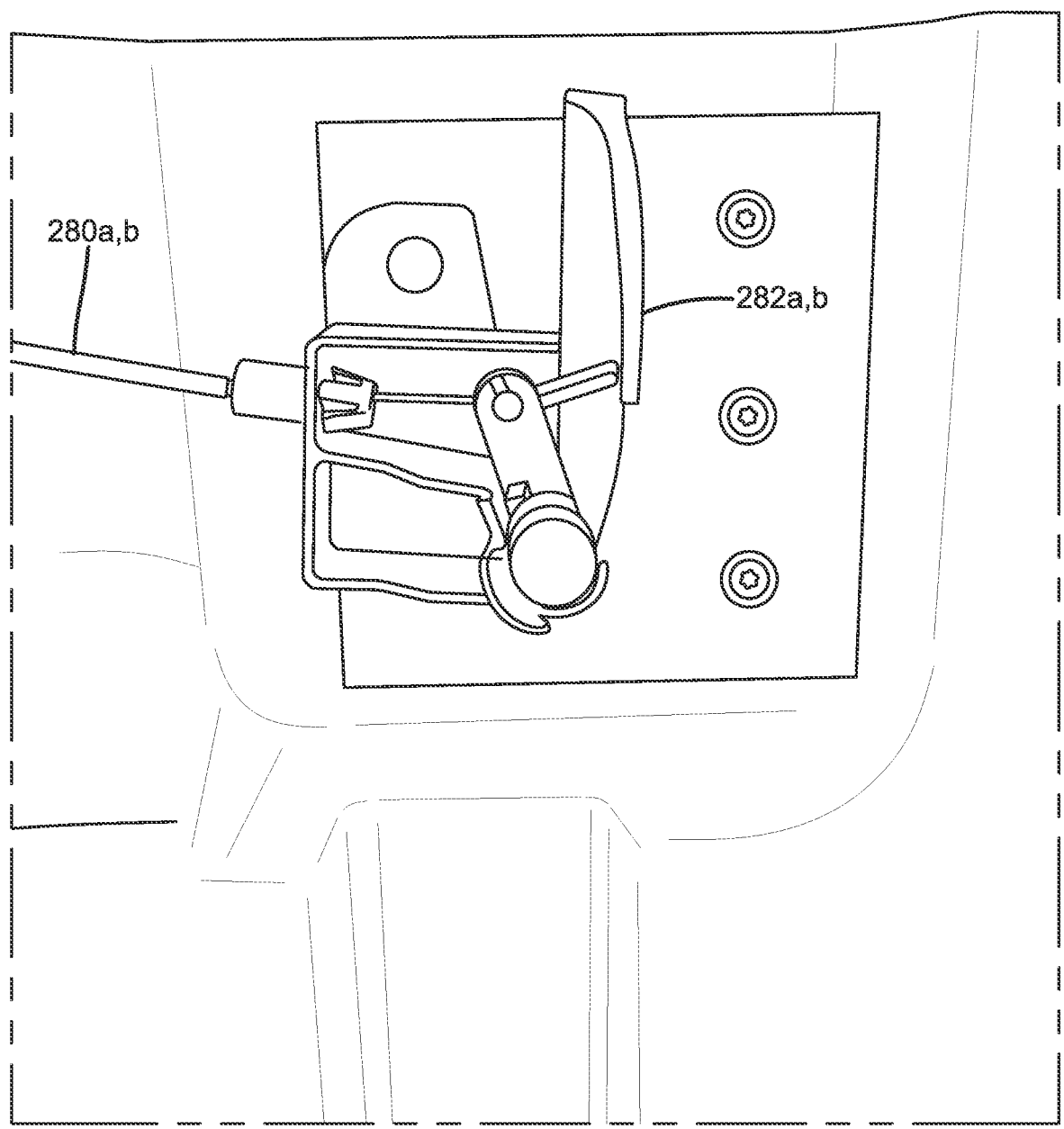
Figures 43A, 43B:
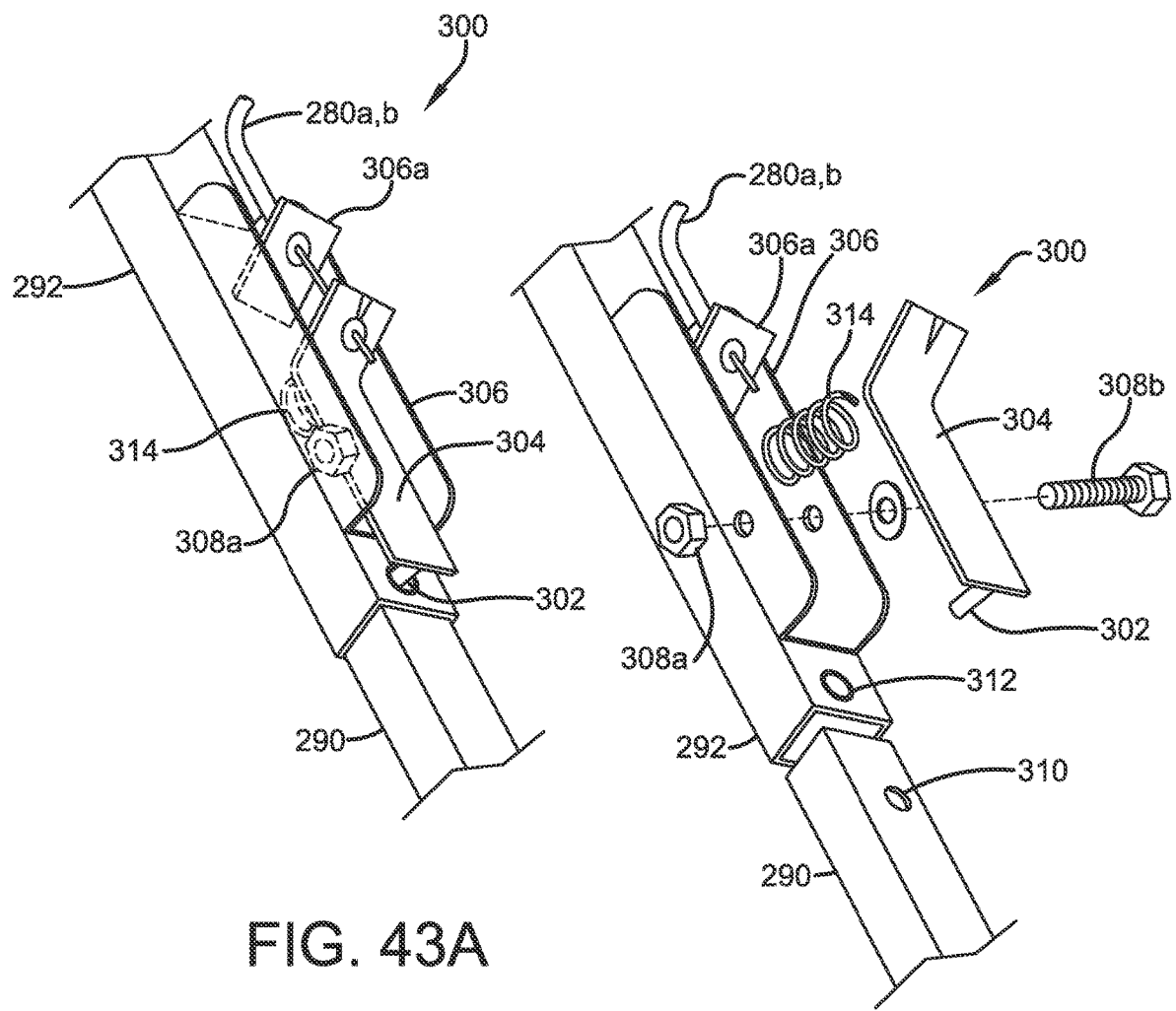
Figure 45A:
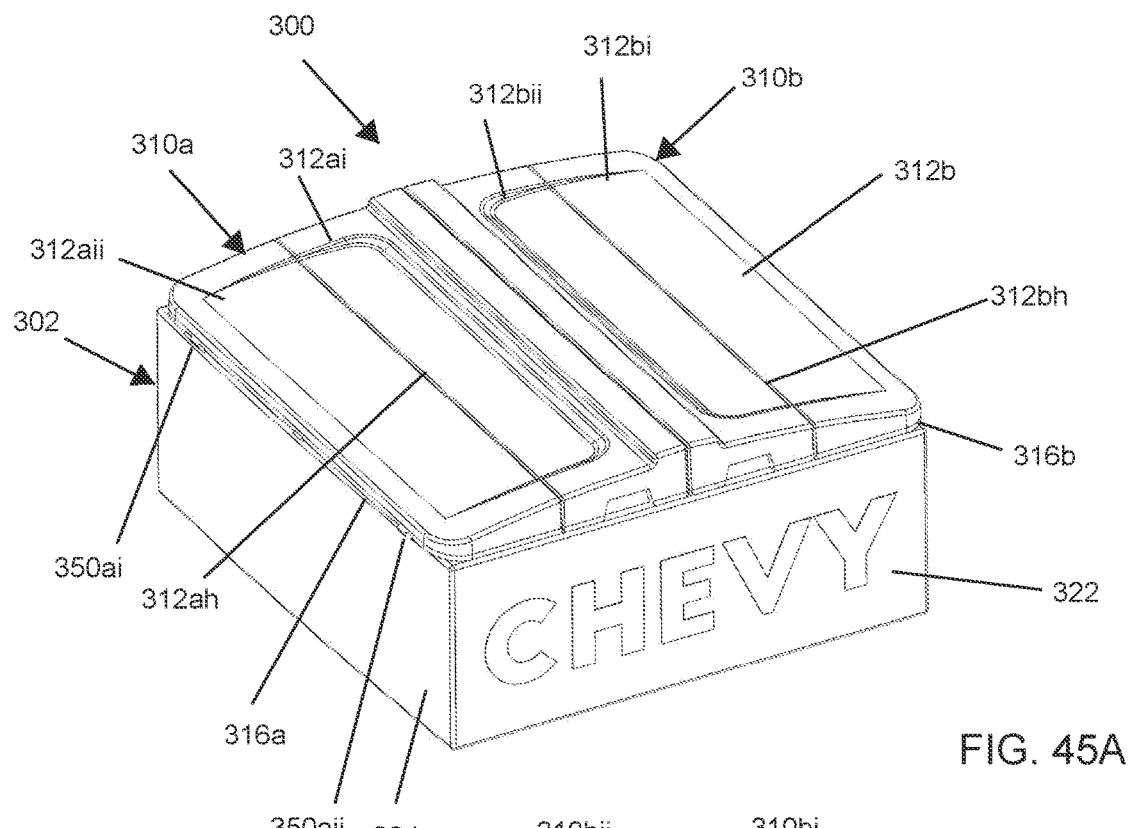
Figure 45B:
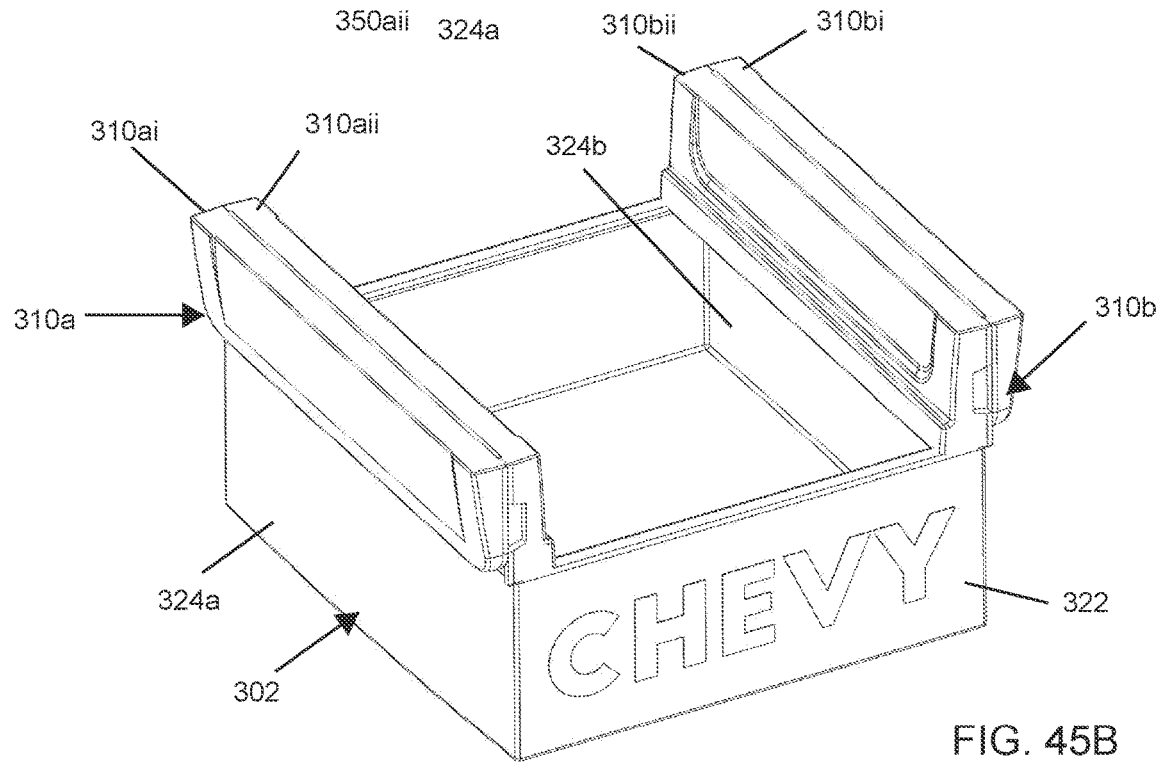
Figure 46A:
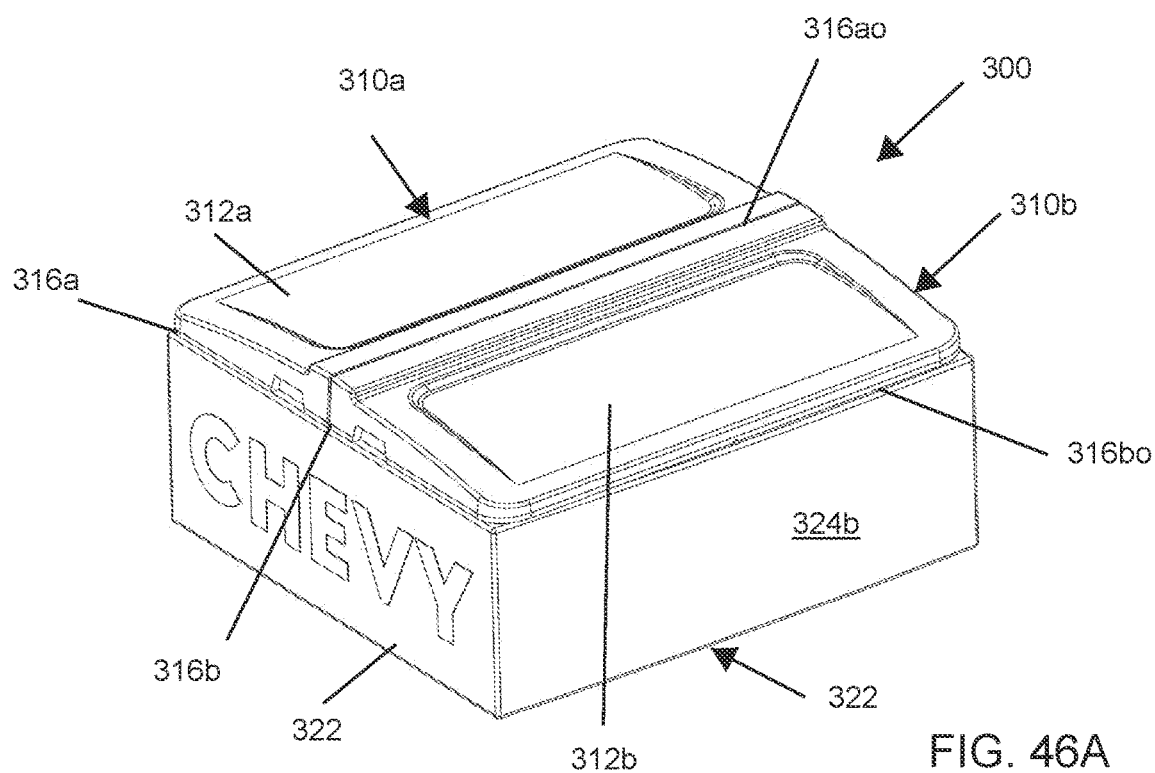
Figure 46B:
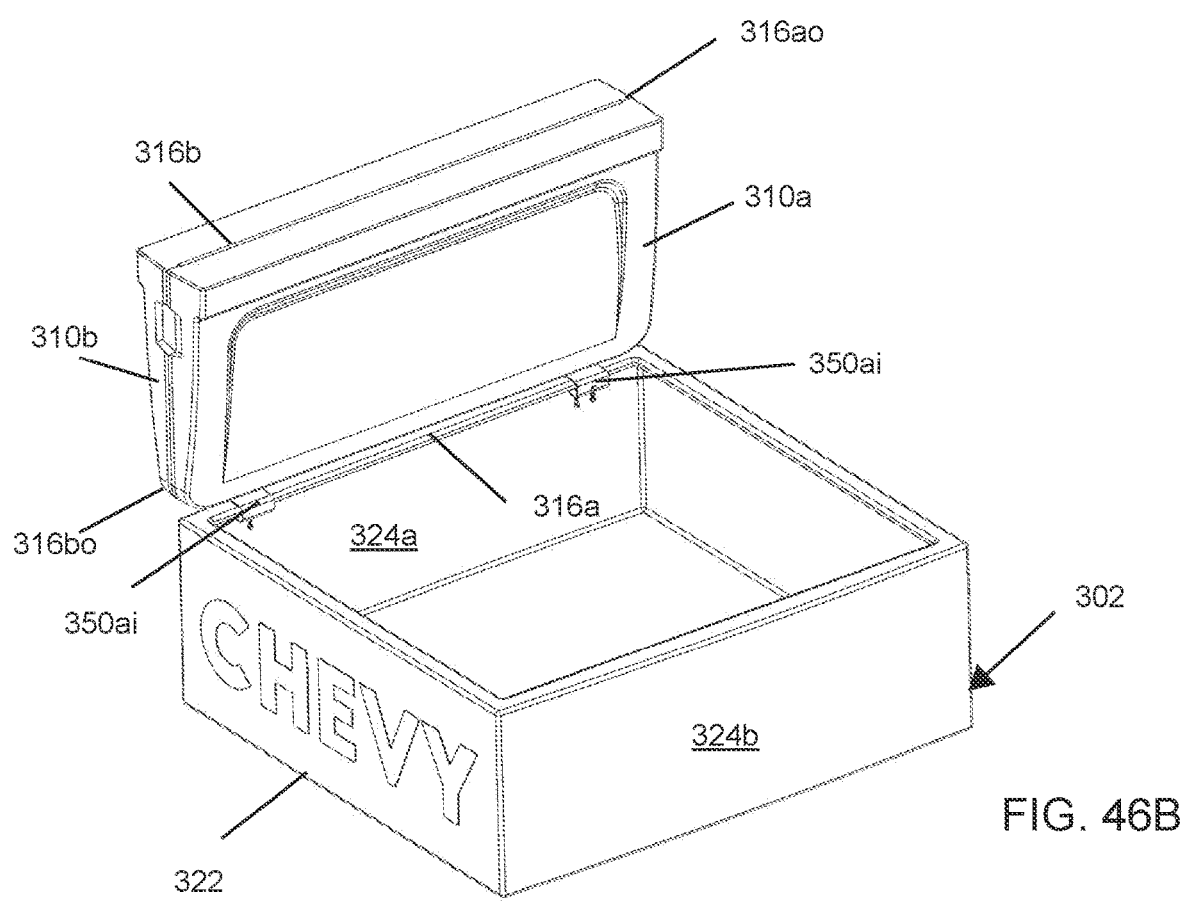
Figure 47A:
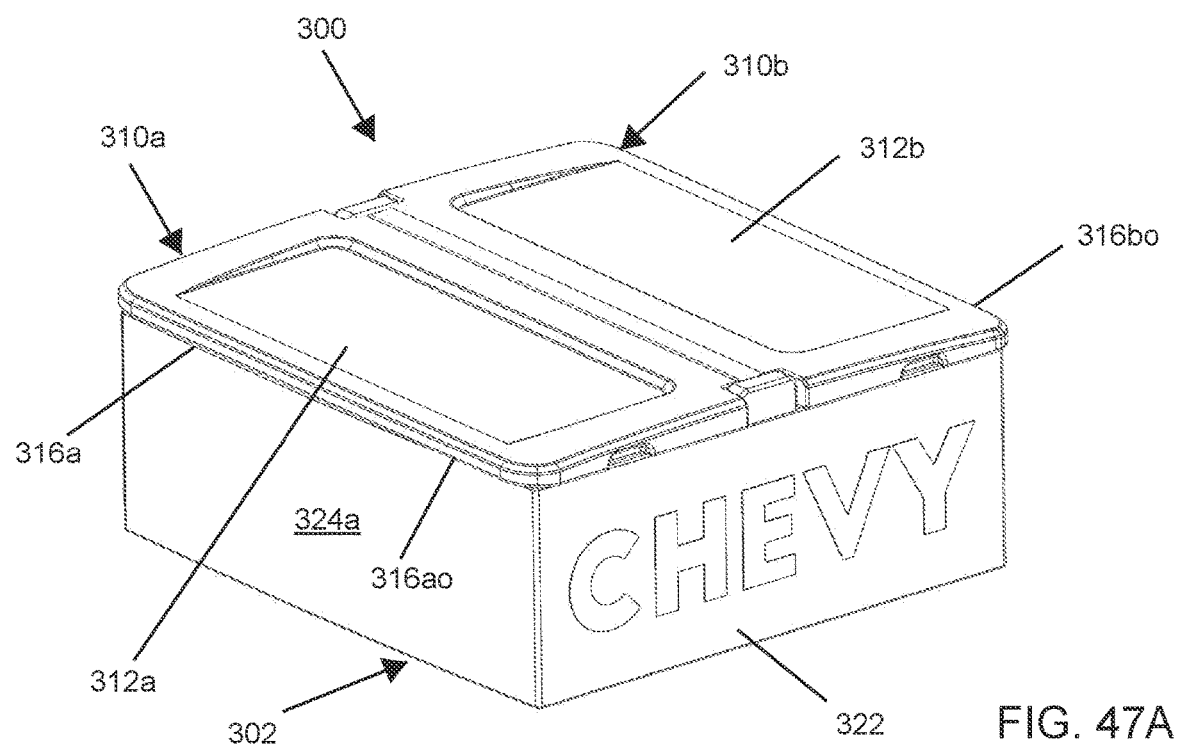
Figure 47B:
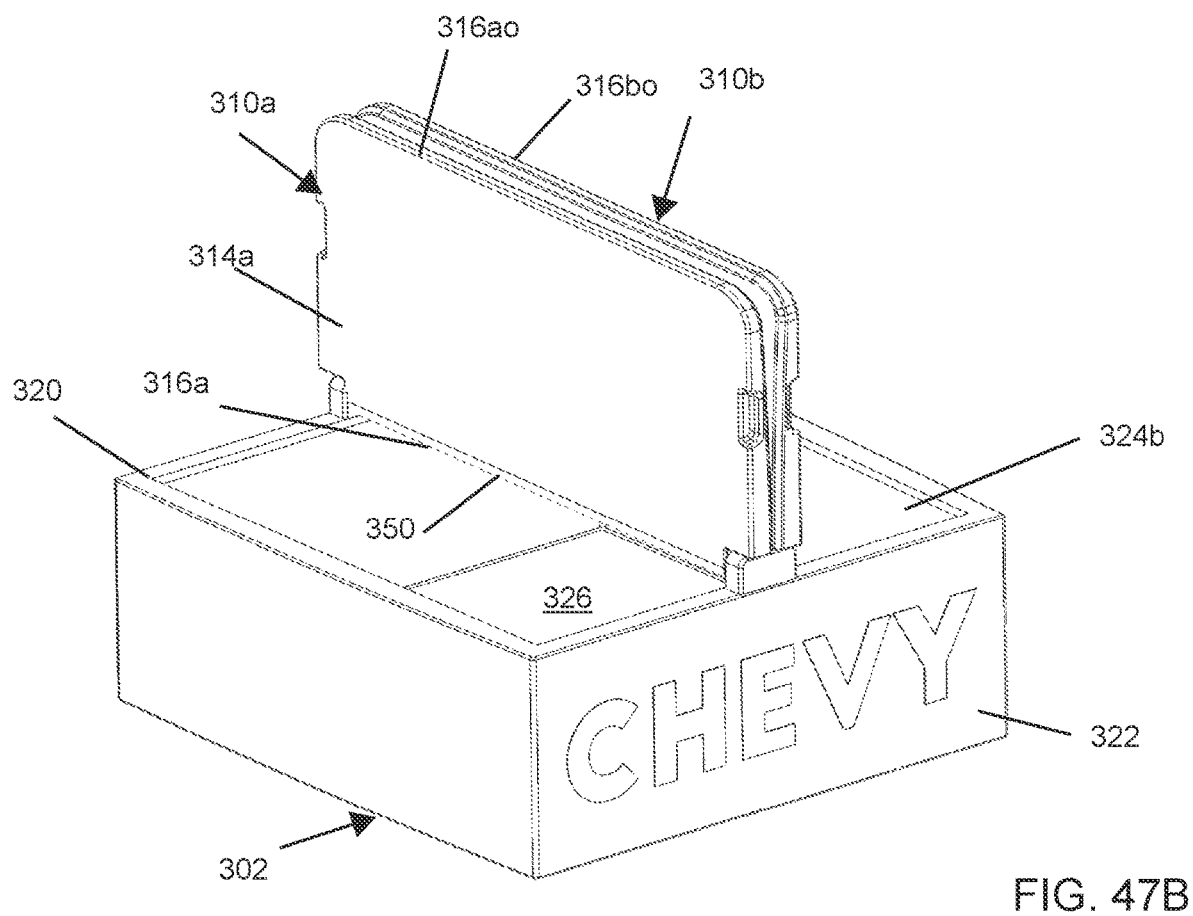
Figure 48A:
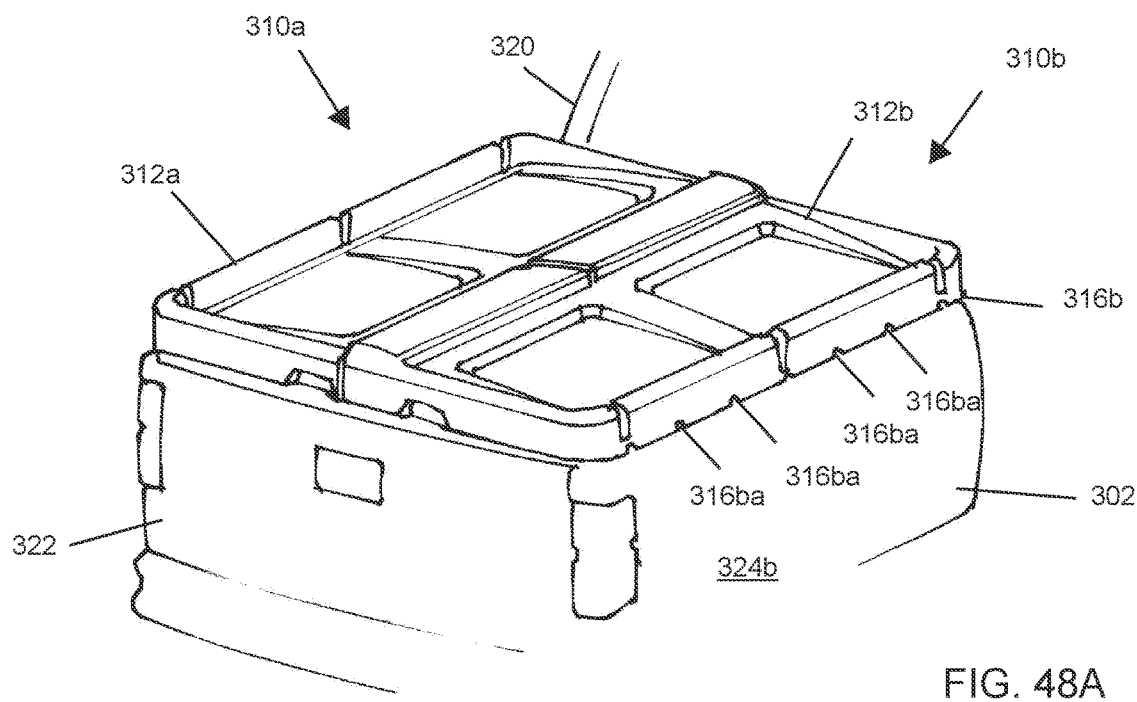
Figure 48B:
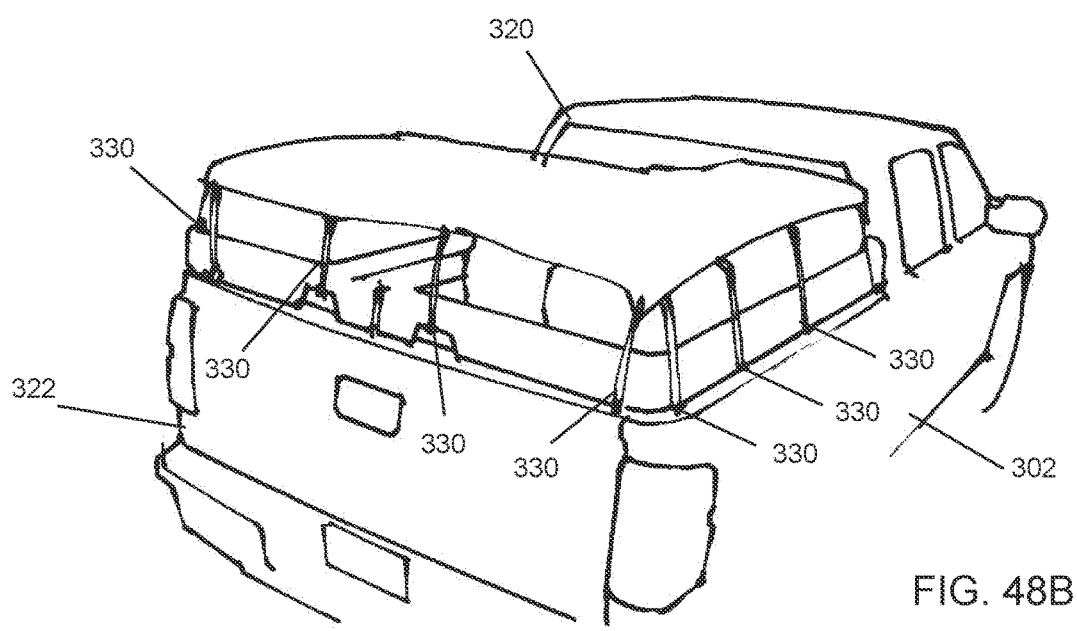
Figure 49A:
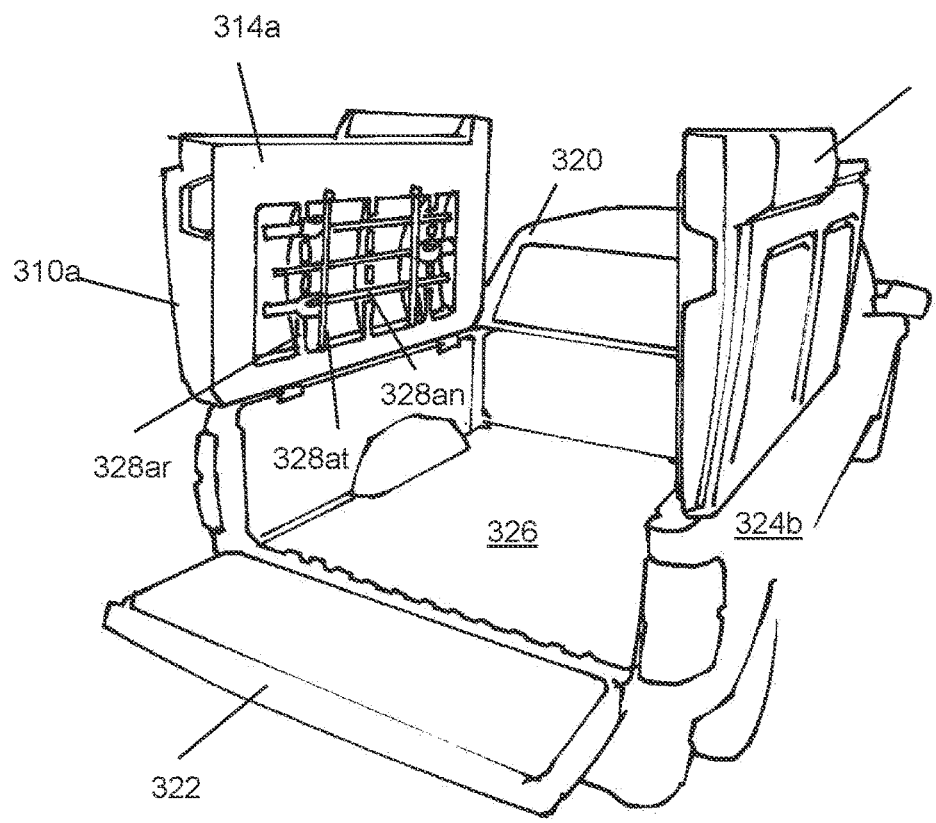
Figure 49B:
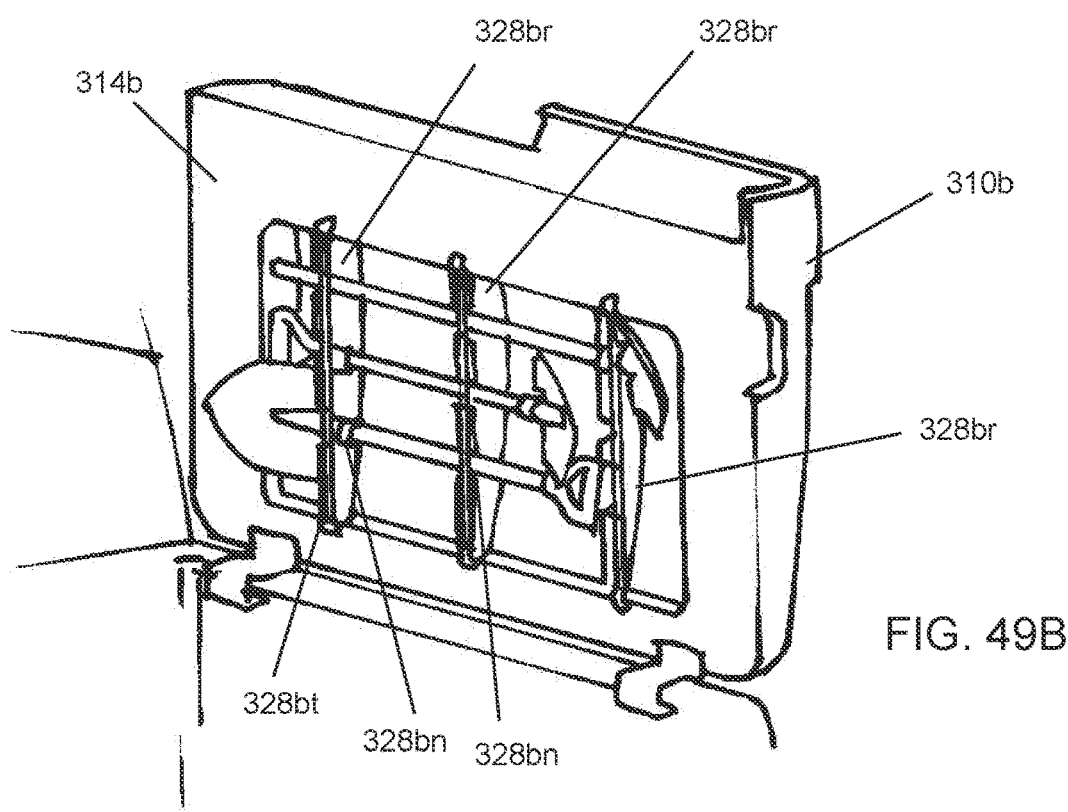

FIG. 6 is a schematic perspective view of a top surface 18 of a first member 14 of the article 10;

FIG. 7 is a top view of the first member 14 showing the top surface 18 of the first member 14;

FIG. 8 is a perspective schematic view of the bottom surface 26 of the first member 14, FIG. 9 shows the bottom surface 28 of the second member 16;

FIG. 10 shows the bottom surface 26 of the first member 14;

FIG. 11 is a perspective schematic view of a first member 14 and a second member 16 in an operative open arrangement attached to an associated truck bed 32;

FIG. 12 is a perspective, end view of the article 20 mounted on an associated pickup truck bed with first member 14 and second member 16 in operative arrangement, closing over the associated truck bed;

FIG. 13 shows a hold-down device 40, which selectively secures first or second members to the associated truck bed;

FIG. 14 shows the hold-down device 40 attached to the second member 16 and not yet attached to the associated truck bed;

FIG. 14A shows the method of selectively attaching the article 10 to the associated pickup truck bed 32;

FIG. 15 is an end view of an associated pickup truck bed with the article 10 being fitted and centered to the truck bed;

FIG. 16 is a top perspective view of an associated truck bed with the second member 16 mounted to the truck bed but the first member 14 (not shown) not yet fitted or mounted to the associated truck bed;

FIG. 17 is a perspective view of the first member 14 and a hold-down device 40 being carried to the associated pickup truck bed to be matched with the second member 16 as shown in FIG. 16;

FIG. 18 is a top schematic view of a portion of the associated pickup truck bed 32 showing a driver's side top edge 54, a passenger side top edge 56, and a front top edge 58, on to which a front brace 50 fits;

FIG. 19 is a top view of a driver's side portion of the front brace 50;

FIG. 20 shows a side view of the passenger top side edge 56 of the associated pickup truck bed with the passenger side 62 of the front brace 50 including projections 72 mounted thereto;

FIG. 21 shows a first support strut shown in a non-functional location, simply laying on the associated tailgate 84 of the associated pickup truck:

FIG. 22 shows a first end 88 of the first support strut 80;

FIG. 23 shows a bottom surface 28 of second member 16 and a securement block 98 into which is a projection 72;

FIG. 24 is a top perspective view of a securement block 96 showing a projection 72, with the securement block 98 mounted on the bottom surface 28 of second member 16;

FIG. 25 shows the bottom surface 28 of the second member 16 with a securement block 98 and associated projection 72 mounted in location:

FIG. 26 is a top perspective view from the rear of the associated pickup truck bed showing the first member 14 in an upright position, and being held so by the first support strut, in place, with one end attached to a projection on the front brace 50 and another end attached to a projection on the hold-down device;

FIG. 27 is a close-up view of an end of the first support strut attached to the securement block 98 via a projection 72;

FIG. 28 shows one embodiment of the article 10 showing the bottom surface 26 of a first member 14 with certain groove 102 created therein;

FIG. 29 is a close-up view of the rear portion of the bottom surface 26 of the first member 14 and the groove 102, showing a stabilizing member 110;

FIG. 30 is a rear perspective view of the bottom surface 28 of the second member 16 with the passenger side end 112 of the stabilizing member 110 aligned with upper and lower support sleeves 116, 118, respectively;

FIG. 31 shows a rear perspective view of the interior bottom surface 26 of the first member 14 with the driver's side upper support sleeve 126 and the driver's side lower support sleeve 128;

FIG. 32 is a rear view of the associated pickup truck bed 32 with the first member 14 and the second member 16 shown in an open position, being held open by first support strut 80 and second support strut 82 and by stabilizing member 110;

FIG. 33 shows a locking mechanism 140 with locking rod 144;

FIG. 34 shows a rear view of the locking mechanism 140 as the locking rod 144 is ready to be slid to the left, through the passenger side upper support sleeve 116 and into the driver's side upper support sleeve 126, thereby locking the first member 14 and the second member 16 together;

FIG. 35 is an overhead view depicting a vehicle (e.g., a pickup truck) including a truck cap in accordance with an exemplary embodiment;

FIG. 36 is a rear view depicting the vehicle with the truck cap of FIG. 35 in a closed position in accordance with an exemplary embodiment;

FIG. 37 is a rear view depicting the vehicle with the truck cap of FIG. 36 in an open position in accordance with an exemplary embodiment;

FIG. 38 is a partially exploded view depicting the truck cap of FIG. 35 in order to show the symmetry of the first and second cover members in accordance with an exemplary embodiment;

FIG. 39 shows the bottom surface of one of the first or second cover members including locking and tool attachment features in accordance with an exemplary embodiment;

FIG. 40 is a perspective view showing the second cover member in the open position with a strut and mounting structures in accordance with an exemplary embodiment;

FIG. 41 is a side view showing the handle used for actuating the release cable in accordance with an exemplary embodiment;

FIGS. 42A and 42B are respective side and partially exploded views showing a strut in accordance with an exemplary embodiment;

FIGS. 43A and 43B are respective oblique and partially exploded views showing a locking mechanism of a strut in accordance with an exemplary embodiment;

FIG. 44 is a rear view depicting the vehicle with a truck cap in an open position with flaps in accordance with an alternative embodiment;

FIGS. 45A and 45B are oblique views depicting closed and open states in accordance with an exemplary "double fold" embodiment;

FIGS. 46A and 46B are oblique views depicting closed and open states in accordance with an exemplary "single fold" embodiment;

FIGS. 47A and 47B are oblique views depicting closed and open states in accordance with an exemplary "gull wing" embodiment;

FIGS. 48A and 48B are oblique views depicting empty and loaded states in accordance with an exemplary "flat top" embodiment;

FIGS. 49A and 49B are oblique and close up views in accordance with an exemplary "recessed compartment" embodiment; and FIGS. 50A, 50B and 50C are oblique views respectively depicting open and closed states in accordance with an exemplary "cot" embodiment and an assembled state of a "tent" embodiment.

IV. DETAILED DESCRIPTION

Figure 1:
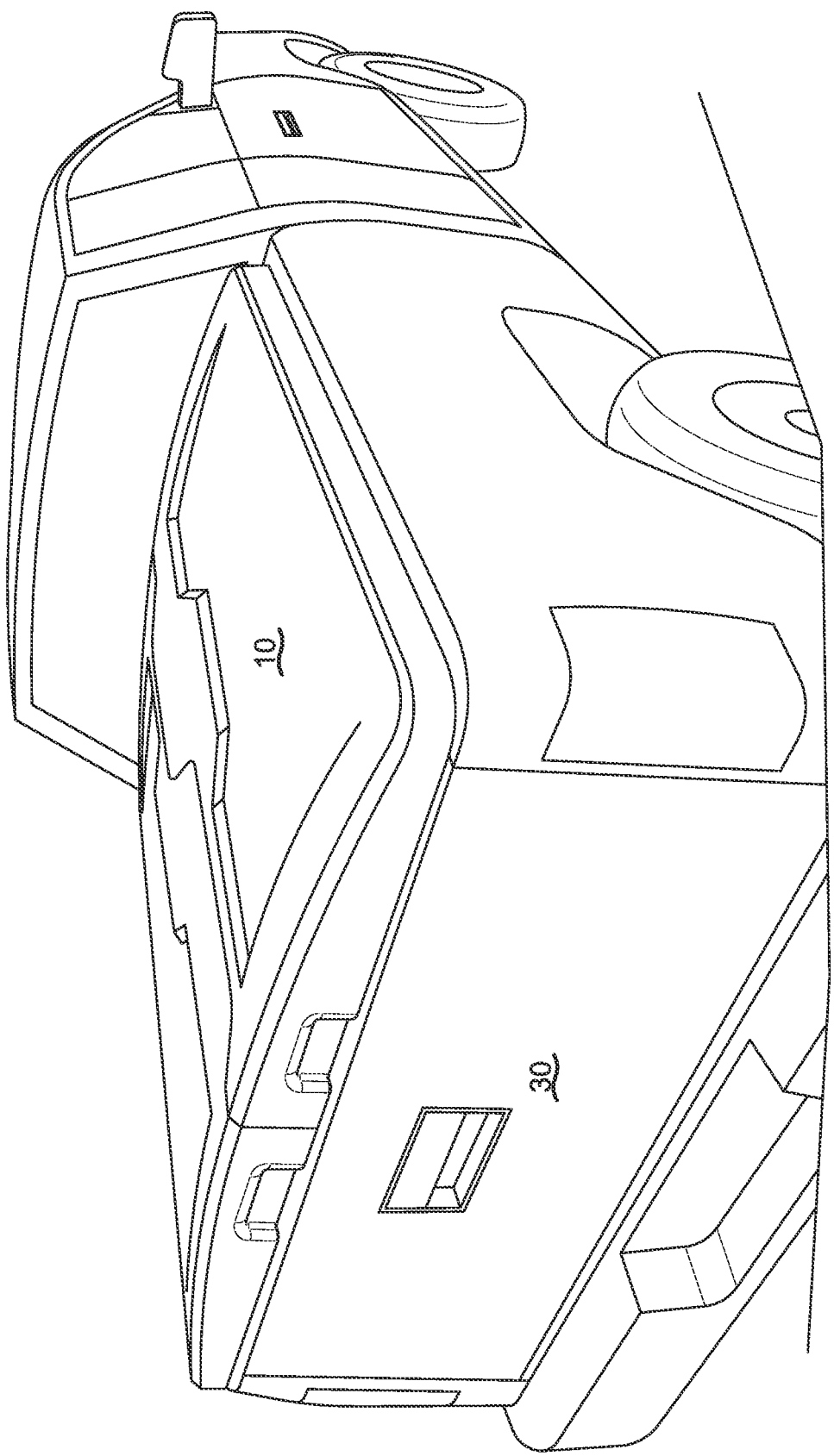
FIG. 1 is a perspective view of an associated pickup truck with the article mounted to the associated pickup truck bed and shown in the closed position.
Figure 2:
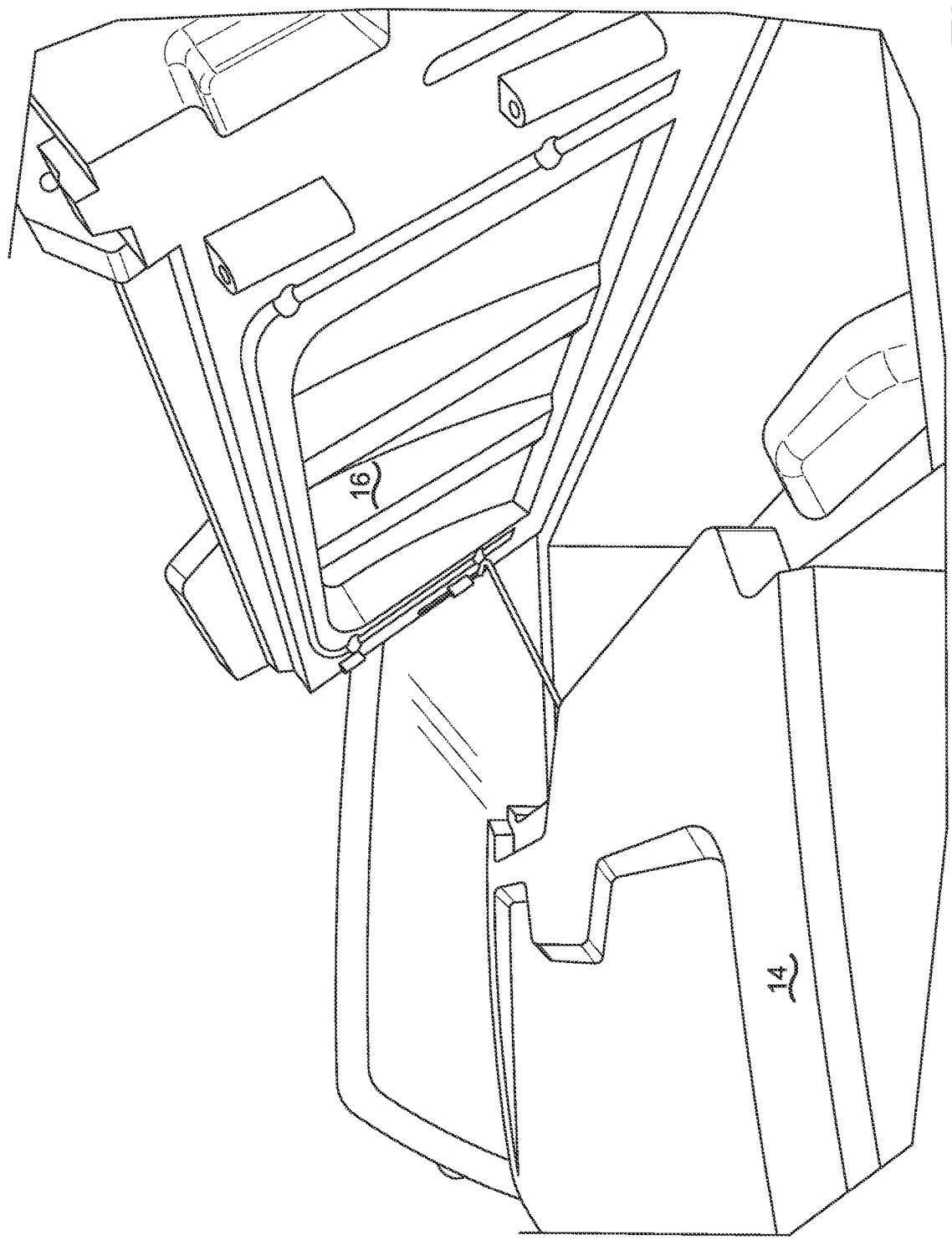
FIG. 2 is an end perspective view of the article mounted on to the associated bed of an associated pickup truck in a partially opened position.
Figure 3:
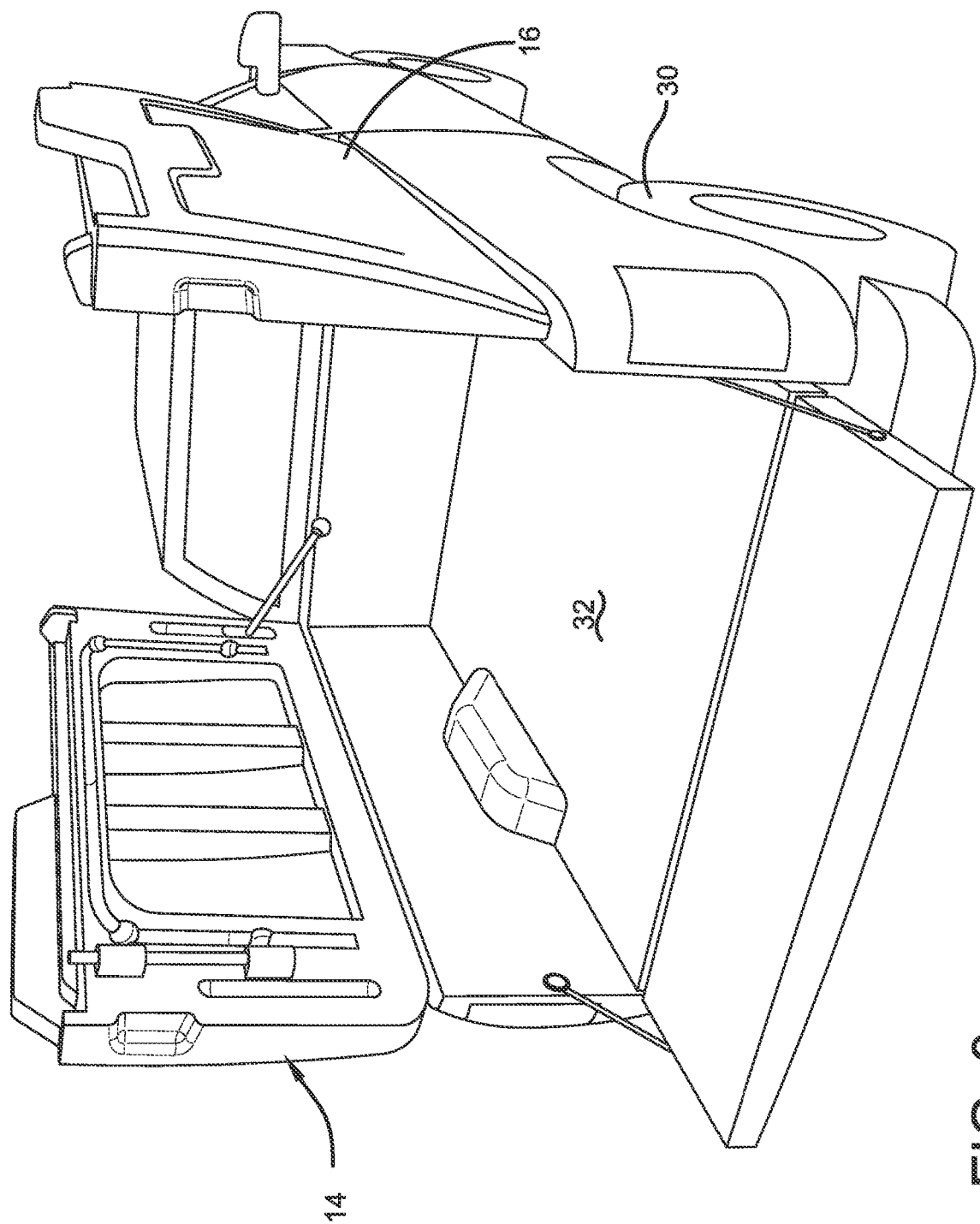
FIG. 3 is an end perspective view of the article shown mounted on to an associated pickup truck bed in the open position.
Figure 4:
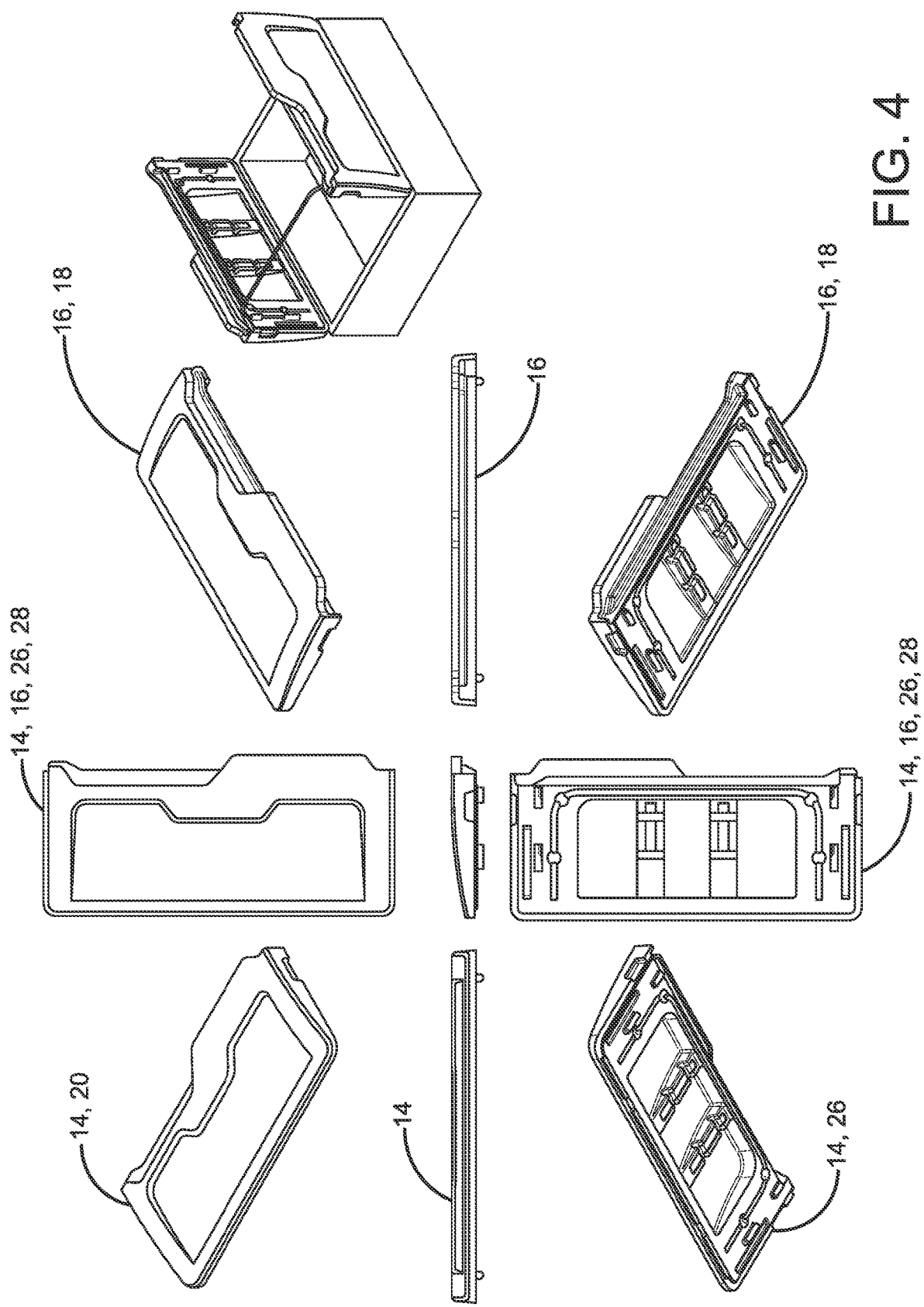
FIG. 4 is a schematic, exploded view showing alternate views of the article, including the first and second members, as well as a schematic illustration of the article mounted on to an associated bed of an associated pickup truck.

Referring now to the drawings wherein the showings are for purposes of illustrating embodiments of the invention only and not for purposes of limiting the same, and wherein like reference numerals are understood to refer to like components, with reference to FIGS. 1 through 4, the article 10 will be explained. The invention is article 10 and an innovative method for making same. The article 10 is a selectively removable and operational cap or cover, such as is often used with associated vehicles, such as a pickup truck 30. With reference to FIG. 2, the article 10 is shown in a semi-open position, where a first member 14 is shown in a closed position while a second member 16 is shown in a semi-open position. With reference to FIG. 13, the article 10 is shown in an open position where both first member 14 and second member 16 are both fully open. With reference to FIG. 4, some of the components of the article 10 are displayed. In FIG. 4, the top surface 18 of the first member 14 and the top surface 20 of the first member 14, as well as the bottom surface 26 of the first member 14 and the bottom surface 28 of the second member 16 are illustrated.

Figure 5:
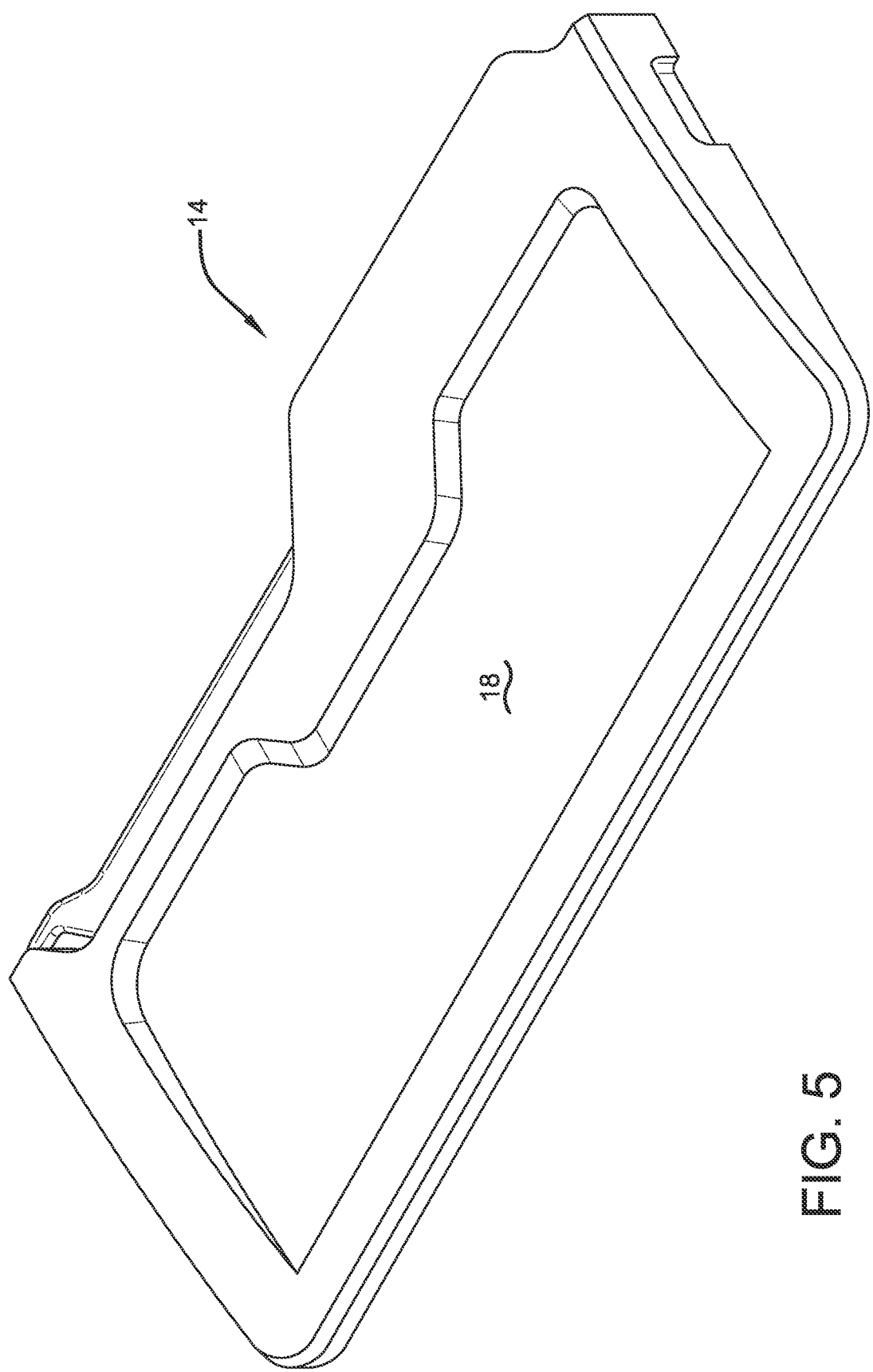
FIG. 5 is a perspective view of a first member 14 of the article 10.

With reference to FIGS. 6-8, the top surface 20 of the first member 14 is illustrated. FIG. 6 shows a top surface 18 of the first member 14. FIG. 7 shows the same view in a line drawing. FIG. 8 shows a bottom surface 26 of the first member 14. With reference to FIG. 5, a perspective view of the first member 14 is shown, especially showing the top surface 18 of first member 14.

With reference to FIG. 6, a similar perspective view is shown of the second member 16 with its top surface 20. Importantly, the first member 14 and second member 16 are identical and can be operatively fitted together as will be described later. Because the first member and second member are identical, the same mold can make both first member 14 and second member 16. With reference to FIG. 7, a line drawing of first member 14 and its top surface 18 is shown. Similarly, in FIG. 8, a perspective view of the bottom surface 26 of the first member 14 is shown. With reference to FIG. 9, a perspective view of the bottom surface 28 of the second member 16 is shown. With reference to FIG. 10, a line drawing of the second member 16 and its bottom surface 28 is shown.

With reference to FIG. 11, the article 10 is shown with the first member and the second member in an open position. An associated pickup bed 32 is shown in a schematic form. In this view, one can see how the first member 14 and the second member 16 fit together in that an extension 14A on first member 14 is selectively, operatively engageable with a recess 16B on second member 16. Similarly, an extension 16A on second member 16 is selectively, operatively engageable with a recess 14B on first member 14.

With reference to FIG. 12, the first member and second member are shown in the closed position where the extension 14A is received into the recess 16B and the extension 16A is received into the recess 14B. Importantly, as is illustrated in the FIGURES, this closed relationship can be modified (as shown in FIGS. 1-2) selectively open and close the article 10, thereby giving access to the associated truck bed 32 of the associated of the associated pickup truck 30.

With reference to FIGS. 13 and 14, a hold-down device 40 is shown in operative engagement, holding the second member 16 of the article 10 and attaching it to a passenger side edge 56 of the associated truck bed 32. The hold-down device can take various forms but in the current form, it has the configuration of a C-shaped metal bracket which features a threaded rod 42 which can be advanced to tighten or loosen the hold-down device 40 to the truck bed 32 as desired. The hold-down device 40 is connected to a hinge pin 44, which is a longitudinally extending metal member that provides rotation along each of the respective first and second members 14, 16. The hinge pin 44 is removably inserted within hinge bars 46, which are hollow, longitudinally extending metal tubes, secured to each of the first and second members 14, 16, and configured to distribute pressure of the hinge across each of the first and second members 14, 16.

With reference to FIG. 14A, the method of selectively attaching the article 10 to the associated pickup truck bed 32 as illustrated. Once the article 10 is generally centered over the truck bed, an associated operator or driver can enter the truck bed and tighten the threaded rod 42 on each of the first and second member 14, 16, thereby making fine adjustments of centering and securing the article to associated pickup truck 30.

With reference to FIG. 15, the second member 16 is shown in attached position on the associated pickup truck 30. With reference to FIG. 16, the first member 14 is shown being carried by an associated operator to the driver's side edge 54 of the associated pickup truck bed 32. When the associated operator fits the first member 14 into place, causing the extension 14A to align with recess 16B, and recess 14B to align with extension 16A, the first member will be in operative association with the second member, requiring only for the operator to tighten the hold-down device 40 via the threaded rods 42, as illustrated in FIG. 14A.

With reference to FIGS. 17-20, a front brace is illustrated. The front brace 50 selectively fits at the front end of the associated pickup truck bed 32. As shown schematically in FIG. 17, the front brace is generally U-shaped with the driver's side leg 152 and the passenger side leg 154 begin considerably shorter than the center portion 156. As can be seen in FIGS. 18 and 19, the front brace 50 fits, preferably with a press fit, into the front portion of the associated truck bed 32. The length of the center portion 156 is slightly larger than the width of the associated truck bed 32 so that the front brace fits snugly in its place. As is best shown in FIG. 20, the primary purpose of the front brace 50 is to provide a place for projection 72 to be mounted.

As can be seen best in FIGS. 20-27, the projections 72 provide an anchor on the front brace 54 whereby to operatively link and attach first and second support struts 80, 82. With continuing reference to FIGS. 20-27, as well as to FIG. 3, the first and second support struts 80, 82, are the same, but the one associated with each side of the associated truck bed 32 and facilitating the easy opening and closing of the first and second members 14, 16. With specific reference to FIG. 21, a first and second support strut 80, 82, is illustrated. Each support strut 80, 82 has a first end 88 which is shown in more detail in FIG. 22. The first end 88 can operatively engage the projections 72. As discussed previously, one set of projections 72 are mounted onto the front brace 50. A corresponding set of projections are mounted onto a securement block 98. The securement block 98 is attached to the bottom surfaces 26, 28 of the first and second members 14, 16, respectively. With reference to FIG. 26, the first support strut 80 with respective first end 88 and second end 90 can be seen in operative association with the front brace 50, the bottom surface 26 of the first member 14, the interior driver's side edge 78 of the associated truck bed 32 and securement block 98.

With reference to FIGS. 28-34, another aspect of the invention will be described. With reference to FIG. 28, a stabilizing member 110 is shown. The stabilizing member has a generally U-shape. A driver's side leg 112 of the stabilizing member 110 is essentially the same length as passenger side leg 114. The driver's side leg 112 and the passenger side leg 114 are joined by a center portion 116 of the stabilizing member 110.

With reference to FIGS. 28-32, the operation and use of the stabilizing member 110 will be illustrated. The stabilizing member can be easily removed from the bottom surface 26 of the first member 14 by use of the cutouts 122. As is shown best in FIGS. 30-32, the driver's side leg 112 of the stabilizing member 110 is selectively fitted into driver's side upper support sleeve 126 and driver's side lower support sleeve 128. Similarly, the passenger side leg 114 of the stabilizing member 110 is selectively threaded into the passenger side upper support sleeve 132 and the passenger side lower support sleeve 134. With reference to FIG. 32, the stabilizing member 110 is shown in its "locked" or "open"

position so that the article 10 is shown in its open position. In this configuration, both the first member 14 and the second member 16 are open and are kept open by the stabilizing member 110. In such configuration, the associated vehicle, such as a pickup truck 30 can be driven with a larger, taller load in the associated pickup truck bed 32. For example, an all-terrain vehicle (commonly known as an "ATV") or something that extends upwardly above the driver's side edge and passenger side edge 54, 56, respectively of the associated truck bed 32 can be carried.

With reference to FIGS. 33 and 34, the locking mechanism for the article 10 will be illustrated. Previously, the driver's side upper support sleeve 126 and driver's side lower support sleeve 128 as well as the passenger side upper support sleeve 132 and the passenger side lower support sleeve 134 were discussed. Also shown in FIG. 33 is a locking rod. In the currently preferred embodiment, the locking rod is simply a wooden rod approximately 18 inches in length and about 1 inch in diameter. The locking rod 144 is stored in either of the upper or lower support sleeves 126, 128, 132, 134 when not in use. When the pickup truck bed 32 is preferably locked, and therefore the article 10 is desired to be secured so that the content inside the truck bed can also be secured, the first member 14 and the second member 16 are closed, as in the configuration shown in FIG. 12. Then, as shown in FIG. 34, the locking member 140 is slid so that it engages both the driver's side upper support sleeve 126 and the passenger side upper support sleeve 132, thereby preventing the first member 14 and the second member 16 from being opened, as is illustrated in several FIGURES, such as FIG. 32. Once the locking rod 144 is in place, and the first and second members 14, 16 are locked together thereby, and the first and second members are locked to the associated pickup truck 30 via the hold-down devices 40, the only access to the pickup truck bed 32 is the associated pickup truck tailgate 150, as illustrated in FIG. 14A and FIG. 15. Nearly all associated pickup trucks have a locking mechanism for the tailgate, and so when the tailgate 150 is locked in this conventional way, access to the associated pickup truck bed 32 is secured and controlled.

According to another aspect of the invention, the innovative article 10 is manufactured through a known manufacturing technique called rotational molding. It is well-known in the art to make certain products through a rotational molding procedure. However, heretofore, a truck cap, such as the article 10, has never been made by a rotationally molded process. The features of the article 10, such as the indentations, cutouts, and configurations of the bottom surfaces 26, 28 of the first and second members 14, 16 are well-suited to the rotational molding process. The low weight (as demonstrated by the user carrying the first member 14 shown in FIG. 16) makes the article 10 and its respective parts first member 14 and second member 16 light enough to enable the user to assemble and disassemble the article and mount and dismount the article 10 from the associated pickup truck bed 32. The material used (plastic) and the manufacturing process (rotational molding) provide the hollow, double-walled, lightweight construction of the article enabling it to have sufficient strength and toughness for the difficult environment in which it operates while still being light enough to be assembled and disassembled, and mounted and dismounted by a single person.

FIGS. 35 through 45 depict alternative exemplary embodiments of the truck cap 200 for removeably covering a bed of a vehicle 202 in accordance with the present invention. FIGS. 35, 36 and 37 show the truck cap 200 including a first cover member 210a that extends between a cab 220 and a tailgate 222 of the vehicle 202. The first cover member 210a has a first top surface 212a, a first bottom surface 214a, and a first pivot edge 216a along which the first cover member 210a is pivotably connected to a driver side panel 224a adjoining the vehicle bed 226. The first cover member 210a is thereby configured for pivoting between an open position (as shown in FIG. 37) and a closed position (as shown in FIGS. 35 and 36).

As further shown in FIGS. 35, 36, and 37, similar to the first cover member 210a, a second cover member 210b is provided that extends between the cab 220 and the tailgate 222 of the vehicle 202. Both the first and second cover members 210a, 210b extend between the cab 220 and the tailgate 222 in that they preferably extend parallel to a central axis of the vehicle 202, spanning from the vehicle front to the vehicle back, along the length of the vehicle bed 226. Like the first cover member 210a, the second cover member 210b has a second top surface 212b, a second bottom surface 214b, and a second pivot edge 216b along which the second cover member is pivotably connected to a passenger side panel 224b adjoining the vehicle bed 226. In this manner, the second cover member 210b is also configured for pivoting between an open position and a closed position.

As further shown in FIGS. 35, 36, and 37, and with particular reference to FIG. 38, a first raised portion 230a is formed along the first top surface 212a and extends over a first abutting edge 232a of the first cover member 210a opposite the first pivot edge 216a. That is to say, the first abutting edge 232a is the opposite edge of the first cover member 210a from the first pivot edge 216a, where the first abutting edge 232a and the first pivot edge 216a are parallel to each other. Similarly, a second raised portion 230b is formed along the second top surface 212b and extending over a second abutting edge 232b of the second cover member 210b opposite the second pivot edge 216b. As with the first cover member 210a, the second abutting edge 232b is the opposite edge of the second cover member 210b from the second pivot edge 216b, where the second abutting edge 232b and the second pivot edge 216a are parallel to each other. The first and second abutting edges 232a, 232b are configured to be in abutment with each other when the first and second cover members 210a, 210b are both in the closed position. In the closed position, the first and second raised portions 230a, 230b are configured to interlock to cover the first and second abutting edges 232a, 232b, as indicated in FIG. 35.

As depicted in FIGS. 35, 36, 37, and 38, the first and second top surfaces 212a, 212b are sloped downward away from the first and second abutting edges 232a and 232b, generally sloped toward the respective first and second pivot edges 216a, 216b. In this way, rain and snow will tend to flow away from the junction of the abutting edges 232a and 232b rather than flowing toward the junction and into the vehicle bed 226.

In the preferred embodiment, as especially shown in FIG. 38, the first and second raised portions 230a, 230b are configured to be collinear and extend substantially continuously over the first and second abutting edges 232a, 232b while the edges 232a, 232b are in abutment when the cover members 210a, 210b are in the closed position. Each of the abutting edges 232a, 232b extends along the length of the cover members 210a, 210b. However, substantially half of each of the abutting edges 232a, 232b are concealed by the raised portions 230a, 230b of their respective cover members 210a, 210 that overhang the edges 232a, 232b when they are in abutment (i.e., half of the first abutting edge 232a is concealed by the first raised portion 230a and half of the second abutting edge 232b is concealed by the second raised portion 230b). When the cover members 210a, 210b are both in the closed position so that the abutting edges 232a, 232b are in abutment, the overhanging sections of the raised portions 230a, 230b of the respective other cover members 210a, 210b cover over the exposed half of each of the abutting edges 232a, 232b (i.e., the exposed half of the first abutting edge 232a is covered over by the overhanging section of the second raised portion 230b and the exposed half of the second abutting edge 232b is covered over by the overhanging section of the first raised portion 230a). In this manner, snow and water tend to flow off the raised portions 230a, 230b and onto the respective top surfaces 212a, 212b, to prevent water from seeping between the abutting edges 232a, 232b and into the vehicle bed 226.

As evident from FIGS. 35, 36, 37, and 38, the first and second cover members 210a, 210b are of an identical symmetrical configuration and configured to interlock while the first and second abutting edges 232a, 232b are in abutment in the closed position. In this manner, the first and second cover members 210a, 210b can be formed from the same mold, thereby resulting in a savings during manufacturing. All of the molded features described herein that can be formed onto the first and second cover members 210a, 210b can be similarly formed into the same mold, producing identical parts that are equally interchangeable.

As particularly shown in FIG. 38, the first and second raised portions 230a, 230b both have respective first and second interior ends 234a, 234b substantially over midpoints of the respective first and second abutting edges 232a, 232b. These interior ends 234a, 234b are substantially flat and coplanar. In this manner, the respective first and second interior ends 234a, 234b are configured to adjoin each other while the first and second cover members 210a, 210b are both in the closed position.

As also particularly shown in FIG. 38 the first and second raised portions 230a, 230b each have respective first and second exterior ends 236a, 236b formed respectively opposite the first and second interior ends 234a, 234b along the raised portions 230a, 230b. The respective exterior ends 236a, 236b each have an overlapping portion 238a, 238b that extends downward to substantially cover an end gap between the first and second cover members 210a, 210b at the respective first and second abutting edges 232a, 232b, at positions where the abutting edges 232a, 232b terminate. In this way, the overlapping portions 238a, 238b prevent water from seeping between the end gap between the abutting edges 232a, 232b.

As disclosed herein, the first and second cover members 210a, 210b are formed of a plastic material and fashioned by a rotational molding process. It is known in the art that rotational molding (or roto-molding) is an inexpensive molding process compared to injection molding, and suitable for objects with large, low-resolution molded features. Thus, the present invention can be inexpensively produced, in which cost savings can be passed along to the end consumer. Rotational molding results in a hollow member that is lightweight and can be formed with structural features that supply mechanical strength and durability, suitable for applications such as a pickup truck, ATV, LTV or side-by-side vehicle. The cover members 210a, 210b can alternatively be formed of fiberglass or other suitable material without departing from the invention.

As shown in FIG. 39, the cover members 210a, 210b can additionally include first and second channels 240a, 240b formed respectively on the first and second bottom surfaces 214a, 214b to receive and cooperate with a deadbolt 242 that locks the first and second cover members 210a, 210b from underneath while in the closed position. As shown, the first channel 240a can be formed as a recess in the bottom surface 214a, 214b that can include molded features for receiving and retaining the deadbolt 242, and moving it from an unlocked position (where the deadbolt 242t is stowed within the cover member 210a, 210b) to a locked position (where the deadbolt 242 extends outwardly from the cover member 210a, 210b). In the locked position, the deadbolt 242 is received within the second channel 240b of the other cover member 210a, 210b (as indicated in phantom in FIG. 39). The deadbolt 242 can also be supported by features formed above the plane of the bottom surface 214a, 214b. In this manner, when the cover members 210a, 210b are in the closed position, the deadbolt 242 locks the truck cap 100, preventing the cover members 210a, 210b from being opened. The deadbolt 242 can only be accessed when the tailgate 222 is opened. So when the tailgate 222 is locked, the truck cap 100 is locked and cannot be opened.

As also shown in FIG. 39, the cover members 210a, 210b can also include one or more indentation 244 formed on the bottom surface 214a, 214b. The indentations are provided for removeably clipping and supporting tools 246 on the first and second cover members 210a, 210b. The tools 246 can include rakes, shovels or other implements with handles. They tools 246 can also include specialty tools where the indentation 244 can have any suitable shape to receive and support the tools 246. The indentations 244 can be recessed below the plane of the bottom surface 214a, 214b and include molded features suitable for gripping a tool handle or other suitable configuration of the tools 246, as could be contemplated by those having skill in the art. A seal 248 is provided to ensure that water does not enter the vehicle bed 226 through any gaps between the cover members 210a, 210b and the vehicle edges.

With particular reference to FIGS. 37 and 40, the truck cap 200 also includes a pair of first hinge members 250ai, 250aii for pivotably connecting the first pivot edge 216a to the driver side panel 224a. A pair of second hinge members 250bi, 250bii are also provided for pivotably connecting the second pivot edge 216b to the passenger side panel 224b. Each of the first and second hinge members 250ai, 250aii, 250bi, 250bii include a respective C-clamp 252ai, 252aii, 252bi, 252bii for removeably engaging a top rim along the respective first and second side panels 224a, 224b. (It is to be appreciated that only the second cover member 210b and associated structures are shown in FIG. 40, but the corresponding associated structures of the first cover member 210a, though not specifically depicted, are nonetheless identical, as appreciated by those having skill in the art.)

As generally shown in FIGS. 37 and 40, the truck cap 200 also includes a pair of struts 260a, 260b for respectively supporting the cover members 210a, 210b in the open position, opening up in a manner similar to farmhouse "cellar doors" thereby providing full access to the truck bed 226. The struts 260a, 260b enable the truck cap 200 to open up and function as a typical truck cap when desired, but can be out of the way when desired. The truck cap 200 according to the present invention can be left in the open position when hauling tall loads (i.e., a refrigerator or other appliance). This can enable the vehicle to safely drive for short distances at slow to moderate speeds while the cover members 210a, 210b are open. The cover members 210a, 210b can also include tether members (not shown) for retaining to the vehicle bed 226, in the event the hinge members 250ai, 250aii, 250bi, 250bii become damaged. The cover members 210a, 210b remain connected to the vehicle and will not fly off the vehicle in the event of improper vehicle operation.

As further generally shown in FIGS. 37 and 40, a first strut 260a has a first distal end 262a and a first proximal end 264a. The first distal end 262a cooperates with a U-shaped hinge bracket having a bolt secured therethrough for pivotably connecting to the first cover member 210a. The first proximal end 264a also cooperates with a U-shaped hinge bracket having a bolt secured therethrough for pivotably connecting to a securing bar 266 secured to the vehicle bed 226. A second strut 260b has a second distal end 262b and a second proximal end 264b. The second distal end 262b also cooperates with a U-shaped hinge bracket having a bolt secured therethrough for pivotably connecting to the second cover member 210b. The second proximal end 264b also cooperates with a U-shaped hinge bracket having a bolt secured therethrough for pivotably connecting to the securing bar 266 secured to the vehicle bed 226. (It is to be appreciated that only the second strut 260b and associated structures are shown in FIG. 40, but the corresponding associated structures of the first strut 260a, though not specifically depicted, are nonetheless mirror symmetrical, as appreciated by those having skill in the art.) The first and second struts 260a, 260b are selectively locked to maintain the respective first and second cover members 210a, 210b in the open position.

As further shown in FIGS. 37 and 40, the securing bar 266 is mounted substantially proximate to the cab 220, along a top wall 268 at the rear of the vehicle bed 226. The securing bar 266 thus supports the first and second pivotal connections (i.e., U-shaped hinge brackets) for the first and second distal ends 264a, 264b of the respective first and second struts 260a, 260b. The securing bar 266 also includes support structures 270a, 270b for retaining the securing bar 266 to the vehicle bed 226. These support structures 270a, 270b can include a securing strap 272a, 272b or other suitable mechanism that can connect to tie-downs that are factory components installed in the vehicle bed 226 of a typical pickup truck. Any other suitable support structure or structures 270a, 270b for retaining the securing bar 266 could also be contemplated without departing from the invention.

As will be explained in detail in FIGS. 43A and 43B, the first and second struts 260a, 260b each respectively include first and second locking pins to releasably lock the respective first and second cover members 210a, 210b in the open position. As depicted in FIGS. 37 and 40, the first and second struts 260a, 260b respectively include first and second release cables 280a, 280b that around respectively mounted on the cover members 210a, 210b. The release cables 280a, 280b each have respective first and second handles 282a, 282b (also shown in FIG. 41) to selectively release the respective first and second locking pins. The release cables 280a, 280b are standard components in which an actuating cable is clad within a protective sheath. Pulling the handles 282a, 282b tensions the cables and thereby displaces the locking pins as described in detail hereinbelow. In this manner, releasing the locking pins enables the lowering of the first and second cover members 210a, 210b into the closed position.

With reference to FIGS. 42A and 42B, the first and second struts 260a, 260b each include comprise an interior tube 290 which is nested inside an exterior tube 292. Each of the struts 260a, 260b preferably include a respective first and second hydraulic brake 294, mounted inside each respective interior and exterior tubes 290, 292 of the first and second struts 260a, 260b. When the cover members 210a, 210b are being moved to the closed position, the hydraulic brakes 294 provide fluid resistance that slows the movement, thereby preventing the cover members 210a, 210b from slamming down into the closed position over the vehicle bed 226. The hydraulic brake 294 can be a 70 lb. or 80 lb. brake or any other suitable value without departing from the invention. As the cover members 210a, 210b are raised and lowered, the struts 260a, 260b pivot along a respective distal U-shaped hinge bracket 294, pivotably connected to each distal end 262a, 262b, and also a respective proximal U-shaped bracket 296, connected to each proximal end 264a, 264b. The respective U-shaped brackets 294, 296 are each preferably connected to the struts 260a, 260b with a nut and bolt or other suitable securement.

With particular reference to FIGS. 43A and 43B, each exterior tube 292 supports a locking mechanism 300 for engaging the respective release cable 280a, 280b to the respective locking pin 302. Each locking pin 302 is supported on a pivotal rocker 304 that is engaged by the respective release cable 280a, 280b. The pivotal rocker 304 is connected to a U-shaped channel 306 for pivotal movement using a nut and bolt 308a, 308b. The U-shaped channel 306 includes a stop plate 306a for supporting and stabilizing the end of the sheath holding the release cable 280a, 280b. Each locking pin 302 engages a hole 310 in the respective interior tube 290 in order to securely hold and retain the interior tube 290 in a fixed position with respect to the exterior tube 292. The exterior tube 292 can also include a hole 312 through which the locking pin 302 can pass through into engagement with the hole 310 in the exterior tube 292, so that the holes 310, 312 are in registration when the tubes 290, 292 are properly aligned in the open position. A spring 314 biases the rocker 304 so that the locking pin 302 is urged into engagement with the hole 310. Tensioning the release cable 280a, 280b by pulling the handle 282a, 282b pivots the rocker 304 to load the spring 314 and thereby release the locking pin 302 from the hole 310, thus allowing free movement of the interior tube 290 within the exterior tube 292 so that the respective cover member 210a, 210b can move to the closed position.

With reference to FIG. 44, in an alternative embodiment of the truck cap 200, a pair of flaps 320a, 320b can be provided to enclose the vehicle bed 226 while the cover members 210a, 210b are in the open position. A first flap 320a is hingeably mounted to an end 322a of the first cover member 210a. A second flap 320b is also hingeably mounted to an end 322b of the second cover member 210b. The first and second flaps 320a, 320b extend perpendicularly to span a distance between the first and second cover members 212a, 212b over the tailgate 222 of the vehicle 202 while in the open position. In this manner, the flaps 320a, 320b enclose the vehicle bed 226 and provide structural support to the first and second cover members 210a, 210b while in the open position. The flaps 320a, 320b can be used when the vehicle 202 carries tall loads or loose material. The flaps 320a, 320b can be hinged to the ends 322a, 322b of the cover members 210a, 210b and stowed into recesses (not shown) in the bottom surfaces of the cover members 210a, 210b when not in use. Alternatively, they can be removed when not used and removeably connected to the cover members 210a, 210b using any suitable connector structure as would occur to those skilled in the art.

FIGS. 45A through 50C depict alternative exemplary embodiments of the truck cap 300 for removeably covering a vehicle bed assembly 302 of a vehicle such as a pickup truck in accordance with the present invention. These embodiments include a first cover member 310a that extends between a cab 320 and a tailgate 322 of the vehicle. The first cover member 310a has a first top surface 312a, a first bottom surface 314a, and a first pivot edge 316a along which the first cover member 310a is pivotably connected to a top perimeter portion of the vehicle bed assembly 302. These embodiments also include a second cover member 310b that extends between the cab 320 and the tailgate 322 of the vehicle. The second cover member 310b has a second top surface 312b, a second bottom surface 314b, and a second pivot edge 316b along which the second cover member 310b is pivotably connected to the top perimeter portion of the vehicle bed assembly 302.

With continuing reference to FIGS. 45A through 50C, one or more hinge members 250 are connected to the top perimeter portion of the vehicle bed assembly 302 for connecting to one or both of the first or second pivot edges 316a, 316b to enable pivoting of the respective first or second cover members 310a, 310b between an open position and a closed position. The first and second cover members 310a, 310b are hollow members formed of a plastic material by a rotational molding process. The one or more hinge members 350 are configured to pivotally connect one or both of the first or second pivot edges 316a, 316b to a respective top perimeter portion of a driver side panel 324a or a passenger side panel 324b of the vehicle bed assembly 302. It is to be appreciated that the hinge members 350 in these embodiments are substantially the same as the hinge members disclosed in other embodiments herewith.

With specific reference to FIGS. 45A and 45B, there are provided a first hinge member (comprised of first and second hinge components 350ai, 350aii) for connecting the first cover member 310a to the top perimeter portion of the driver side panel 324a. A second hinge member (not visible in the views but symmetrically identical to first and second hinge components 350ai, 350aii) for connecting the second cover member 310b to the top perimeter portion of the passenger side panel 324b. The first and second cover members 310a, 310b each further comprise a longitudinal hinge 312ah, 312bh, parallel to the first and second hinge members, for pivotally dividing each of the respective first and second cover members 310a, 310b into respective first and second segments 310ai, 310aii, 310bi, 310bii that pivot to fold up against each other when the respective first and second cover members are in the open position (as specifically shown in FIG. 45B). In this manner, the embodiment of FIGS. 45A and 45B provides a "double fold" truck cap design having cover members 310a, 310b that fold up against each other when in the open position. It is to be appreciated that the first and second cover members 310a, 310b can each be formed with abutting edges, opposite the first and second pivot edges 316a, 316b, without interlocking raised portions that cover the abutting edges, as with the embodiments disclosed hereinabove.

With specific reference to FIGS. 46A and 46B, the first and second cover members 310a, 310b each have an opposing edge 316ao, 316bo opposite the respective pivot edge 316a, 316b. The opposing edge 316ao of the first cover member 310a is pivotally connected to the pivot edge 316b of the second cover member 310b, and a single hinge member (including first and second hinge components 350ai, 350aii) is provided for connecting the pivot edge 316a of the first cover member 310a to the top perimeter portion of the driver side panel 324a of the vehicle bed assembly 302, so that the first and second cover members 310a, 310b fold up against each other when in the open position. In this manner, the embodiment of FIGS. 46A and 46B provides a "single fold" truck cap design extending from the driver side panel 324a having cover members 310a, 310b that fold up against each other when in the open position.

With further reference to FIGS. 46A and 46B, it is to be appreciated that an identical but mirror reversed configuration can be employed where the first and second cover members 310a, 310b each have an opposing edge 316ao, 316bo opposite the respective pivot edge 316a, 316b and the opposing edge 316bo of the second cover member 310b is pivotally connected to the pivot edge 316a of the first cover member 310a. The hinge member can include first and second hinge components for connecting the pivot edge 316b of the second cover member 310b to the top perimeter portion of the passenger side panel 324b of the vehicle bed assembly 302, so that the first and second cover members 310a, 310b fold up against each other when in the open position to provide a "single fold" configuration extending from the passenger side panel 324b.

With specific reference to FIGS. 47A and 47B, the hinge member includes a single hinge member 350 configured to pivotally connect both of the first or second pivot edges 316a, 316b to a top perimeter portion of the cab 320 and the tailgate 322 above a centerline of the vehicle bed assembly 302. In this manner, the embodiment of FIGS. 47A and 47B provides a "gull wing" truck cap design having cover members 310a, 310b that fold up against each other along a centerline of the truck bed assembly 302 when in the open position, allowing access to the truck bed 326 from both the driver side panel 324a and passenger side panel 324b.

With reference to FIGS. 48A through 49B, one or more integrally molded recessed components 328 can be formed on either the top surface 312a, 312b or the bottom surface 314a, 314b of one or both of the first cover member 310a or second cover member 310b. The integrally molded recessed compartment(s) 328 are configured for receiving and retaining an article.

With specific reference to FIGS. 48A and 48B, the integrally molded recessed compartment(s) can be formed on one or both of the top surfaces 312a, 312b for retaining articles atop the first and second cover members 310a, 310b when in the closed position. In this embodiment, the first and second cover members 310a, 310b further include integrally molded notches 316an, 316bn, formed along underside portions of the pivot edges 316a, 316b, for engaging straps 330 that retain a tarpaulin 332 for securing over the articles atop the first and second cover members 310a, 310b.

With specific reference to FIGS. 49A and 49B, the recessed compartment 328 can be formed on one or both of the bottom surfaces 314a, 314b and further include a plurality of integrally molded ribs 328ar, 328br within an interior of the recessed compartment 328. Each of the ribs 328ar, 328br can further include integrally molded notches 328an, 328bn for receiving and retaining longitudinal tool handles, such as the handles of shovels and rakes and the like. One or more rigid retaining rods 328at, 328bt are provided to extend over one or more of the ribs 328ar, 328br for securely retaining the tool handles.

With specific reference to FIGS. 50A and 50B, the hinge member connecting one or both of the first and second covers 310a, 310b to the vehicle bed assembly 302 includes a hinge extension 350e connected to a foldable cot 340 configured to pivotally fold up against the bottom side 314a, 314b of the respective one of the first or second cover members 310a, 310b in a stowed position. The foldable cot 340 can also pivotally fold down onto the vehicle bed 326 when the respective cover member 310a, 310b is in the open position. The foldable cot 340 further includes a pivotal cot support 342 configured to fold down onto the vehicle bed 326 to support the cot 340 when the respective cover member 310a, 310b is in the open position.

With specific reference to FIG. 50C, the truck cap can include a tent structure 360 that is configured to cover over and be supported by first and second cover members 310a, 310b when in the open position. A plurality of support straps 362 are provided that extend from the tent structure 360 for securement underneath the vehicle bed 326, for example, engaging underneath the vehicle rear bumper and wheel wells. The tent structure 360 can be used with the foldable cot 340 or separately.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A truck cap for removably covering a vehicle bed assembly of a vehicle, comprising;
    a first cover member extending between a cab and a tailgate of the vehicle, the first cover member having a top surface, a bottom surface, and a first pivot edge along which the first cover member is pivotably connected to a top perimeter portion of the vehicle bed assembly;
    a second cover member extending between the cab and the tailgate of the vehicle, the second cover member having a top surface, a bottom surface, and a second pivot edge along which the second cover member is pivotably connected to the top perimeter portion of the vehicle bed assembly;
    at least one hinge member connected to the top perimeter portion of the vehicle bed assembly for connecting to at least one of the first or second pivot edges to enable pivoting of the respective cover member between an open position and a closed position;
    wherein the first and second cover member each comprise abutting edges, opposite the respective first and second pivot edges, and wherein the first and second cover members are hollow members formed of a plastic material by a rotational molding process; and
    wherein at least one of the top surface or the bottom surface of at least one of the first cover member or second cover member includes at least one integrally molded recessed compartment having integrally molded notches for receiving and retaining at least one article.

2. The truck cap of claim 1, wherein the at least one hinge member is configured to pivotally connect at least one of the first or second pivot edges to a top perimeter portion of at least one of a driver side panel or passenger side panel of the vehicle bed assembly.

3. The truck cap of claim 2, wherein the at least one hinge member comprises a first hinge member for connecting the first cover member to the top perimeter portion of the driver side panel and a second hinge member for connecting the second cover member to the top perimeter portion of the passenger side panel, wherein the first and second cover members each further comprise a longitudinal hinge, parallel to the first and second hinge members, for pivotally dividing each of the respective first and second cover members into first and second segments that pivot to fold up against each other when the respective first and second cover members are in the open position.

4. The truck cap of claim 1, wherein the at least one integrally molded recessed compartment is formed on the top surface for retaining articles atop the first and second cover members when in the closed position.

5. The truck cap of claim 4, wherein the integrally molded notches are formed along underside portions of the pivot edges, for engaging straps that retain a tarpaulin for securing over the articles atop the first and second cover members.

6. The truck cap of claim 1, wherein the recessed compartment is formed on the bottom surface and further comprises a plurality of integrally molded ribs within an interior of the recessed compartment, wherein each of the ribs comprises the integrally molded notches for receiving and retaining longitudinal tool handles.

7. The truck cap of claim 6, wherein the recessed compartment further comprises at least rigid retaining rod extending over at least one of the ribs for securely retaining the tool handles.

8. The truck cap of claim 1, wherein the at least one hinge member comprises a hinge extension connected to a foldable cot configured to pivotally fold up against the bottom side of one of the first or second cover members in a stowed position, and pivotally fold down onto the vehicle bed when the respective cover member is in the open position.

9. The truck cap of claim 8, wherein the foldable cot further comprises a pivotal cot support configured to fold down onto the vehicle bed to support the cot when the respective cover member is in the open position.

10. The truck cap of claim 1, further comprising a tent structure that is configured to cover over and be supported by first and second cover members when in the open position.

11. The truck cap of claim 10, further comprising a plurality of support straps that extend from the tent structure for securement underneath the vehicle bed.

12. The truck cap of claim 1, wherein the at least one hinge member comprises a hinge pin, connected to a hold-down device, for securement to the vehicle, wherein the hinge pin is a longitudinally extending member that provides rotation along at least one of the first or second cover members.

13. The truck cap of claim 12, wherein the hinge pin is removably inserted within hinge bars, wherein the hinge bars are hollow, longitudinally extending metal tubes, secured to the respective one of the first or second cover members, and configured to distribute pressure of the at least one hinge across the respective one of the first or second cover members.

14. A truck cap for removably covering a vehicle bed assembly of a vehicle, comprising;
    a first cover member extending between a cab and a tailgate of the vehicle, the first cover member having a top surface, a bottom surface, a first pivot edge along which the first cover member is pivotably connected, and a first opposing edge opposite the first pivot edge;
    a second cover member extending between the cab and the tailgate of the vehicle, the second cover member having a top surface, a bottom surface, a second pivot edge along which the second cover member is pivotably connected, and a second opposing edge opposite the first pivot edge;
    at least one hinge member for connecting the pivot edge of at least one of the first or second cover member to a top perimeter portion of at least one of the driver or passenger side panel of the vehicle bed assembly to enable pivoting of the respective cover member between an open position and a closed position; and wherein at least one of the top surface or the bottom surface of at least one of the first cover member or second cover member includes at least one integrally molded recessed compartment having integrally molded notches for receiving and retaining at least one article.

15. The truck cap of claim 14, wherein the opposing edge of the first cover member is pivotally connected to the pivot edge of the second cover member, and wherein the single hinge member connects the pivot edge of the first cover member to the top perimeter portion of the driver side panel of the vehicle bed assembly, so that the first and second cover members fold up against each other when in the open position.

16. The truck cap of claim 14, wherein the opposing edge of the second cover member is pivotally connected to the pivot edge of the first cover member, and wherein the single hinge member connects the pivot edge of the second cover member to the top perimeter portion of the passenger side panel of the vehicle bed assembly, so that the first and second cover members fold up against each other when in the open position.

17. A truck cap for removably covering a vehicle bed assembly of a vehicle, comprising;

a first cover member extending between a cab and a tailgate of the vehicle, the first cover member having a top surface, a bottom surface, and a first pivot edge along which the first cover member is pivotably connected;

a second cover member extending between the cab and the tailgate of the vehicle, the second cover member having a top surface, a bottom surface, and a second pivot edge along which the second cover member is pivotably connected;

a single hinge member configured to pivotally connect both of the first and second pivot edges to a top perimeter portion of a front of the vehicle bed and the tailgate above a center of the vehicle bed assembly, to enable pivoting of the respective cover members between an open position and a closed position;

wherein the first and second cover member each comprise opposing edges, opposite the respective first and second pivot edges, and wherein the first and second cover members are hollow members formed of a plastic material by a rotational molding process.

* * * * *